US012756673B2

(12) United States Patent
Mysore et al.

(10) Patent No.: US 12,756,673 B2
(45) Date of Patent: Oct. 6, 2026

(54) KERNEL-ENFORCED AUTHENTICATION FOR LEDGER-REGISTERED AI AGENTS

(71) Applicant: Citibank, N.A., New York, NY (US)

(72) Inventors: Vishal Mysore, Mississauga (CA); Prithvi Narayana Rao, Allen, TX (US); Payal Jain, London (GB); Sawyer Uzzell, New York, NY (US); Joao Paulo De Castro Marchese, Miami, FL (US); James Randolph Myers, Clearwater Beach, FL (US); Ganesh Prasad Bhat, West Orange, NJ (US); Miriam Silver, Tel Aviv (IL)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/679,232

(22) Filed: May 15, 2026

(65) Prior Publication Data

US 2026/0281059 A1 Sep. 17, 2026

Related U.S. Application Data

(63) Continuation-in-part of application No. 19/574,240, filed on Mar. 20, 2026, and a continuation-in-part of
(Continued)

(51) Int. Cl.
*H04L 47/70* (2022.01)
*H04L 67/1097* (2022.01)

(52) U.S. Cl.
CPC ........ *H04L 47/822* (2013.01); *H04L 67/1097* (2013.01)

(58) Field of Classification Search
CPC .......................... H04L 47/822; H04L 67/1097
See application file for complete search history.

(56) References Cited

U.S. PATENT DOCUMENTS 11,133,942 B1 9/2021 Griffin
11,153,177 B1 10/2021 Hermoni et al.
(Continued)

FOREIGN PATENT DOCUMENTS

CN 112765684 A * 5/2021 ............ G06F 21/64
CN 118969216 11/2024
(Continued)

OTHER PUBLICATIONS

"Coalition for Content Provenance and Authenticity, Contents Credentials C2PA Technological Specification", v2.1,Sep. 20, 2024. (Year: 2024).
(Continued)

*Primary Examiner* — Shean Tokuta
(74) *Attorney, Agent, or Firm* — Ashurst Perkins Coie US LLP; Sumedha Ahuja; Willa Wu

(57) ABSTRACT

The systems and methods disclosed herein load a monitoring program into a kernel or other monitoring component of an operating system external to a user space. The monitoring program attaches to at least one hook point associated with execution of an artificial intelligence agent and captures a plurality of event records (a process identifier, an operation identifier, a resource identifier, a timestamp) associated with the agent. The system generates a cryptographic value by applying one or more functions to a representation of at least a subset of the event records and maintains the cryptographic value on a distributed database within a record associated with the agent. The distributed database maintains a sequence of records that links each record to one or more previous records. The system can detect anomalous agent operations and execute enforcement actions within the monitoring component that restrict agent execution.

20 Claims, 17 Drawing Sheets

Related U.S. Application Data application No. 19/574,166, filed on Mar. 20, 2026, said application No. 19/574,240 is a continuation of application No. 19/375,898, filed on Oct. 31, 2025, now Pat. No. 12,619,715, said application No. 19/574,166 is a continuation of application No. 19/333,600, filed on Sep. 19, 2025, now Pat. No. 12,587,489, which is a continuation-in-part of application No. 19/288,027, filed on Aug. 1, 2025, now Pat. No. 12,526,244, which is a continuation-in-part of application No. 19/217,943, filed on May 23, 2025, now Pat. No. 12,450,037, said application No. 19/333,600 is a continuation-in-part of application No. 19/182,585, filed on Apr. 18, 2025, said application No. 19/288,027 is a continuation-in-part of application No. 19/179,996, filed on Apr. 15, 2025, now Pat. No. 12,587,488, which is a continuation-in-part of application No. 19/096,675, filed on Mar. 31, 2025, now Pat. No. 12,500,852, which is a continuation-in-part of application No. 19/069,109, filed on Mar. 3, 2025, said application No. 19/182,585 is a continuation of application No. 18/947,102, filed on Nov. 14, 2024, now Pat. No. 12,299,140, said application No. 19/069,109 is a continuation of application No. 18/923,507, filed on Oct. 22, 2024, now Pat. No. 12,244,515, said application No. 19/179,996 is a continuation-in-part of application No. 18/920,721, filed on Oct. 18, 2024, said application No. 18/947,102 is a continuation-in-part of application No. 18/782,019, filed on Jul. 23, 2024, now Pat. No. 12,197,859, which is a continuation-in-part of application No. 18/771,876, filed on Jul. 12, 2024, now Pat. No. 12,204,323, said application No. 18/947,102 is a continuation-in-part of application No. 18/739,111, filed on Jun. 10, 2024, now Pat. No. 12,223,063, said application No. 18/661,532 is a continuation-in-part of application No. 18/661,519, filed on May 10, 2024, now Pat. No. 12,106,205, said application No. 18/771,876 is a continuation-in-part of application No. 18/661,532, filed on May 10, 2024, now Pat. No. 12,111,747, said application No. 18/947,102 is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 18/661,519 is a continuation-in-part of application No. 18/633,293, filed on Apr. 11, 2024, now Pat. No. 12,147,513, said application No. 18/739,111 is a continuation-in-part of application No. 18/607,141, filed on Mar. 15, 2024, now Pat. No. 12,608,486, said application No. 18/920,721 is a continuation-in-part of application No. 18/434,687, filed on Feb. 6, 2024, now Pat. No. 12,126,546, said application No. 18/923,507 is a continuation-in-part of application No. 18/434,687, filed on Feb. 6, 2024, now Pat. No. 12,126,546, said application No. 18/607,141 is a continuation-in-part of application No. 18/399,422, filed on Dec. 28, 2023, now Pat. No. 12,367,292, which is a continuation of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(56) References Cited

U.S. PATENT DOCUMENTS

| | | | | |
|---|---|---|---|---|
| 11,573,848 | B2 | 2/2023 | Linck et al. | |
| 11,861,423 | B1 | 1/2024 | Potyraj et al. | |
| 11,880,836 | B1 | 1/2024 | Nemethi | |
| 12,335,286 | B1 | 6/2025 | Erlingsson et al. | |
| 12,464,003 | B1 | 11/2025 | Pandya et al. | |
| 12,470,577 | B1 | 11/2025 | Patil et al. | |
| 12,530,174 | B2 | 1/2026 | Palanki et al. | |
| 12,619,715 | B1 * | 5/2026 | Bhat | G06F 21/53 |
| 2019/0052659 | A1 | 2/2019 | Weingarten et al. | |
| 2020/0074470 | A1 | 3/2020 | Deshpande et al. | |
| 2021/0211431 | A1 | 7/2021 | Albero et al. | |
| 2021/0297234 | A1 | 9/2021 | Le Callonnec | |
| 2022/0086162 | A1 | 3/2022 | Badawy et al. | |
| 2022/0109685 | A1 | 4/2022 | Hankins et al. | |
| 2022/0138327 | A1 | 5/2022 | Panicker et al. | |
| 2022/0147815 | A1 | 5/2022 | Conwell et al. | |
| 2022/0188460 | A1 | 6/2022 | Hadar et al. | |
| 2022/0327219 | A1 | 10/2022 | Choi et al. | |
| 2022/0345457 | A1 | 10/2022 | Jeffords et al. | |
| 2022/0405397 | A1 | 12/2022 | Golan et al. | |
| 2023/0007039 | A1 | 1/2023 | Waplington | |
| 2023/0019072 | A1 | 1/2023 | Okunlola | |
| 2023/0076372 | A1 | 3/2023 | Engelberg et al. | |
| 2023/0114719 | A1 | 4/2023 | Thomas et al. | |
| 2023/0117962 | A1 | 4/2023 | Kaimal et al. | |
| 2023/0132703 | A1 | 5/2023 | Marsenic et al. | |
| 2023/0259399 | A1 | 8/2023 | Rao et al. | |
| 2023/0360031 | A1 | 11/2023 | Lisa | |
| 2024/0007479 | A1 | 1/2024 | George | |
| 2024/0089103 | A1 | 3/2024 | Chao-ying et al. | |
| 2024/0095220 | A1 | 3/2024 | Isaacs | |
| 2024/0177155 | A1 | 5/2024 | Chen | |
| 2024/0256678 | A1 | 8/2024 | Thompson | |
| 2024/0281352 | A1 | 8/2024 | Southgate | |
| 2024/0420116 | A1 | 12/2024 | Ramde et al. | |
| 2024/0422291 | A1 | 12/2024 | Ramde et al. | |
| 2025/0021464 | A1 | 1/2025 | Lang et al. | |
| 2025/0173734 | A1 | 5/2025 | Aidan | |
| 2025/0371141 | A1 * | 12/2025 | Vaughn | G06F 21/552 |
| 2026/0064817 | A1 * | 3/2026 | Odeh | G06F 21/32 |

FOREIGN PATENT DOCUMENTS

| | | | | | |
|---|---|---|---|---|---|
| CN | 120281586 | A | * | 7/2025 | G06N 3/092 |
| CN | 121050742 | A | * | 12/2025 | G06F 18/22 |
| CN | 121118069 | A | * | 12/2025 | |
| CN | 121833609 | A | * | 4/2026 | G06F 11/3447 |
| CN | 121919188 | A | * | 4/2026 | G06F 16/1734 |
| EP | 4191976 | | | 6/2023 | |
| JP | 2022150778 | | | 12/2024 | |
| KR | 20220083931 | | | 7/2022 | |
| WO | 2020216078 | | | 10/2020 | |
| WO | 2024076387 | | | 11/2024 | |

OTHER PUBLICATIONS

Stokes, et al. "Preventing Machine Learning Poisoning Attacks Using Authentication and Provenance", MILCOM 2021—2021 IEEE Military Communications Conference (MILCOM), 2021, pp. 181-188. (Year: 2021).

* cited by examiner

KERNEL-ENFORCED AUTHENTICATION FOR LEDGER-REGISTERED AI AGENTS

CROSS-REFERENCE TO RELATED APPLICATION(S)

This application is a continuation-in-part of U.S. patent application Ser. No. 19/574,166, entitled "KNOWLEDGE REGISTRY FOR AGENTIC ARTIFICIAL INTELLIGENCE MODELS STORED ON A DISTRIBUTED NETWORK" and filed Mar. 20, 2026, which is a continuation of U.S. patent application Ser. No. 19/333,600, entitled "KNOWLEDGE REGISTRY FOR AGENTIC ARTIFICIAL INTELLIGENCE MODELS STORED ON A DISTRIBUTED NETWORK" and filed Sep. 19, 2025, which is a continuation-in-part of U.S. patent application Ser. No. 19/288,027, entitled "ENCRYPTED AUTONOMOUS AGENT VERIFICATION IN MULTI-TIERED DISTRIBUTED SYSTEMS ACROSS GLOBAL OR CLOUD NETWORKS" and filed Aug. 1, 2025, which is a continuation-in-part of U.S. patent application Ser. No. 19/217,943 entitled "AUTOMATIC GENERATION AND EXECUTION OF COMPUTER-EXECUTABLE COMMANDS USING ARTIFICIAL INTELLIGENCE MODELS" and filed May 23, 2025. U.S. patent application Ser. No. 19/288,027 is further a continuation-in-part of U.S. patent application Ser. No. 19/179,996 entitled "SYSTEMS AND METHODS FOR DETERMINING RESOURCE AVAILABILITY ACROSS GLOBAL OR CLOUD NETWORKS" and filed Apr. 15, 2025, which is a continuation-in-part of U.S. patent application Ser. No. 19/096,675, entitled "SYSTEMS AND METHODS FOR SECURELY ACCESSING PORTIONS OF RESOURCES ACROSS GLOBAL OR CLOUD COMPUTER NETWORKS", filed Mar. 31, 2025, which is a continuation-in-part of U.S. patent application Ser. No. 19/069,109, entitled "SYSTEMS AND METHODS FOR PROVIDING ON-DEMAND ACCESS TO RESOURCES ACROSS GLOBAL OR CLOUD COMPUTER NETWORKS USING ARTIFICIAL INTELLIGENCE MODELS", filed Mar. 3, 2025, which is a continuation of U.S. patent application Ser. No. 18/923,507, entitled "SYSTEMS AND METHODS FOR PROVIDING ON-DEMAND ACCESS TO RESOURCES ACROSS GLOBAL OR CLOUD COMPUTER NETWORKS USING ARTIFICIAL INTELLIGENCE MODELS", filed Oct. 22, 2024, which is a continuation-in-part of U.S. patent application Ser. No. 18/434,687, entitled "SYSTEMS AND METHODS FOR DETERMINING RESOURCE AVAILABILITY ACROSS GLOBAL OR CLOUD NETWORKS", filed Feb. 6, 2024.

U.S. patent application Ser. No. 19/179,996 is also a continuation-in-part of U.S. patent application Ser. No. 18/920,721, entitled "SYSTEMS AND METHODS FOR DETERMINING RESOURCE AVAILABILITY ACROSS GLOBAL OR CLOUD NETWORKS", filed Oct. 18, 2024, which is a continuation of U.S. patent application Ser. No. 18/434,687, entitled "SYSTEMS AND METHODS FOR DETERMINING RESOURCE AVAILABILITY ACROSS GLOBAL OR CLOUD NETWORKS", filed Feb. 6, 2024.

U.S. patent application Ser. No. 19/333,600 is further a continuation-in-part of U.S. patent application Ser. No. 19/182,585, entitled "DYNAMIC MULTI-MODEL MONITORING AND VALIDATION FOR ARTIFICIAL INTELLIGENCE MODELS" and filed Apr. 18, 2025, which is a continuation of U.S. patent application Ser. No. 18/947,102, entitled "DYNAMIC MULTI-MODEL MONITORING AND VALIDATION FOR ARTIFICIAL INTELLIGENCE MODELS" and filed Nov. 14, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" and filed May 2, 2024, which is a continuation-in-part of U.S. patent application Ser. No. 18/637,362 entitled "DYNAMICALLY VALIDATING AI APPLICATIONS FOR COMPLIANCE" and filed Apr. 16, 2024.

U.S. patent application Ser. No. 18/947,102 is further a continuation-in-part of U.S. patent application Ser. No. 18/782,019 entitled "IDENTIFYING AND ANALYZING ACTIONS FROM VECTOR REPRESENTATIONS OF ALPHANUMERIC CHARACTERS USING A LARGE LANGUAGE MODEL" and filed Jul. 23, 2024, which is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, which is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

U.S. patent application Ser. No. 18/947,102 is further a continuation-in-part of U.S. patent application Ser. No. 18/739,111 entitled "END-TO-END MEASUREMENT, GRADING AND EVALUATION OF PRETRAINED ARTIFICIAL INTELLIGENCE MODELS VIA A GRAPHICAL USER INTERFACE (GUI) SYSTEMS AND METHODS" and filed Jun. 10, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" and filed Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" and filed Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" and filed May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" and filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" and filed Jan. 19, 2023.

This application is further a continuation-in-part of U.S. patent application Ser. No. 19/574,240, entitled "KERNEL-LEVEL MONITORING FOR SOFTWARE APPLICATIONS" and filed Mar. 20, 2026, which is a continuation of U.S. patent application Ser. No. 19/375,898, entitled "KERNEL-LEVEL MONITORING FOR SOFTWARE APPLICATIONS" and filed Oct. 31, 2025. The content of the foregoing applications is incorporated herein by reference in its entirety.

BACKGROUND

An artificial intelligence (AI) agentic model ("agent"), whether autonomous or semi-autonomous, refers to a persistent software entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks.

The actions autonomously executed by agents are responsive to their respective objective functions. For example, an agent's objective function may direct the agent to minimize task completion latency. During autonomous execution, the agent can determine a degree of expected utility of candidate actions by evaluating the actions against the agent's objective function and select executable actions that align with the agent's assigned objectives within the imposed operational constraints or boundaries set by the system the agent is interacting with. However, unlike rule-based programming, AI agents employ machine learning (ML) algorithms to assess data and determine actions based on probabilistic models. While this grants AI agents autonomy for real-time operation, AI agent operations are less transparent than rule-based programming, which can result in unpredictable or unverified behaviors within the system.

Figure 1:
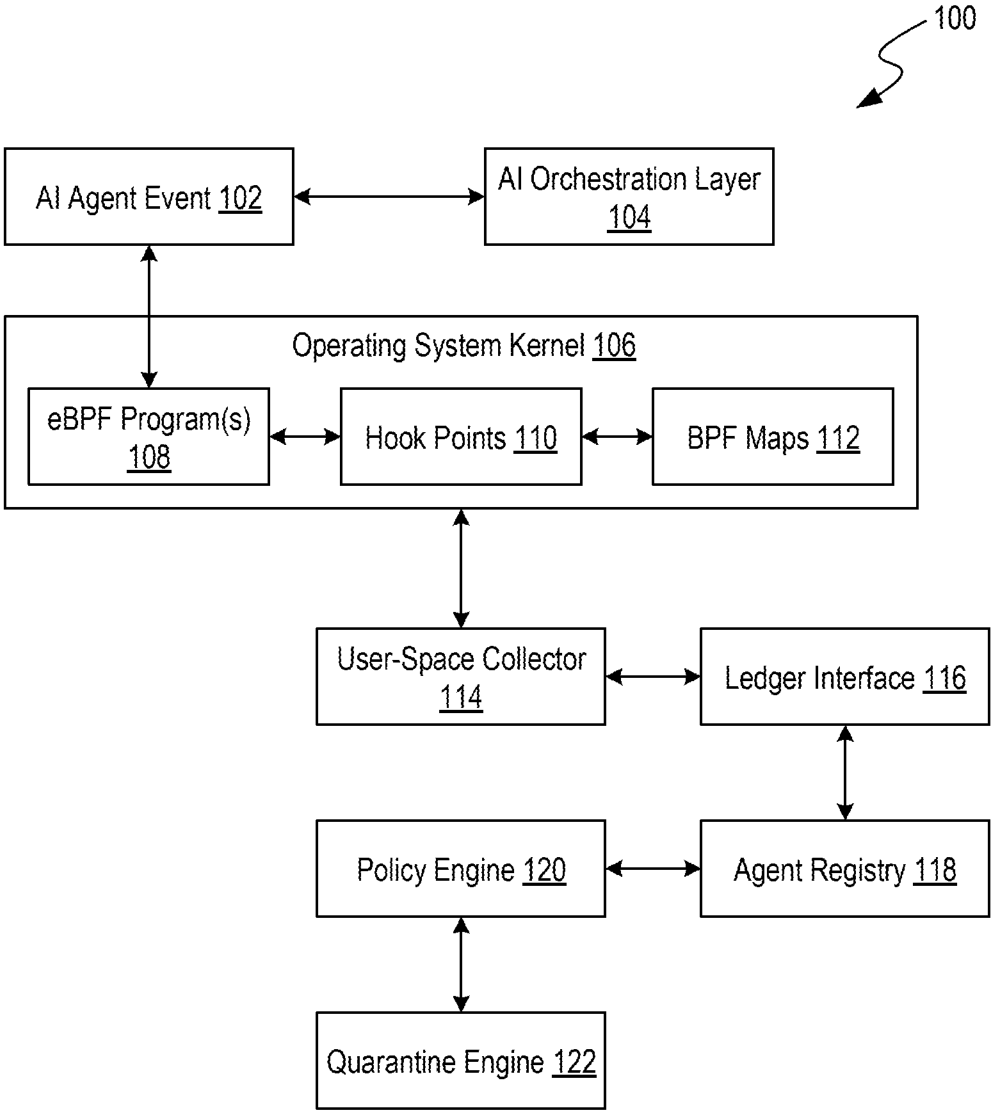
FIG. 1 shows a schematic illustrating an example environment of kernel-level monitoring of ledger-registered agents using a cross-layer management platform, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data are encoded and stored within the model's architecture as parameters, embeddings, and/or latent features. The internal representations enable the model to interpret and generate responses to new inputs by referencing what has been encoded during training. To update the internal representations, the models are retrained or otherwise modified using post-training techniques, such as finetuning, reinforcement learning, etc.

An AI agentic model ("agent"), whether autonomous or semi-autonomous, refers to a persistent software and/or hardware entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query, trigger condition, and so on) to autonomously trigger and manage actions such as API invocations, outbound network requests, updates to internal or external datastores, and other computational tasks. The actions autonomously executed by agents are responsive to their respective objective functions. For example, an agent's objective function may direct the agent to minimize task completion latency. During autonomous execution, the agent can determine a degree of expected utility of candidate actions by evaluating the actions against the agent's objective function and selecting executable actions that align with the agent's assigned objectives within the imposed operational constraints or boundaries set by a system the agent is interacting with.

Distributed AI agent networks introduce additional technical complexity compared to single-agent architectures. In these systems, multiple agents are deployed across a network (often spanning multiple machines, cloud instances, or edge devices), with each agent maintaining its own computational resources (central processing units (CPUs), graphics processing units (GPUs), memory), local knowledge base, and/or processing logic. Agents can communicate using standardized protocols (e.g., Hypertext Transfer Protocol (HTTP), message queues) and can coordinate actions or share state with other agents in the network. Each agent can independently perceive its local environment, make decisions, and execute actions, but also collaborate to achieve shared goals.

When multiple agents operate across separate machines, cloud instances, or container environments, each agent's actions are visible only to the local operating system on which the agent executes. No single participant in the network can independently verify what actions another participant's agent has performed, because the event data generated by each agent resides in the local memory or log files of the host on which the agent runs. User-space monitoring approaches, as described above, are further limited in this context because a compromised agent can alter, suppress, or fabricate its own monitoring data before that data is shared with other participants in the network.

A technical challenge in distributed AI agent networks arises from the conflict between individual agent objective functions and collective network goals. Each agent operates according to its own defined objective function that specifies reward maximization criteria, penalty avoidance thresholds, and/or performance optimization targets based on local computational metrics such as task completion time, resource utilization efficiency, output quality scores, and so forth. The individual objective functions cause agents to seek to maximize their own utility functions without considering network-wide performance metrics. The absence of coordinated reward signals that align individual agent objective functions with collective network goals results in suboptimal resource allocation patterns where agents may hoard computational resources, avoid challenging tasks that could benefit the network, and/or optimize for local performance metrics that conflict with global network efficiency.

These coordination challenges are further compounded by limitations in how agent behavioral records are stored and verified. Existing approaches to producing audit trails of agent behavior typically rely on application-level logging, where the agent itself or a co-located user-space process writes event records to a local or remote log store. However, because these logging operations execute in user space with the same or similar privileges as the monitored agent, the agent can intentionally or unintentionally alter log files, disable logging collectors, spawn alternate processes that bypass logging instrumentation, or otherwise circumvent user-space audit mechanisms. For example, a centralized log store can be modified by the entity that controls the store, and participants in a distributed agent network cannot independently verify that the stored records have not been retroactively altered, deleted, or selectively omitted. This lack of independent verifiability is particularly problematic in multi-organizational deployments where different entities operate different agents, and no single entity can maintain an unbiased record of agent behavior.

Some traditional application monitoring approaches for applications/agents (e.g., software applications, AI agent applications, AI model applications) rely on instrumentation that embed monitoring code directly within the application software through code modification, library injection, and/or runtime hooks that execute alongside the primary application logic. Instrumentation-based monitoring typically require developers to manually insert monitoring calls throughout the application code, with these monitoring functions executing within the same user space process context as the monitored application and relying on user space libraries and frameworks for data collection and analysis. These approaches therefore operate at the application layer of the operating system stack.

However, using these traditional application monitoring approaches, malicious or unauthorized agent behaviors typically are detected only after the actions have already been executed and potentially caused damage to system resources or compromised sensitive data. This delayed detection occurs because traditional monitoring systems operate in user space, and therefore typically require data to be transferred from a lower layer, such as a kernel space, to a higher layer, such as a user space, for evaluation and/or validation. This introduces latencies during which malicious operations can be completed. In some examples, when an application performs a system call, while the operation executes in kernel space, traditional monitoring approaches require the kernel to log event data to user space accessible buffers, and rely on a separate user space monitoring process to detect, retrieve, and evaluate the data. This multi-step process creates a temporal gap where the original agent operation may have already completed its execution of malicious operations before the user space monitoring process can evaluate the behavior and implement protective measures. In some examples, a malicious agent can exploit this latency window by rapidly issuing thousands of individually valid system calls that collectively constitute an attack pattern, such as establishing numerous network connections to exfiltrate data. While each individual system call appears legitimate and executes successfully in kernel space, the user space monitoring process cannot evaluate the aggregate pattern quickly enough to detect the malicious behavior, thereby enabling the malicious agent to complete substantial portions of data theft, privilege escalation, or resource exhaustion attacks before the user space monitoring process recognizes the threat pattern.

Some traditional application monitoring approaches for agent applications and model applications rely on Software Development Kit (SDK) integration techniques that require developers to incorporate third-party monitoring libraries and frameworks directly into their application codebase. SDK-based monitoring, however, creates significant coupling between the application and monitoring infrastructure because the monitoring SDK typically requires the application to load monitoring libraries into its memory space and execute monitoring code within the same process context as the primary application functionality. The tight coupling introduces reliability risks because SDK bugs or failures can crash the entire application. Furthermore, because the monitoring code executes with the same privileges as the application, malicious applications can manipulate monitoring data by calling SDK functions with false information, disabling monitoring components through API manipulation, or otherwise exploiting SDK vulnerabilities to gain unauthorized access to system resources. In addition, applications are rebuilt and redeployed whenever monitoring requirements change, leading to increased development overhead and service disruptions.

Further, some traditional application monitoring approaches for applications rely on agent modification that require direct alteration of the software that embed monitoring functionality within the execution environment (e.g., an agent's execution environment). Agent modification approaches typically include inserting monitoring hooks at specific execution points within the agent code, modifying agent initialization routines to establish monitoring connections, and/or integrating monitoring libraries that execute as part of the agent's process space to collect behavioral data and performance metrics. This approach creates significant deployment challenges because each agent is individually modified. The modification process introduces compatibility risks because monitoring code changes can conflict with agent updates. The approach creates maintenance overhead because monitoring modifications are updated whenever agents are upgraded.

As such, the inventors have developed systems (hereinafter "cross-layer management platform") and related methods to monitor application operations (e.g., an AI application, an agent application, a software application) by loading a monitoring program (e.g., an extended Berkeley Packet Filter (eBPF) program) into a monitoring layer (e.g., the kernel) of an operating system external to the application layer. For example, the monitoring program executes within a virtual machine resident in the kernel. The cross-layer management platform can attach the monitoring program to one or more hook points within the kernel (or other monitoring element) that are associated with execution of an AI agent, such that the monitoring program captures event records directly from the kernel space of the operating system (i.e., a privileged execution environment that is isolated from the user space in which the AI agent operates). Each captured event record can include a process identifier, an operation identifier, a resource identifier, and/or a timestamp. The cross-layer management platform applies one or more hash functions to a representation of the captured event records to generate a cryptographic hash value, and maintains the cryptographic hash value on a distributed ledger within a registry record of the AI agent. The distributed ledger maintains a sequence of registry records that links each registry record to one or more previous registry records, thereby producing a tamper-evident chain of agent behavioral evidence that is independently verifiable by any participant with access to the ledger.

In some implementations, the cross-layer management platform detects anomalous agent operations by evaluating the captured event records against one or more policy constraints stored in a data structure accessible by the kernel. Responsive to detecting an anomalous operation, the cross-layer management platform generates a computer-executable instruction that restricts transmittal of additional operational data to the AI agent. In some implementations, the cross-layer management platform migrates the AI agent to a restricted namespace within the operating system that reduces network egress for the agent. In some implementations, the monitoring program is generated by a machine learning model (e.g., an AI code generation model) that receives a policy specification as input and produces monitoring program code as output.

The cross-layer management platform can operate at the kernel level without awareness or cooperation from the monitored applications (e.g., monitored AI agents) through eBPF or other monitoring programs that execute within the operating system kernel's privileged execution environment to observe agent behavior via system call interception and resource usage monitoring. The cross-layer management platform enables rejection or approval of agent actions with reduced latency through kernel-level decision-making. The cross-layer management platform can thus keep pace with rapidly executing agents. The kernel-level monitoring further prevents monitoring code from interfering with agent functionality because the monitoring programs execute in isolated kernel space that is separate from the agent's user space execution environment. Furthermore, the kernel-level architecture ensures monitoring cannot be disabled or circumvented by agents because user space processes lack the necessary privileges to access or modify kernel memory where the monitoring programs execute.

The kernel-based management platform can apply controls at interfaces that are neither purely application-level nor purely kernel-internal. For example, the platform can intercept a controller API call/invocation before the call causes kernel activity. In some implementations, the cross-layer management platform deploys monitoring and enforcement controls described herein at one or more intermediate processing levels positioned between the operating system kernel and an application layer associated with an AI agent or other monitored application. The intermediate processing levels can include an operating-system service level, a controller or orchestrator level, a compiler or build level, a device driver or hardware-interface level, and so forth. In some implementations, the cross-layer management platform correlates events captured at the intermediate processing levels with kernel-level event records using identifiers such as a common process identifier, thread identifier, cgroup identifier, namespace identifier, container identifier, binary measurement, agent identifier, attestation identifier, and the like. The correlation enables the cross-layer management platform to detect cross-layer patterns that are not observable from any single layer in isolation. For example, if the cross-layer management platform detects that an AI agent opened a network connection to an unapproved IP address (observed at the kernel level via an XDP or TC hook) and read from a restricted file path (observed at the operating-system service level via an LSM hook) within a rolling time window, the cross-layer management platform can trigger an enforcement action based on the combination of these cross-layer events even though neither event in isolation would exceed a policy threshold.

In some implementations, the cross-layer management platform described throughout the description herein operates using an AI-assisted code generation architecture to perform both automated code generation and constraint enforcement. The AI-assisted code generation architecture can maintain code generation components that produce monitoring program code (e.g., using trained neural network models such as InCoder-32B) and/or verification components that validate the generated code against kernel safety constraints (e.g., using the kernel-resident eBPF verifier). The code generation component includes, for example, an LLM trained on code corpora that receives policy specifications as input and generates monitoring program code configured to attach to hook points within the kernel. The verification component can evaluate the generated code against the constraints. In some implementations, the AI code generation model outputs operate as inputs to the kernel verification system, and the kernel verification system is enabled to execute one or more evaluations against the constraints to verify that generated monitoring program code complies with the kernel's verifier requirements before loading into the kernel.

While the cross-layer management platform is described in detail with one or more sequences of operations, the order in which these operations are performed can be modified or rearranged. For example, the cross-layer management platform loads a monitoring program into the kernel before attaching the monitoring program to hook points within the kernel. In another example, the cross-layer management platform captures event records before generating cryptographic hash values over representations of the event records. In some implementations, the cross-layer management platform can perform one or more operations in parallel rather than sequentially by attaching multiple monitoring programs to different hook points concurrently or by generating hash values over batches of event records using parallel processing threads. The specific ordering of operations described in the detailed description and illustrated in the figures represents example implementation sequences, but alternative orderings are additionally within the scope of the disclosed technology.

Further, while the cross-layer management platform is described in detail for monitoring artificial intelligence agents and anchoring event records to a distributed ledger, the cross-layer management platform can be applied, with appropriate modifications, to monitor and/or authenticate diverse application types across various deployment contexts. For example, the cross-layer management platform can be deployed in cloud computing environments where multiple artificial intelligence agents execute within containerized workloads. The examples provided in this paragraph are intended as illustrative and are not limiting. Any other applications or workflows referenced in this document, and many others unmentioned, are equally appropriate after appropriate modifications.

While the current description provides examples related to eBPF programs as kernel-level monitoring mechanisms, one of skill in the art would understand that the disclosed techniques can apply to other forms of kernel-level instrumentation and event capture architectures. Further, while the current description provides examples related to neurosymbolic AI models, generative AI models, LLMs, and agents, one of skill in the art would understand that the disclosed techniques can apply to other forms of machine learning or AI algorithms/models, including unsupervised, semi-supervised, supervised, and reinforcement learning techniques. For example, the disclosed cross-layer management platform can generate outputs using model outputs from symbolic AI models, support vector machine (SVM), k-nearest neighbor (k-NN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean that the specific feature, structure, or characteristic following the phrase is included in at least one implementation of the present technology and can be included in more than one implementation. In addition, such phrases do not necessarily refer to the same implementations or different implementations.

Overview of the Cross-Layer Management Platform

FIG. 1 shows a schematic illustrating an example environment 100 of kernel-level monitoring of ledger-registered agents using a cross-layer management platform, in accordance with some implementations of the present technology. The environment 100 can be implemented using components of example computer system 1600 illustrated and described in more detail with reference to FIG. 16. Likewise, implementations of example environment 100 can include different and/or additional components or can be connected in different ways. The environment 100 illustrates a data flow architecture in which an operating system kernel captures events generated by an artificial intelligence agent and anchors cryptographic representations of those events to a distributed ledger. The environment 100 operates across a kernel space and a user space of an operating system, as described in further detail with reference to FIGS. 9 and 10.

An AI agent event 102 refers to a system-level operation initiated by an AI agent executing in user space. The AI agent can be an autonomous or semi-autonomous software entity that triggers and manages actions such as API invocations, outbound network requests, file system reads and writes, process creation operations, memory allocation requests, and/or updates to internal or external datastores, as described in further detail with reference to the AI/LLM agent layer 902 in FIG. 9. The AI agent event 102 can be generated by a process executed by the AI agent via an AI orchestration layer 104. The AI orchestration layer 104 can coordinate task distribution and resource allocation between client requests and available AI agents within a distributed network, as described in further detail with reference to the AI orchestration layer 614 in FIG. 6. In some implementations, the AI orchestration layer 104 receives task requests from clients, decomposes the task requests into subtasks, selects one or more AI agents from a distributed agent network based on evaluation criteria (such as domain expertise, reputation scores, and/or current availability), and routes the subtasks to the selected AI agents. The AI orchestration layer 104 can translate each routed subtask into one or more system calls that pass through the operating system kernel, at which point the AI agent event 102 becomes observable by kernel-resident monitoring programs.

One or more eBPF programs 108 reside within an operating system kernel 106 and can intercept the AI agent event 102 at one or more hook points 110. The operating system kernel 106 refers to a privileged execution environment where kernel code and device drivers execute with unrestricted access to system resources and hardware components, as described in further detail with reference to the kernel space 906 in FIG. 9. The eBPF programs 108 can be sandboxed programs that are executed within a virtual machine resident in the operating system kernel 106. Prior to loading, each eBPF program 108 can be evaluated by a kernel-resident verifier that constructs a directed graph of all possible execution paths through the program and determines that all paths lead to program termination (e.g., without infinite loops or unbounded recursion), as described in further detail with reference to the eBPF verifier 1012 in FIG. 10.

The one or more hook points 110 are locations within the operating system kernel 106 at which the eBPF programs 108 attach to observe or control execution of the AI agent. In some implementations, the hook points 110 include Linux Security Module (LSM) authorization hooks that intercept particular operations such as file access attempts, network connection requests, and/or privilege modifications before the operating system kernel 106 permits the operations to proceed. In some implementations, the hook points 110 include tracepoints that are statically defined instrumentation points within the operating system kernel 106 and that fire when specific kernel functions execute. The hook points 110 can also include kernel probes (kprobes) that dynamically attach to arbitrary kernel function addresses to intercept function entry and return events. In some implementations, the hook points 110 include express Data Path (XDP) hooks that intercept inbound network packets before the packets enter the kernel network stack and/or cgroup hooks that intercept resource allocation and network operations scoped to a particular control group. Multiple eBPF programs 108 can attach to different hook points 110 simultaneously, such that a first eBPF program intercepts file access operations via an LSM hook while a second eBPF program intercepts network socket operations via a tracepoint.

The eBPF programs 108 use Berkeley Packet Filter (BPF) maps 112 to maintain state across invocations and share data between kernel space and user space. A BPF map 112 is a kernel-resident data structure that persists across multiple executions of an eBPF program and that supports concurrent access by multiple eBPF programs and user space applications. In some implementations, the BPF maps 112 include hash maps that store policy rules indexed by rule identifier, with values containing rule metadata such as memory address ranges, permitted operation types, and enforcement actions. In some implementations, the BPF maps 112 include array maps that store per-agent metadata such as allowed resource sets and policy version numbers using integer indices. In some implementations, the BPF maps 112 include per-CPU maps that provide lock-free concurrent access across multiple processors by maintaining separate data copies for each CPU, thereby reducing contention when multiple eBPF programs 108 write event data simultaneously. In some implementations, the BPF maps 112 include ring buffers that implement circular buffer mechanisms in shared memory regions for lock-free, increased-throughput event streaming from kernel space to user space. In some implementations, the AI code generation model generates the BPF map definitions used by the eBPF programs 108 to maintain per-agent state within the BPF maps 112.

The operating system kernel 106 streams captured event data from the BPF maps 112 to a user-space collector 114. The user-space collector 114 is a daemon process executing in user space that reads event records from the ring buffers of the BPF maps 112 through system call interfaces, normalizes the event records into a canonical format, and generates cryptographic hash values over the normalized event records. To normalize an event record, the user-space collector 114 can extract fields from the raw kernel event data (e.g., a process identifier, a timestamp, an operation type, a resource identifier, a result code) and serializes the extracted fields into a deterministic byte representation such that identical events produce identical byte sequences regardless of memory layout or padding. To generate a cryptographic hash value, the user-space collector 114 applies one or more hash functions such as SHA-256 to the serialized byte representation.

In some implementations, the user-space collector 114 generates a hash chain over a sequence of event records by concatenating a preceding hash value with the byte representation of a subsequent event record and applying the hash function to the concatenation, such that each successive hash in the chain cryptographically binds the current event record to all preceding event records. In some implementations, the user-space collector 114 organizes a batch of event records as leaf nodes of a Merkle tree data structure, generates intermediate hash values by hashing pairs of leaf nodes at each level of the Merkle tree, and produces a Merkle root that summarizes the batch in a single hash value.

The hashed output from the user-space collector 114 can be forwarded to a ledger interface 116. The ledger interface 116 is a software component that writes cryptographic hash values and associated registry metadata to an agent registry 118 and queries verification proofs from the agent registry 118. To write a hash value, the ledger interface 116 can format the hash value, an agent identifier, a timestamp, and/or associated event metadata into a transaction data structure that conforms to the protocol of the agent registry 118, and submits the transaction for validation and storage. In some implementations, the ledger interface 116 submits Merkle roots representing batches of event records rather than individual event hashes, thereby reducing the number of ledger transactions while preserving the ability to verify individual event inclusion via Merkle proofs.

The agent registry 118 is a persistent, append-only data store that maintains a hash-chained sequence of registry records associated with one or more AI agents. In some implementations, the agent registry 118 is a distributed ledger such as a blockchain in which each block contains a cryptographic hash of the previous block, creating an immutable chain where any modification to historical data breaks the cryptographic chain and provides detection of tampering attempts, as described in further detail with reference to the blockchain infrastructure layer 602 in FIG. 6. In some implementations, the agent registry 118 is a federated ledger that is jointly controlled by multiple independent entities and that finalizes updates upon quorum co-signature from participating entities. In some implementations, the agent registry 118 includes an event log that stores timestamped records of all agent operations anchored by their cryptographic hash values, enabling users to reconstruct a complete history of agent behavior by traversing the hash chain from the most recent record back to a genesis record.

The agent registry 118 transmits one or more signals to a policy engine 120 when stored event data satisfies or fails to satisfy one or more predefined conditions. The policy engine 120 evaluates event streams against one or more policy constraints and triggers remediation actions when the policy constraints are violated. In some implementations, the policy engine 120 maintains a set of threshold-based rules that define permitted values (e.g., for operation frequencies, resource consumption rates, network connection counts) and compares incoming event data against the threshold-based rules to identify deviations. In some implementations, the policy engine 120 evaluates attestation records stored in the agent registry 118 by verifying cryptographic signatures to check that behavioral fingerprint hashes match expected baseline values, as described in further detail with reference to the behavioral analysis engine 908 in FIG. 11. When the policy engine 120 determines that an AI agent has violated one or more policy constraints, the policy engine 120 transmits an enforcement instruction to a quarantine engine 122.

The quarantine engine 122 is a restricted runtime context that limits the actions available to an AI agent that has been identified as anomalous by the policy engine 120. In some implementations, the quarantine engine 122 migrates the AI agent to a restricted (e.g., cgroup) namespace within the operating system that denies outbound network connections, limits file system write access to a designated directory, and/or caps CPU and memory allocation to predetermined thresholds. In some implementations, the quarantine engine 122 instructs the eBPF programs 108 to update the BPF maps 112 with deny-list entries that cause subsequent system calls from the quarantined AI agent to receive error codes such as -EPERM before the operating system kernel 106 processes the system calls. In some implementations, the quarantine engine 122 uses XDP programs attached to network interfaces to drop outbound packets originating from the quarantined AI agent at the earliest point in the network stack. The quarantine engine 122 can record each enforcement action as an enforcement record that is cryptographically hashed and anchored to the agent registry 118 via the ledger interface 116, thereby creating a non-repudiable audit trail of one or more restriction and remediation actions taken against the AI agent. In some implementations, the AI code generation model generates enforcement eBPF programs that implement the quarantine actions executed by the quarantine engine 122.

The cross-layer management platform can deploy monitoring and enforcement controls at one or more intermediate processing levels positioned between the operating system kernel and an application layer associated with an AI agent or other monitored application. At an operating-system service level, one or more monitoring programs (e.g., eBPF program(s) 108) can attach to cgroup-related hook points to enforce per-agent resource quotas including CPU quotas, memory ceilings, and/or input/output bandwidth limits. The cgroup hook points can fire when the AI agent's process or container requests resource allocations that are governed by the cgroup to which the agent is assigned. The monitoring programs can compare the requested allocation against per-agent limits stored in a hash map or other data file (e.g., BPF maps 112). When a requested allocation exceeds the per-agent limit, the monitoring program can deny the allocation by returning an error code before the operating system kernel 106 processes the request.

In some implementations, one or more monitoring programs monitor inter-process communication (IPC) channels such as pipes, shared-memory regions, message queues, and/or Unix-domain sockets used by the AI agent to communicate with one or more peer processes. The IPC monitoring programs can attach to kernel functions that mediate data transfer between processes and capture the process identifiers of the sending and receiving processes, the size of the data transferred, and the type of IPC channel used. In some implementations, namespace transitions and container-runtime operations are monitored by attaching monitoring programs to hook points associated with namespace operations. These hook points can fire when a process attempts to change its namespace membership or create a new namespace. The monitoring programs can evaluate the attempted transition against a policy stored in a data file (e.g., BPF maps 112) to detect and prevent unauthorized namespace escape, unauthorized container reconfiguration, and/or unauthorized process migration.

At the controller or orchestrator level, one or more monitoring programs can attach to network hook points to intercept, inspect, and validate messages exchanged between an AI agent and an orchestration controller. The orchestration controller can include a cluster-management server (e.g., a Kubernetes API server), a scheduler, a service-mesh controller, and so forth. When the AI agent transmits a message to the orchestration controller (e.g., a request to modify a deployment), the monitoring program attached to the network hook point inspects the message payload and compares the requested operation against a set of permitted operations stored in a policy map within a data file (e.g., BPF maps 112). Policy enforcement can prevent the AI agent from requesting unauthorized resources by dropping the message at the network hook point before it reaches the orchestration controller. In some implementations, controller-to-agent communications are monitored in the reverse direction to detect unauthorized instruction injection or other operations that fail signature validation.

At the compiler or build level, one or more monitoring programs can monitor execution of compiler, linker, and/or build-tool processes associated with generation of an AI-agent binary, plugin, and/or policy artifact. The monitoring programs attach to hook points (e.g., trace point, LSM) that fire when the compiler or build-tool process performs system calls such as process creation (fork, exec), file reads and writes, environment-variable access, outbound network access, and so forth. The cross-layer management platform evaluates these events against a build-process policy stored in a data file (e.g., BPF maps 112) to detect anomalous build behavior such as a compiler process making unexpected outbound network connections (which may indicate a supply-chain compromise). In some implementations, the cross-layer management platform intercepts execution events for a newly compiled binary and verifies a binary measurement or signature before permitting execution. The binary measurement refers to a cryptographic hash of the compiled binary's content, and the cross-layer management platform compares the binary measurement against an allowlist of approved measurements stored in a hash map of a data file (e.g., BPF maps 112), as described with reference to the attestation generation engine 206 in FIG. 2. If the binary measurement does not match any entry in the allowlist, the monitoring program denies the execution call by returning an error code.

At the device driver or hardware-interface level, one or more monitoring programs can monitor device I/O operations associated with an AI agent. The monitoring programs attach to hook points (e.g., tracepoint or kprobe) within the kernel's device driver subsystem that fire when the AI agent's process issues I/O operations to a device file or device driver interface. The monitored device interfaces can include GPUs, accelerator devices, robotics interfaces, sensors, storage controllers, network interfaces, and so forth. The cross-layer management platform evaluates each device I/O operation against a device-access policy stored in a data file (e.g., BPF maps 112) that specifies which device files, command codes, and/or memory mapping ranges are permitted for each agent. Thus, the cross-layer management platform can prevent unauthorized hardware commands (e.g., an agent issuing GPU commands outside its allocated compute partition), unauthorized memory transfers (e.g., an agent mapping device memory regions that belong to another agent's workload), unauthorized data exfiltration (e.g., an agent writing sensitive data to a removable storage device), and other unauthorized operations.

One or more of the monitoring programs (e.g., eBPF programs 108) can be generated by an AI code generation model (e.g., InCoder-32B or similar models). The AI code generation model, for example, receives a policy specification as input and produces, as output, source code for the monitoring programs that is structured to attach to the hook points 110 and capture the event records described above. To generate the source code, the AI code generation model can translate high-level policy intent (e.g., "deny network egress for unregistered agents" or "capture all file write operations by agents in a specified cgroup") into code that implements the policy as concrete hook-level logic. In some implementations, the code-generation model generates one or more intermediate-level instrumentation components that operate at processing levels between the kernel and the application layer.

In some implementations, the code-generation model processes a long-context input such as a policy repository, a multi-file build context, a controller-policy corpus, and/or a cross-layer monitoring specification in a single inference session. For example, the code-generation model can ingest a policy repository that defines enforcement rules for multiple AI agents across multiple hook points and multiple intermediate processing levels, and generate a coordinated set of monitoring programs where each program attaches to a different hook point and shares state through common reference data files (e.g., BPF maps), such that the generated programs collectively enforce the policy repository without requiring a user to manually partition the policy logic across individual programs. The code-generation model can read the policy repository as a single input sequence to identify dependencies between policy rules and generate source code for each hook point that references shared keys (e.g., BPF map keys) consistent with the other generated programs.

In some implementations, the code-generation model generates source code in multiple programming languages and low-level code representations to produce cross-layer instrumentation and enforcement logic. For example, the code-generation model generates eBPF source code for the eBPF programs 108 that execute within the operating system kernel 106, generates C or C++ source code for user-space handlers, and so forth. Each generated artifact can be associated with a different processing level (kernel, user space, compiler, controller) but shares a common policy vocabulary and common schema, such that an event captured by a monitoring program at a kernel hook point can be correlated with an event captured by a compiler plugin at the build level using the same agent identifier.

The code-generation model can generate monitoring programs that maintain per-agent system call counters in per-CPU maps within the reference data files (e.g., BPF maps), where each CPU core increments its own local counter without acquiring a lock, and a periodic timer hook aggregates the per-CPU values into a single total that is exported to user space via a ring buffer when the aggregated total exceeds a reporting threshold. This approach reduces the volume of individual events transmitted from kernel space to user space because the monitoring program exports one aggregated record per reporting interval rather than one record per system call. The code-generation model can generate monitoring programs that correlate events across multiple hook points within a rolling time window stored in a reference data file (e.g., BPF map), such that the program detects cross-layer patterns and triggers an enforcement action when both events occur within the window.

In the scenario of kernel-level monitoring, the AI code generation model can receive, as input, one or more structured policy definitions expressed in a domain-specific language (DSL) that specifies permitted and prohibited agent behaviors. The DSL definitions can enumerate allowed system calls (e.g., read, write, open, close, connect), prohibited network destinations (e.g., IP address ranges or domain names that the agent is not permitted to contact), resource thresholds (e.g., maximum CPU time per scheduling interval, maximum memory allocation per process, maximum I/O bandwidth per second), file system access boundaries (e.g., directory paths that the agent is permitted to read from or write to, and directory paths that are denied), and the like. The AI code generation model can parse the DSL definitions and select one or more hook points appropriate to each policy rule (for example, an LSM hook for file access restrictions). The AI code generation model can generate source code for each selected hook point, such that each generated monitoring program attaches to the selected hook point, reads the corresponding parameters from the intercepted operation (e.g., the file path for a file-open hook), performs a lookup against a BPF map that stores the policy rule's permitted or denied values, and returns an enforcement decision (e.g., allow the operation to proceed or deny the operation). The generated monitoring programs can write captured event data to BPF maps selected based on the access pattern.

Once the AI code generation model produces source code, the source code can be compiled into bytecode using a toolchain targeting the BPF virtual machine (e.g., clang/LLVM with a BPF target) and submitted to the kernel-resident verifier described with reference to the eBPF verifier 1012 in FIG. 10 before loading into the kernel. The verifier can evaluate the bytecode by constructing a directed graph of the possible execution paths through the program and checks that the program satisfies bounded execution constraints (i.e., all execution paths terminate without infinite loops), memory safety constraints (i.e., the program does not read from or write to memory addresses outside its permitted stack, map values, and packet data regions), type safety constraints (i.e., registers maintain correct types throughout all execution paths and are not used in operations incompatible with their current type), helper compliance constraints (i.e., the program invokes only helper functions that are permitted for the program's attach type), and stack limit constraints (i.e., the program's stack usage does not exceed the maximum permitted stack size), and so forth. If the verifier accepts the bytecode, the bytecode can be compiled to native machine code and loaded into kernel memory for attachment to the selected hook points.

If the verifier rejects the bytecode, the verifier can produce a structured rejection report that identifies the violated constraint, the bytecode offset at which the violation was detected, and/or the register state at the point of rejection.

The cross-layer management platform can append the structured rejection report to the original policy specification and feed both back to the AI code generation model as a combined input prompt. The AI code generation model can process the combined input and generate a corrected version of the source code that addresses the specific violation identified in the rejection report. For example, if the rejection report indicates use of a disallowed helper function for the program's attach type, the AI code generation model replaces the disallowed helper with a permitted alternative that achieves the same functional result using only helpers available to the program's attach type. This generate-verify-correct loop can repeat until the verifier accepts the bytecode or until a maximum iteration limit is reached. The cross-layer management platform can apply heuristic pre-processing to the rejection report before feeding it back to the AI code generation model, such as automatically inserting loop bound annotations at bytecode offsets flagged by the verifier or replacing known disallowed helper functions with their permitted equivalents based on a lookup table, to reduce the number of iterations used to produce verifier-compliant bytecode.

After the verifier accepts the bytecode, the cross-layer management platform can "sign" the accepted bytecode before loading it into the kernel. The cross-layer management platform can, in particular, apply a digital signature operation to the bytecode using a private key stored in a kernel-accessible keyring or a hardware security module (HSM), as described with reference to the attestation generation engine 206 in FIG. 2. The signed artifact can include the bytecode, the digital signature, a public key identifier that identifies which signing key was used, a timestamp indicating when the signing occurred, and/or a reference to the originating policy specification from which the bytecode was generated. Before loading the signed bytecode into the kernel, the cross-layer management platform can verify the digital signature by retrieving the corresponding public key and applying the signature verification algorithm to confirm that the bytecode has not been modified after signing and that the bytecode was produced by an authorized component of the cross-layer management platform. If the signature verification fails (e.g., because the bytecode was modified after signing or because the signing key is not present in the set of authorized keys), the cross-layer management platform can reject the bytecode and not load it into the kernel.

The AI code generation model can be further fine-tuned on training data derived from the generate-verify-correct loop described above. The training data can include pairs of policy specifications and corresponding verifier-accepted source code (i.e., source code that the verifier accepted on the first or a subsequent submission), as well as pairs of verifier rejection reports and corresponding corrected source code that resolved the specific rejection identified in the report. By training on these pairs, the AI code generation model can learn to produce source code that passes the kernel verifier on the first submission with increased frequency, because the model internalizes the verifier's constraint patterns (e.g., which loop constructs are bounded, which helper functions are permitted for each attach type, which pointer access patterns satisfy the memory safety checker). The fine-tuning can train the AI code generation model to generate targeted corrections based on the specific type of verifier rejection. Over successive fine-tuning iterations, the number of generate-verify-correct cycles required to produce verifier-compliant bytecode for a given policy specification can decrease.

The authorized signing keys used to sign accepted bytecode can be maintained on the distributed ledger described with reference to the agent registry 118 in FIG. 1. The distributed ledger stores each authorized public key as a registry record that is linked to the agent registry 118 through hash pointers, such that any addition, revocation, or replacement of an authorized signing key is recorded in the ledger's immutable hash chain and is detectable by any participant with access to the ledger. When the cross-layer management platform verifies the digital signature of a signed bytecode artifact before loading, the cross-layer management platform can retrieve the corresponding public key from the distributed ledger and confirm that the public key is present in the current set of authorized signing keys and has not been revoked. This ledger-based key management enables independent verification of program authenticity and integrity across all participants in a distributed agent network, because any participant can query the distributed ledger to confirm that a particular monitoring program was signed by an authorized key, that the key was valid at the time of signing, and that the key has not been revoked or replaced since the signing occurred. If the signing key has been revoked (e.g., because the key was compromised or because the signing entity's authorization was withdrawn), the cross-layer management platform can reject the bytecode even if the signature itself is mathematically valid, because the key is no longer present in the current authorized set maintained on the distributed ledger.

Figure 2:
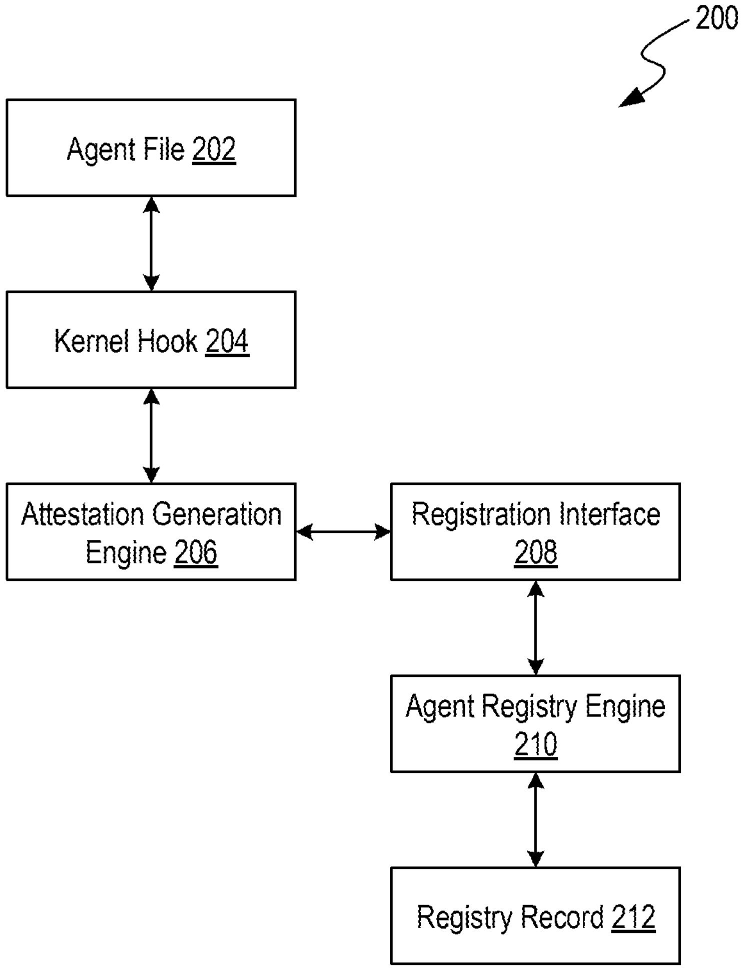
FIG. 2 shows a schematic illustrating an example environment of authenticating and registering agents using a cross-layer management platform, in accordance with some implementations of the present technology.

FIG. 2 shows a schematic illustrating an example environment 200 of authenticating and registering agents using a cross-layer management platform, in accordance with some implementations of the present technology. The environment 200 can be implemented using components of example computer system 1600 illustrated and described in more detail with reference to FIG. 16. Likewise, implementations of example environment 200 can include different and/or additional components or can be connected in different ways.

An agent file 202 refers to a machine-readable artifact that represents the executable code of an AI agent. In some implementations, the agent file 202 is an agent binary, which is a compiled executable file containing the machine instructions that the operating system loads into memory and executes as a process. In some implementations, the agent file 202 is a container image, which is a packaged filesystem snapshot that includes the agent binary together with its runtime dependencies, libraries, and configuration files, and that a container runtime unpacks and executes within an isolated namespace of the operating system. In some implementations, the agent file 202 is a dynamically linked shared object or a script file that an interpreter loads and executes. The agent file 202 can be stored in a local filesystem, a container registry, a remote artifact repository accessible over a network, and the like.

When the operating system initiates execution of the agent file 202, a kernel hook 204 can intercept the execution event before the AI agent begins operating in user space. The kernel hook 204 is an eBPF program attached to a process execution hook point within the operating system kernel 106, as described with reference to the hook points 110 in FIG. 1. In some implementations, the kernel hook 204 attaches to an execve tracepoint, which fires each time the operating system kernel loads a new executable image into a process address space. In some implementations, the kernel hook 204 attaches to a container start event exposed through a cgroup hook, which fires when a container runtime creates a new cgroup and launches a process within that cgroup. When the kernel hook 204 fires, the kernel hook 204 can read process-level metadata directly from kernel data structures. The process-level metadata can include a process identifier assigned by the operating system scheduler, a parent process identifier that identifies the process that spawned the AI agent, a user identifier and group identifier under which the process executes, one or more namespace identifiers that define the isolation boundaries of the process (such as a process identifier (PID) namespace, a network namespace, and a mount namespace), a cgroup identifier that associates the process with a particular resource control group, and so forth. The kernel hook 204 can read the file path of the agent file 202 from the kernel's file descriptor table and access the raw bytes of the executable image through kernel memory addresses to determine a cryptographic hash of the binary content. This cryptographic hash of the binary content operates as a unique fingerprint that binds the specific version of the agent file 202 to the process identity observed by the kernel.

The kernel hook 204 transmits the collected process-level metadata and the cryptographic hash of the binary content to an attestation generation engine 206. The attestation generation engine 206 refers to a software component that constructs a structured identity attestation for the AI agent by assembling the kernel-observed attributes into a deterministic data record. The attestation generation engine 206 can receive the process identifier, the namespace identifiers, the cgroup identifier, the file path, and/or the cryptographic hash of the binary content from the kernel hook 204. In some implementations, the attestation generation engine 206 also receives command-line arguments passed to the agent process and environment variables set at process creation, both of which the kernel hook 204 extracts from the kernel's process control block data structure.

To generate the identity attestation, the attestation generation engine 206 can serialize the received attributes into a canonical byte representation by ordering the fields in a predetermined sequence and/or encoding each field using a fixed-width or length-prefixed format. The attestation generation engine 206 applies one or more cryptographic hash functions (such as SHA-256) to the canonical byte representation to produce an attestation hash that uniquely identifies the combination of the agent's binary content, its process-level identity, and/or the execution context in which it was launched. In some implementations, the attestation generation engine 206 signs the attestation hash using a private key (e.g., stored in a kernel-accessible keyring or a hardware security module), producing a digital signature that binds the attestation to the signing entity and prevents modification of the attestation after creation. The resulting signed attestation includes the attestation hash, the digital signature, the raw attribute fields, and/or a timestamp.

The attestation generation engine 206 transmits the signed attestation as a signed transaction to a registration interface 208. The registration interface 208 is a software component that formats the signed transaction into a ledger-compatible data structure and submits the formatted transaction to the distributed ledger for persistent storage. The registration interface 208 operates in a manner similar to the registration interface 714 described with reference to FIG. 7. The registration interface 208 can encode the signed attestation into a transaction payload that conforms to the protocol of the distributed ledger (e.g., a blockchain transaction format or a federated ledger submission format). The registration interface 208 can append transaction metadata (e.g., a transaction version number, a sender address). In some implementations, the registration interface 208 batches multiple attestation transactions into a single submission to reduce the number of individual ledger writes.

The registration interface 208 submits the formatted transaction to an agent registry engine 210. The agent registry engine 210 can be a smart contract-based system deployed on the distributed ledger that validates incoming attestation transactions and stores the validated attestations as registry records. The agent registry engine 210 can operate in a manner similar to the agent registry engine 604 described with reference to FIG. 6. Upon receiving the formatted transaction from the registration interface 208, the agent registry engine 210 executes one or more validation routines encoded in smart contract logic. The validation routines verify the digital signature of the signed attestation by recovering the public key from the signature and comparing it against a set of authorized signing keys maintained in the smart contract's storage. The validation routines can check that the attestation hash has not been previously recorded in the registry to prevent duplicate registrations of the same agent process. In some implementations, the validation routines can verify that the binary hash contained in the attestation matches an allowlist of approved agent binaries maintained by the smart contract, such that only pre-approved agent code can be registered.

Upon successful validation, the agent registry engine 210 stores a registry record 212 on the distributed ledger. The registry record 212 is a persistent data structure that associates the AI agent's identity with its kernel-observed attributes and the cryptographic attestation. The registry record 212 can include the attestation hash produced by the attestation generation engine 206, the binary hash of the agent file 202, the process-level metadata captured by the kernel hook 204 (the process identifier, namespace identifiers, cgroup identifier), the digital signature, and/or a block timestamp assigned by the distributed ledger. The registry record 212 can be linked to one or more previous registry records through hash pointers maintained by the distributed ledger, as described with reference to the sequence of registry records in FIG. 1, such that any modification to the registry record 212 after storage would break the cryptographic chain and be detectable by network participants. In some implementations, the registry record 212 is organized as a leaf node in a Merkle tree data structure maintained by the agent registry engine 210, enabling verification of the registry record 212 through a Merkle proof without requiring access to the complete registry database. In some implementations, the registry record 212 further includes operational context data such as domain expertise indicators, performance metrics, and/or service level commitments, as described with reference to the agent profile storage 716 in FIG. 7, thereby combining the kernel-level attestation with the application-level agent profile into a single verifiable record.

Figure 3:
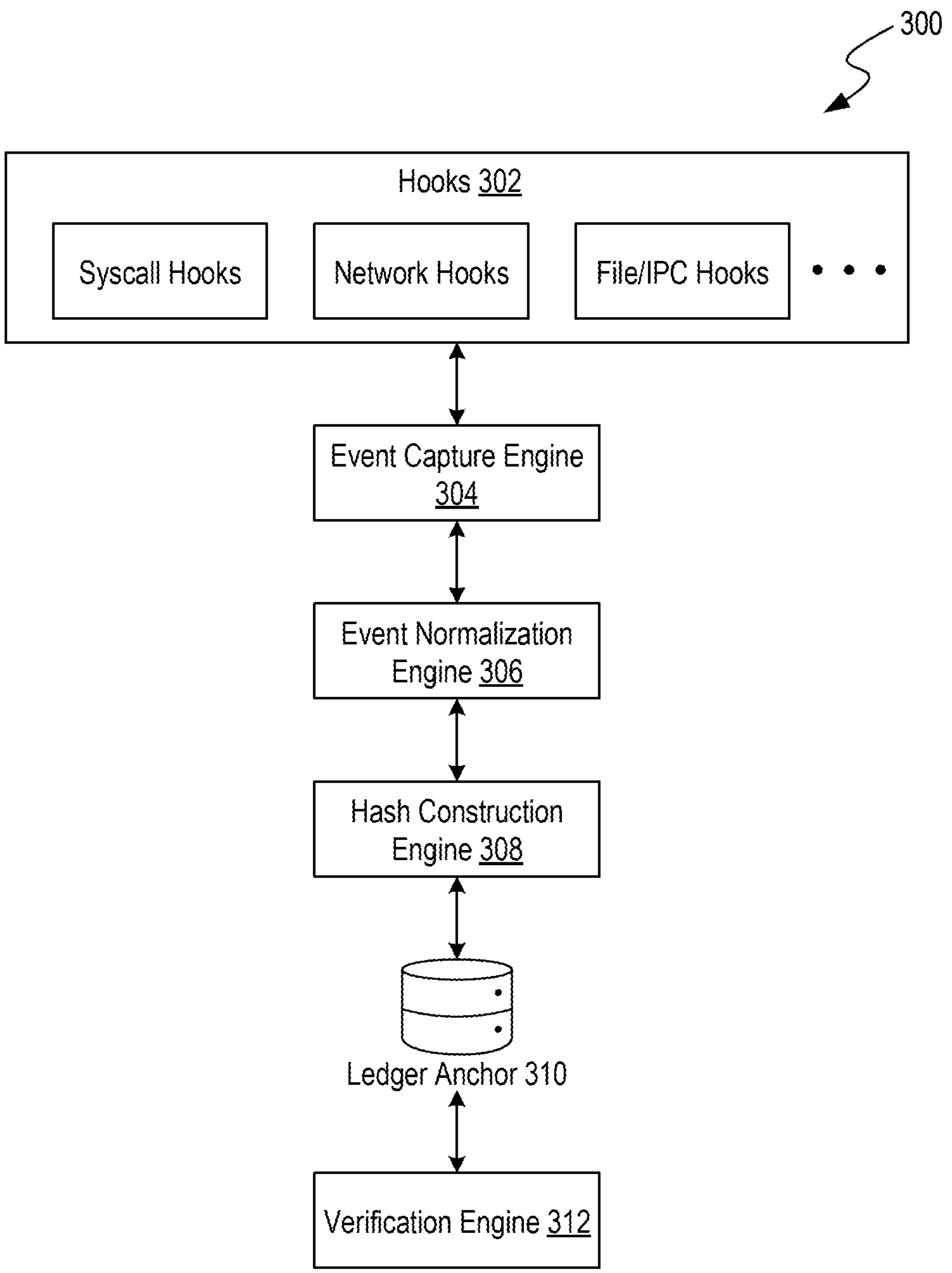
FIG. 3 shows a schematic illustrating an example environment of anchoring events captured using a cross-layer management platform, in accordance with some implementations of the present technology.

FIG. 3 shows a schematic illustrating an example environment 300 of anchoring events captured using a cross-layer management platform, in accordance with some implementations of the present technology. The environment 300 can be implemented using components of example computer system 1600 illustrated and described in more detail with reference to FIG. 16. Likewise, implementations of example environment 300 can include different and/or additional components or can be connected in different ways.

A set of hooks 302 refers to eBPF programs attached to multiple classes of hook points within the operating system kernel 106, as described with reference to the hook points 110 in FIG. 1. Each class of hook can intercept a different category of system operation (e.g., syscall hooks, network hooks, inter-process communication (IPC) hooks, privilege hooks). An event capture engine 304 is a kernel-resident processing stage that can collect the raw event data and associated metadata emitted by the hooks 302. The event capture engine 304 can read event entries from the ring buffers and perf event arrays of the BPF maps 112 as the hooks 302 write them. For each event entry, the event capture engine 304 can extract the raw operation data (e.g., the system call number and arguments, the network addresses and ports, the file path and access mode) and/or process identity metadata. The process identity metadata can include the process identifier assigned by the operating system scheduler, the thread identifier, the user identifier and/or group identifier under which the process executes, the parent process identifier, one or more namespace identifiers that define the isolation context of the AI agent, as described with reference to the kernel hook 204 in FIG. 2, and so forth. In some implementations, the event capture engine 304 performs filtering by evaluating each event entry against a set of filter rules stored in a hash map of the BPF maps 112, and discarding event entries that do not match any monitored agent identifier or that fail to satisfy a particular threshold, thereby reducing the volume of data transmitted from kernel space to user space.

An event normalization engine 306 receives the collected event entries from the event capture engine 304 and transforms each event entry into a canonical event record that conforms to a predetermined schema. The predetermined schema defines a fixed set of fields and a fixed ordering of those fields such that two event entries representing the same operation always produce identical byte sequences after normalization, regardless of differences in memory layout, padding, or byte alignment that may exist in the raw kernel event data. The event normalization engine 306 can serialize each canonical event record into a deterministic byte representation by writing each field in the schema-defined order using fixed-width or length-prefixed encoding, as described with reference to the normalization performed by the user-space collector 114 in FIG. 1.

A hash construction engine 308 receives the serialized canonical event records from the event normalization engine 306 and generates one or more cryptographic data structures that bind the event records into a tamper-evident sequence. In some implementations, the hash construction engine 308 determines a hash chain by processing the canonical event records in chronological order. For each successive event record, the hash construction engine 308 concatenates the hash value of the immediately preceding event record with the serialized bytes of the current event record, and applies a cryptographic hash function such as SHA-256 to the concatenation to produce a new hash value. The first event record in the chain can be concatenated with a predetermined genesis hash value that operates as a known starting point for the chain. The resulting hash chain links each event record to all preceding event records through a sequence of cryptographic dependencies, such that modifying any single event record in the sequence changes its hash value and invalidates all subsequent hash values in the chain.

In some implementations, the hash construction engine 308 instead constructs a Merkle tree over a batch of canonical event records. The hash construction engine 308 assigns each canonical event record in the batch to a leaf node of the Merkle tree by applying the cryptographic hash function to the serialized bytes of the event record to produce a leaf hash. The hash construction engine 308 iteratively combines pairs of leaf hashes at each level of the tree by concatenating two sibling hash values and applying the cryptographic hash function to the concatenation to produce a parent hash, repeating this process at each successive level until a single Merkle root hash remains at the apex of the tree. The Merkle root can summarize the entire batch of event records in a single fixed-length hash value. In some implementations, the hash construction engine 308 generates a digital signature over the hash chain head or the Merkle root using a private key stored in a kernel-accessible keyring or a hardware security module. The resulting signature can be stored alongside the hash value and enables any party with access to the corresponding public key to verify the authenticity of the hash output.

A ledger anchor 310 receives the hash chain head or Merkle root (together with the digital signature, if present) from the hash construction engine 308 and writes the hash value to the agent registry 118 as a persistent, append-only record. The ledger anchor 310 can format the hash value, a timestamp indicating the time range covered by the batch, one or more hash pointers linking the current record to previous records in the agent registry 118, and/or the agent registry identifier of the AI agent into a transaction data structure that conforms to the protocol of the distributed ledger, as described with reference to the ledger interface 116 in FIG. 1. The ledger anchor 310 can submit the formatted transaction to the agent registry 118 for validation and finalization. In some implementations, the agent registry 118 is a blockchain, and the transaction is validated by network consensus operations and recorded in an immutable block that contains a cryptographic hash of the previous block. In some implementations, the agent registry 118 is a federated ledger, and the transaction finalizes upon quorum co-signature from participating federation members. In some implementations, the ledger anchor 310 batches multiple hash values from multiple AI agents into a single ledger transaction to reduce the total number of writes to the distributed ledger.

A verification engine 312 can audit the integrity of event records stored in the agent registry 118 by replaying the cryptographic computations that produced the anchored hash values and comparing the replayed results against the stored values. The verification engine 312 can operate in user space and reads the anchored hash values and associated metadata from the agent registry 118 through query interfaces provided by the distributed ledger.

To perform a hash chain audit, the verification engine 312 retrieves the sequence of canonical event records and the corresponding sequence of hash values from the agent registry 118. For each record in the sequence, the verification engine 312 concatenates the hash value of the preceding record with the serialized bytes of the current record and applies the same cryptographic hash function (e.g., SHA-256) that the hash construction engine 308 used during original construction. The verification engine 312 performs a bitwise comparison between the recomputed hash value and the stored hash value. If the two values match, the record can be confirmed as unmodified. If the two values differ, the verification engine 312 can identify the record as potentially tampered with and/or generate an alert that includes the record's timestamp, agent registry identifier, and the position in the chain at which the discrepancy was detected.

To perform a Merkle inclusion proof, the verification engine 312 retrieves the Merkle root anchored in the agent registry 118 and a Merkle proof for a specific event record. The Merkle proof includes the sibling hashes along the path from the event record's leaf node to the Merkle root. The verification engine 312 determines the leaf hash of the target event record, and iteratively combines the leaf hash with each sibling hash in the proof path by concatenating the two values and applying the cryptographic hash function, proceeding from the leaf level upward until a root value is produced. The verification engine 312 can compare the root value against the published Merkle root stored in the agent registry 118. If the values match, the event record can be confirmed as included in the anchored batch without modification.

In some implementations, the verification engine 312 validates the digital signature stored alongside the anchored hash value by accessing the public key associated with the signing entity to confirm that the hash value was produced by an authorized component of the cross-layer management platform and has not been modified after signing. In some implementations, the verification engine 312 runs on a schedule. In some implementations, the verification engine 312 is invoked on demand by an external user or system that submits a query specifying an agent identifier and a time range, and the verification engine 312 returns a verification report indicating whether event records within the specified time range pass hash chain validation and Merkle inclusion proof checks.

Figure 4:
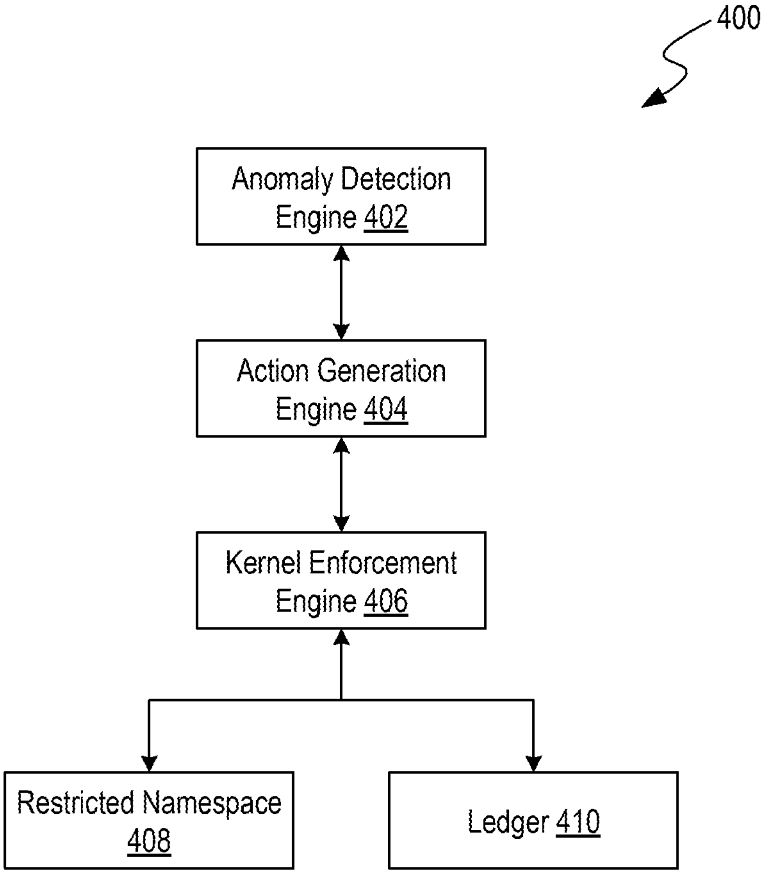
FIG. 4 shows a schematic illustrating an example environment of detecting anomalous agents using a cross-layer management platform to restrict the anomalous agents, in accordance with some implementations of the present technology.

FIG. 4 shows a schematic illustrating an example environment 400 of detecting anomalous agents using a cross-layer management platform to restrict the anomalous agents, in accordance with some implementations of the present technology. The environment 400 can be implemented using components of example computer system 1600 illustrated and described in more detail with reference to FIG. 16. Likewise, implementations of example environment 400 can include different and/or additional components or can be connected in different ways.

An anomaly detection engine 402 refers to a processing component that evaluates incoming event data against one or more detection criteria to determine whether an AI agent's behavior deviates from expected operational patterns. The anomaly detection engine 402 receives the canonical event records produced by the event normalization engine 306 described with reference to FIG. 3. In some implementations, the anomaly detection engine 402 applies rule-based threshold detection by comparing numerical values extracted from event records against predefined limits stored in the BPF maps 112 as described with reference to FIG. 1. The predefined limits can include a maximum permitted number of outbound network connections per time window, a maximum permitted volume of data transferred to external IP addresses per time window, a maximum permitted rate of file system write operations per second, a maximum permitted number of process creation (fork/exec) operations per time window, and so forth. When a numerical value extracted from an event record exceeds the corresponding predefined limit, the anomaly detection engine 402 flags the event record as a threshold violation. In some implementations, the anomaly detection engine 402 applies statistical baseline comparison by determining a feature vector from a sliding window of recent event records and determining a distance metric (such as a Euclidean distance or a Mahalanobis distance) between the computed feature vector and a reference baseline vector stored in a hash map of the BPF maps 112, as described with reference to the behavioral analysis engine 908 in FIG. 9. When the distance metric exceeds a configurable sensitivity threshold, the anomaly detection engine 402 flags the corresponding time window as a baseline deviation. In some implementations, the anomaly detection engine 402 applies machine learning inference by loading trained model weights from a machine learning weights map within the BPF maps 112 and performing a forward pass through a compact neural network directly within kernel space. The neural network receives the feature vector as input and produces an anomaly score as output. When the anomaly score exceeds a decision threshold, the anomaly detection engine 402 classifies the event as anomalous. The anomaly detection engine 402 can apply any combination of these three detection categories simultaneously, such that a single event record can be evaluated against rule-based thresholds, statistical baselines, and machine learning inference in parallel.

When the anomaly detection engine 402 flags an AI agent operation or an AI agent as anomalous, the anomaly detection engine 402 can transmit a trigger signal to an action generation engine 404. The action generation engine 404 refers to a decision component that receives the trigger signal together with contextual metadata about the detected anomaly (including the anomaly type, the anomaly score, the agent identifier, and the event record that triggered the detection) and determines one or more enforcement actions to execute against the flagged AI agent.

The action generation engine 404 can select one or more enforcement actions from a policy table stored in a hash map of the BPF maps 112. The policy table maps anomaly types and severity levels to corresponding enforcement actions (e.g., deny system call, block network action, throttle input/output (I/O) action, terminate process, and so forth). In some implementations, the deny system call action instructs the kernel to return an error code (such as -EPERM) to the AI agent before the operating system kernel 106 processes the requested system call, thereby preventing the operation from executing. The block network action can instruct an XDP program to drop outbound packets originating from the flagged AI agent at the network interface driver level, preventing the packets from entering the kernel network stack. The throttle I/O action can instruct a cgroup eBPF program to reduce the I/O bandwidth allocation for the flagged AI agent to a predetermined fraction of its original allocation, allowing the agent to continue executing at a reduced rate while preventing further resource abuse. The terminate process action can instruct the kernel to send a signal to the AI agent process that terminates the process without allowing the agent to execute cleanup handlers. The action generation engine 404 can select multiple enforcement actions simultaneously for a single anomaly event.

A kernel enforcement engine 406 receives the selected enforcement actions from the action generation engine 404 and executes the actions within the operating system kernel 106. The kernel enforcement engine 406 operates within kernel space and executes enforcement actions through the eBPF programs 108 attached to the hook points 110 described with reference to FIG. 1.

In some implementations, the kernel enforcement engine 406 isolates the flagged AI agent in a restricted namespace 408. The restricted namespace 408 is a restricted execution context (also referred to as an isolation chamber) that limits the actions available to the AI agent while allowing the agent to continue executing in a controlled environment for investigative purposes. To migrate the AI agent to the restricted namespace 408, the kernel enforcement engine 406 reassigns the AI agent's process (or the container in which the AI agent executes) to a new cgroup with a restricted policy set. The restricted policy set denies outbound network connections by applying a cgroup egress filter that drops packets originating from the restricted namespace 408. The restricted policy set can limit file system write access to a designated directory within the restricted namespace 408 by applying LSM hook programs that deny write operations to any file path outside the designated directory. In some implementations, the kernel enforcement engine 406 reassigns the AI agent to a new PID namespace and a new network namespace within the restricted namespace 408, such that the agent can no longer observe other processes on the host or access the host's network interfaces. In some implementations, the kernel enforcement engine 406 prevents the quarantined AI agent from spawning new processes or threads by attaching tracepoint programs to fork, clone, and exec system calls that check the quarantine list and block execution attempts, thereby preventing lateral movement in which a compromised agent attempts to spread by creating additional processes.

In some implementations, the kernel enforcement engine 406 records each executed enforcement action in a ledger 410. The ledger 410 is the agent registry 118 described with reference to FIG. 1, or an enforcement partition within the agent registry 118. To record an enforcement action, the kernel enforcement engine 406 constructs an enforcement record that includes the agent identifier of the flagged AI agent, a timestamp, an anomaly type identifier indicating the category of detected anomaly (e.g., data exfiltration, privilege escalation, resource abuse, lateral movement), an enforcement action identifier indicating the type of action executed, and the like. The kernel enforcement engine 406 can apply one or more cryptographic hash functions (such as SHA-256) to the serialized bytes of the enforcement record to produce an enforcement hash. In some implementations, the kernel enforcement engine 406 includes one or more supporting hashes that link the enforcement record to the hash chain or Merkle tree produced by the hash construction engine 308 described with reference to FIG. 3, thereby cryptographically binding the enforcement action to the specific sequence of agent events that preceded the detection. The enforcement hash and/or the supporting hashes can be transmitted to the ledger interface 116 described with reference to FIG. 1, which formats the hashes into a transaction data structure and submits the transaction to the agent registry 118 for validation and persistent storage.

Figure 5:
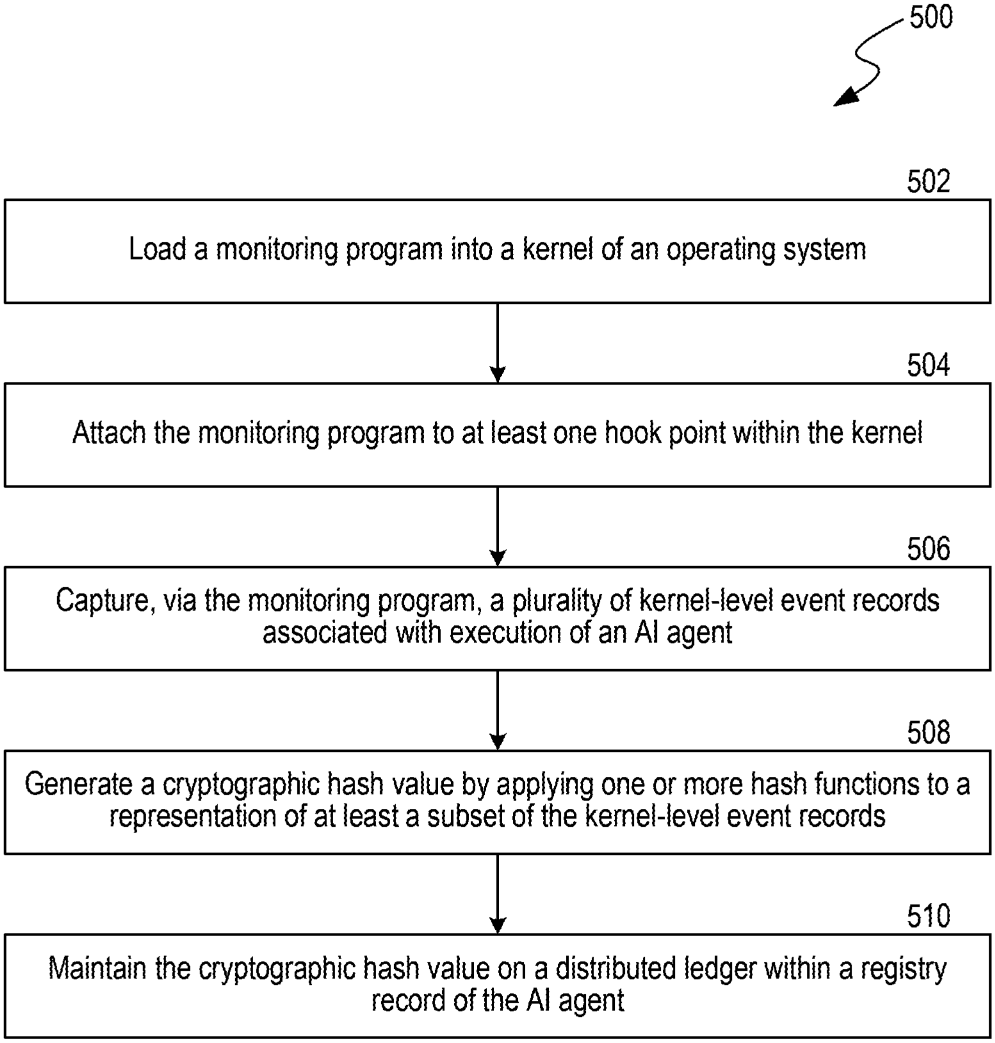
FIG. 5 is a flow diagram illustrating an example process of managing agents using a cross-layer management platform, in accordance with some implementations of the present technology.

FIG. 5 is a flow diagram illustrating an example process 500 of managing agents using a cross-layer management platform, in accordance with some implementations of the present technology. In some implementations, the example process 500 is performed by a system (e.g., the cross-layer management platform) including components of the example computing environment illustrated and described in more detail with reference to FIG. 17. The system can be implemented on a terminal device, on a server, or on a telecommunications network core. Likewise, implementations can include different and/or additional operations or can perform the operations in different orders.

In operation 502, the cross-layer management platform loads a monitoring program into a kernel of an operating system. The monitoring program is structured to execute within a virtual machine resident in the kernel (e.g., the eBPF runtime described with reference to the eBPF programs 108 in FIG. 1). Prior to loading, the monitoring program can be evaluated by a kernel-resident verifier that analyzes one or more execution paths through the monitoring program to determine whether the monitoring program satisfies one or more constraints, as described in further detail with reference to the eBPF verifier 1012 in FIG. 10. The one or more constraints can include a bounded execution of the monitoring program, a restricted access to one or more particular memory regions of the kernel, and/or a termination of the monitoring program within a predetermined number of instructions. In some implementations, the monitoring program is associated with a cryptographic signature generated using a private key, and the cross-layer management platform verifies the cryptographic signature of the monitoring program using a corresponding public key before permitting the monitoring program to load into the kernel, as described in further detail with reference to the attestation generation engine 206 in FIG. 2. Once verified, the monitoring program can be placed into kernel memory, as described in further detail with reference to the eBPF loader 1008 in FIG. 10. In some implementations, the monitoring program is generated by a machine learning model (e.g., an AI code generation model such as InCoder-32B that receives a policy specification as input and produces monitoring program code as output).

In operation 504, the cross-layer management platform attaches the monitoring program to at least one hook point within the kernel. The at least one hook point is associated with execution of an AI agent (e.g., an autonomous or semi-autonomous software entity, also referred to as an AI-based agent). The monitoring program executes within a kernel space of the operating system that is isolated from a user space of the operating system in which the AI agent executes, as described in further detail with reference to the kernel space 906 and the eBPF monitoring layer 904 in FIG. 9. In some implementations, the at least one hook point within the kernel is positioned at a system call entry point or a system call exit point of the operating system (e.g., a tracepoint that fires when the AI agent invokes a system call such as read, write, open, fork, or exec). The at least one hook point can include an LSM authorization hook, a kernel probe, an XDP hook, and/or a cgroup hook, as described in further detail with reference to the hook points 110 in FIG. 1. Multiple monitoring programs can attach to different hook points simultaneously, as described in further detail with reference to the hooks 302 in FIG. 3. In some implementations, the AI-based agent is deployed within a container runtime of the operating system (e.g., a containerized workload that the container runtime unpacks and executes within an isolated namespace, as described with reference to the agent file 202 in FIG. 2).

In operation 506, the cross-layer management platform captures, via the monitoring program, a plurality of kernel-level event records (also referred to as event records) associated with execution of the AI agent. Each kernel-level event record includes a process identifier, an operation identifier (e.g., a system call number or an enumerated operation type such as file read, network connect, or privilege change), a resource identifier (e.g., a file path, a network address and port pair, or a capability name), and/or a timestamp. The monitoring program writes each kernel-level event record into a BPF map that persists across multiple executions of the monitoring program and that supports concurrent access by multiple monitoring programs and user space applications, as described in further detail with reference to the BPF maps 112 in FIG. 1. In some implementations, the monitoring program maintains, in a data structure resident in the kernel, a per-agent state that associates the process identifier of the AI agent with an event count (e.g., a total of intercepted system calls for the agent), a resource consumption metric (e.g., accumulated CPU time, memory allocation totals, or I/O byte counts attributed to the agent), and/or a policy compliance indicator (e.g., a flag or score reflecting whether the agent's recent behavior satisfies or violates one or more policy constraints). The per-agent state persists across multiple invocations of the monitoring program at the at least one hook point, as described with reference to the BPF maps 112 in FIG. 1. The captured kernel-level event records can be normalized into a canonical format by the event normalization engine 306 described with reference to FIG. 3, which serializes each event record into a deterministic byte representation using a predetermined schema that defines a fixed set of fields and/or a fixed ordering of those fields. In some implementations, the cross-layer management platform determines an attestation hash by applying one or more cryptographic functions to a binary image of an executable associated with the AI agent (e.g., the agent file 202 described with reference to FIG. 2), and maintains the attestation hash within the registry record on the distributed ledger, thereby binding the specific version of the agent's executable code to the event records captured by the monitoring program.

In operation 508, the cross-layer management platform generates a cryptographic hash value (also referred to as a cryptographic value) by applying one or more hash functions (e.g., SHA-256), also referred to as one or more cryptographic functions or one or more functions, to a representation of at least a subset of the kernel-level event records. In some implementations, the cryptographic hash value is generated by determining a hash chain over a sequence of the kernel-level event records. Each successive hash in the hash chain is determined over a concatenation of a preceding hash value and a representation of a subsequent kernel-level event record, and the cryptographic hash value maintained on the distributed ledger includes a head of the hash chain, as described in further detail with reference to the hash construction engine 308 in FIG. 3. In some implementations, the cross-layer management platform organizes one or more of the plurality of event records as a set of leaf nodes of a Merkle tree data structure. The cross-layer management platform can determine a set of intermediate hash values by hashing pairs of leaf nodes within the set of leaf nodes at each level of the Merkle tree data structure, thereby producing a Merkle root that summarizes the batch in a single fixed-length hash value, as described in further detail with reference to the hash construction engine 308 in FIG. 3. In some implementations, the cross-layer management platform generates a digital signature over the hash chain head or the Merkle root using a private key stored in a kernel-accessible keyring or a hardware security module.

In operation 510, the cross-layer management platform maintains the cryptographic hash value on a distributed ledger (also referred to as a distributed database) within a registry record (also referred to as a record) of the AI agent. The distributed ledger maintains a sequence of registry records that links the registry record to one or more previous registry records within the sequence of registry records. The cross-layer management platform formats the cryptographic hash value, an agent identifier, a timestamp, and/or one or more hash pointers linking the current registry record to previous registry records into a transaction data structure that conforms to the protocol of the distributed ledger, and submits the transaction for validation and finalization, as described in further detail with reference to the ledger anchor 310 in FIG. 3 and the ledger interface 116 in FIG. 1.

In some implementations, the distributed ledger is a blockchain in which each block contains a cryptographic hash of the previous block, creating an immutable chain where any modification to historical data breaks the cryptographic chain and provides detection of tampering attempts, as described in further detail with reference to the blockchain infrastructure layer 602 in FIG. 6. In some implementations, the distributed ledger is a federated ledger that finalizes updates upon quorum co-signature from participating federation members. The registry record can be verified by the verification engine 312 described with reference to FIG. 3, which replays the cryptographic computations that produced the anchored hash values and compares the replayed results against the stored values to detect any unauthorized modifications.

In some implementations, the cross-layer management platform detects, based on an evaluation of the registry record maintained on the distributed ledger, an anomalous operation associated with the AI agent. The evaluation can include comparing the plurality of kernel-level event records against a reference set of expected event patterns associated with the AI agent (e.g., a baseline behavioral profile maintained in a hash map of the BPF maps 112), as described in further detail with reference to the anomaly detection engine 402 in FIG. 4. The evaluation can include comparing the event records against one or more constraints stored in a data structure accessible by the kernel (e.g., threshold-based rules that define maximum permitted values for operation frequencies, resource consumption rates, and network connection counts).

In some implementations, the cross-layer management platform identifies, based on the plurality of event records, that the AI agent initiated an operation that matches one or more anomaly indicators stored in a data structure accessible by the kernel. Responsive to detecting the anomalous operation, the cross-layer management platform generates a computer-executable instruction structured to restrict transmittal of additional operational data to the AI agent. The computer-executable instruction is a machine-level directive that the operating system kernel executes to block or limit one or more operations of the AI agent, as described in further detail with reference to the action generation engine 404 in FIG. 4.

In some implementations, responsive to a particular event record indicating that the AI-based agent has exceeded a threshold defined by the one or more constraints, the cross-layer management platform causes execution of an action within the kernel that restricts one or more operations of the AI-based agent. The action can include returning an error code (e.g., -EPERM) from the at least one hook point to deny a system call initiated by the AI-based agent before the operating system executes the system call, as described with reference to the kernel enforcement engine 406 in FIG. 4.

In some implementations, responsive to a deviation between the plurality of kernel-level event records and the reference set exceeding a predetermined threshold, the cross-layer management platform migrates the AI agent to a restricted namespace within the operating system structured to reduce network egress for the AI agent (e.g., a restricted cgroup namespace that denies outbound network connections and limits file system write access, as described with reference to the restricted namespace 408 in FIG. 4). The action can also include reassigning the AI-based agent to a restricted network namespace within the operating system that prevents one or more outbound network connections initiated by the AI-based agent.

In some implementations, the kernel is structured to apply one or more access control policies that restrict the AI-based agent from accessing a system path (e.g., a file system directory outside a designated scope), a network address (e.g., an external IP address not present on an approved communication list), and/or a system call, as described with reference to the sandbox eBPF programs. The cross-layer management platform records each enforcement action as an enforcement record that is cryptographically hashed and anchored to the distributed ledger via the ledger interface 116, as described in further detail with reference to the ledger 410 in FIG. 4.

Example Implementations of a Distributed Ledger-Based Knowledge Registry

Figure 6:
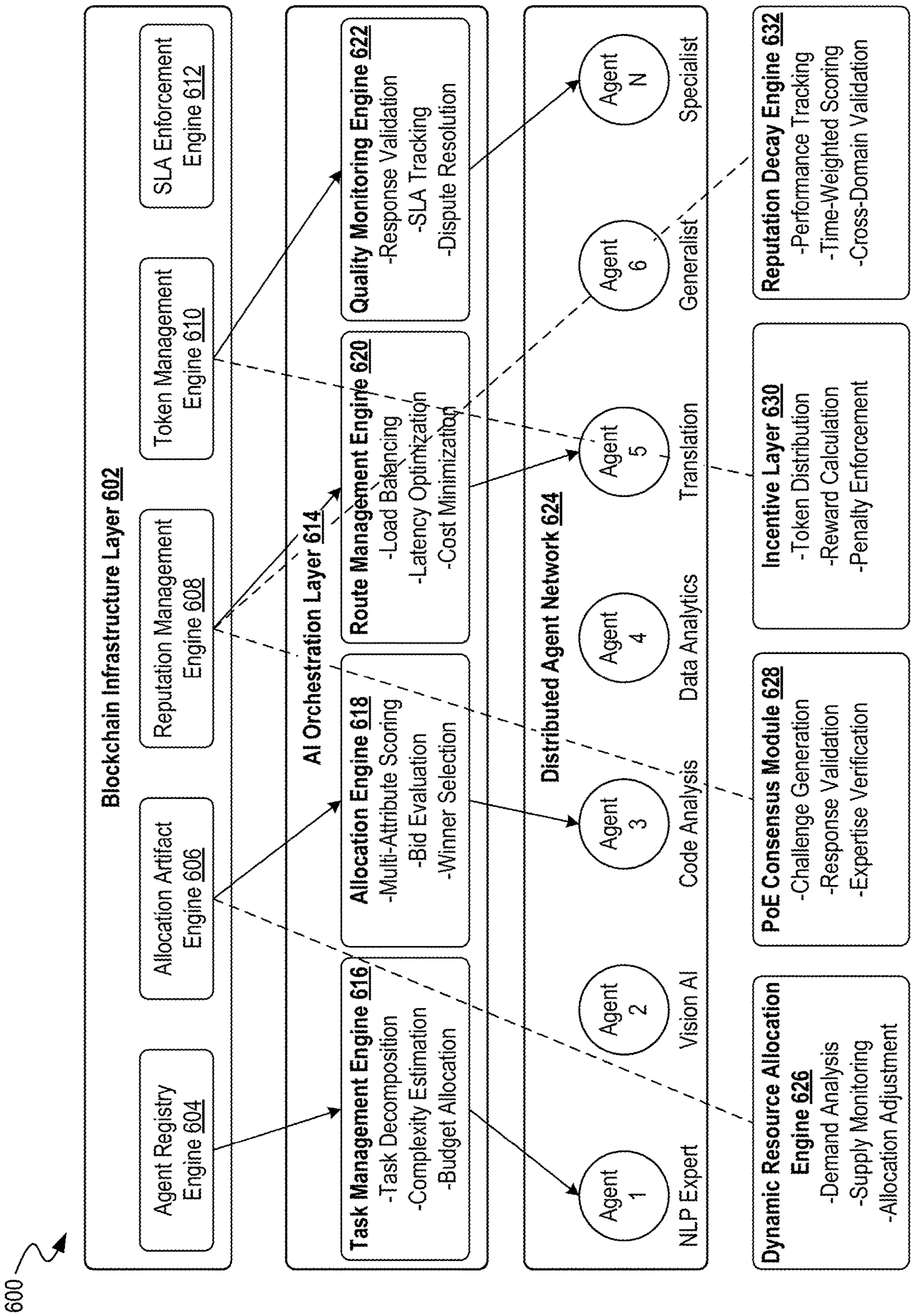
FIG. 6 illustrates an example environment of a knowledge registry for AI-based agents, in accordance with some implementations of the present technology.

FIG. 6 illustrates an example environment 600 of a knowledge registry for AI-based agents, in accordance with some implementations of the present technology. The environment 600 is implemented using components of example AI system 1500 and/or computer system 1600 illustrated and described in more detail with reference to FIG. 15 and FIG. 16, respectively. Implementations of example environment 600 can include different and/or additional components or can be connected in different ways.

The environment 600 includes a blockchain infrastructure layer 602 (that can include an agent registry engine 604, an allocation artifact engine 606, a reputation management engine 608, a token management engine 610, and/or a service level agreement (SLA) engine 612). The blockchain infrastructure layer 602 can be composed of a network of interconnected blockchain nodes that maintain synchronized copies of a distributed ledger containing agent registration data, transaction records, and/or smart contract code. Each blockchain node in the blockchain infrastructure layer 602 can validate new transactions and blocks before adding them to the distributed ledger to prevent unauthorized modifications to agent registry information. The blockchain infrastructure layer 602 stores agent operational contexts as, for example, cryptographically hashed records within blockchain blocks, where each block contains a cryptographic hash of the previous block to create a chain of agent registration and activity data. In some implementations, the blockchain infrastructure layer 602 operates via validator nodes that stake cryptocurrency tokens to participate in block validation and/or via nodes that compete to solve cryptographic puzzles to validate blocks.

The blockchain infrastructure layer 602 includes an agent registry engine 604 that operates as a smart contract-based database system for storing and managing AI agent registration information within the distributed ledger network. The agent registry engine 604 executes smart contract code that defines data structures for agent profiles, such as agent identifiers, domain expertise indicators, performance metrics, and cryptographic credentials used for authentication. When an AI agent submits a registration request, the agent registry engine 604 applies cryptographic hash functions such as SHA-256 or Keccak-256 to convert the agent's operational context data into fixed-length hash values that operate as unique identifiers within the registry.

The agent registry engine 604 organizes these cryptographic hashes using a data structure such as a Merkle tree data structure, where agent profile hashes form leaf nodes, and parent nodes contain hash values computed from their child nodes, thus enabling verification of agent registry data without requiring access to the complete registry database. The agent registry engine 604 enables external systems to search, via query functions, for agents based on domain expertise, availability status, and/or performance thresholds by comparing input hash values against stored registry hashes. In some implementations, the agent registry engine 604 stores agent profiles using InterPlanetary File System (IPFS) distributed storage with hash pointers stored on the blockchain, and/or distributes large agent registry datasets across multiple blockchain nodes.

The blockchain infrastructure layer 602 includes an allocation artifact engine 606 that creates and manages digital artifacts representing resource allocation agreements between AI agents and task requestors. The allocation artifact engine 606 generates allocation artifacts as structured data objects containing task specifications, resource allocation parameters, payment terms, and performance requirements encoded in machine-readable formats such as JavaScript Object Notation (JSON). Each allocation artifact generated by the allocation artifact engine 606 can include cryptographic signatures from participating parties to prevent unauthorized modifications to allocation terms.

The allocation artifact engine 606 can store allocation artifacts within blockchain transactions such that each artifact receives a unique transaction hash that operates as an immutable reference identifier. The allocation artifact engine 606 can track changes to allocation artifacts over time by creating new blockchain transactions that reference previous artifact versions through cryptographic hash pointers. When resource allocation parameters change during task execution, the allocation artifact engine 606 can automatically generate updated artifacts and broadcast them to network participants via blockchain transaction propagation. In some implementations, the allocation artifact engine 606 holds allocated resources until task completion conditions are verified.

The blockchain infrastructure layer 602 includes a reputation management engine 608 that calculates and maintains reputation scores for AI agents based on their historical performance data stored within the distributed ledger network. The reputation management engine 608 can aggregate performance metrics such as task completion rates, quality assessments, response times, and client feedback ratings to generate numerical reputation scores (e.g., discrete scores, continuous scores, categorical scores, binary scores). The reputation management engine 608 can apply one or more exponential decay functions to weigh recent performance data more heavily than historical data using decay constants that reduce the influence of older performance records by predetermined percentages over specified time periods. The reputation management engine 608 can store the reputation score updates as blockchain transactions that include agent identifiers, new reputation values, contributing performance data, and/or timestamps to create an auditable history of reputation changes.

In some implementations, the reputation management engine 608 implements anti-gaming measures by requiring multiple independent performance validations before updating reputation scores and by detecting coordinated manipulation attempts via voting patterns. The reputation management engine 608 can provide reputation query interfaces that enable external systems to retrieve current reputation scores and historical reputation trends for specific agents using their cryptographic identifiers. In some implementations, the reputation management engine 608 uses reputation scores based on peer endorsements and referrals. In some implementations, the agents maintain separate reputation scores for different areas of expertise.

The blockchain infrastructure layer 602 includes a token management engine 610 that controls the creation, distribution, and destruction of cryptocurrency tokens (e.g., computational resources, monetary resources) used for payments and incentives within the distributed agent network. The token management engine 610 can create new tokens according to predetermined supply schedules, inflation rates, or reward distribution rules encoded in smart contract logic. The token management engine 610, in some implementations, permanently removes tokens from circulation by transferring them to unspendable addresses to create deflationary pressure to maintain token value stability. The token management engine 610 enables agents to lock tokens as collateral to participate in network activities, and can confiscate staked tokens when agents violate network rules or performance agreements. The token management engine 610 can automatically adjust token prices based on different supply and demand dynamics. In some implementations, the token management engine 610 uses multi-signature wallets that require multiple cryptographic signatures to authorize large token transfers. In some implementations, the token management engine 610 implements time-locked contracts that release tokens gradually over specified vesting periods.

The blockchain infrastructure layer 602 includes an SLA engine 612 that monitors task execution performance against predefined service level requirements and automatically enforces penalties or rewards based on performance outcomes. The SLA engine 612 stores service level agreements as smart contracts containing performance thresholds, measurement criteria, penalty structures, and reward schedules encoded in executable contract code. The SLA engine 612 can continuously collect performance data from executing AI agents, such as response times, accuracy metrics, resource utilization rates, and task completion status indicators. The SLA engine 612 compares collected performance data against SLA thresholds and triggers automated enforcement actions when performance deviations exceed acceptable tolerance ranges. The SLA engine 612 can automatically deduct tokens from agent accounts or reduce reputation scores when SLA violations occur. In some implementations, the SLA engine 612 increases penalty amounts for repeated SLA violations. The SLA engine 612 can automatically transfer bonus to agents who exceed SLA performance requirements by calculating reward amounts using performance multipliers and bonus schedules defined in the SLA contracts. In some implementations, the SLA engine 612 enables agents to challenge SLA violation determinations through arbitration smart contracts.

The environment 600 includes an AI orchestration layer 614 (that can include a task management engine 616, an allocation engine 618, a route management engine 620, and/or a quality monitoring engine 622) that coordinates task distribution and resource allocation between client requests and available AI agents within the distributed network. The AI orchestration layer 614 receives task requests from clients, analyzes task requirements, identifies suitable agents from the distributed agent network 624, and manages the execution workflow from task initiation through completion. The AI orchestration layer 614 can distribute incoming tasks across available agents. The AI orchestration layer 614 can maintain near-real-time or real-time status information about agent availability, current workloads, and performance capabilities by continuously monitoring agent status updates and performance metrics stored in the blockchain infrastructure layer 602. The AI orchestration layer 614 can automatically reassign tasks to alternative agents when primary agents become unavailable or fail to meet performance requirements during task execution. In some implementations, the AI orchestration layer 614 uses machine learning models to predict a task-agent mapping based on historical performance data and current network conditions.

The AI orchestration layer 614 includes a task management engine 616 that decomposes complex client requests into executable subtasks and determines the computational requirements for successful task completion. The task management engine 616 can parse client requests written in natural language (via natural language processing) and extract structured task specifications such as required capabilities, performance constraints, budget limitations, and/or delivery deadlines. The task management engine 616 can partition complex requests into atomic subtasks, where each subtask represents a discrete unit of work that can be assigned to individual AI agents with specific domain expertise. The task management engine 616 estimates computational requirements for each subtask based on a degree of task complexity (e.g., a size, a number of subtasks), data processing volumes, expected execution times, and resource consumption patterns based on historical task execution data. The task management engine 616 generates task dependency graphs that specify the execution order for subtasks, identifying which subtasks must complete before others can begin, and/or which subtasks can execute in parallel to optimize overall completion time. In some implementations, the task management engine 616 uses recursive decomposition to break large tasks into progressively smaller subtasks until each subtask matches the capabilities of available agents.

The AI orchestration layer 614 includes an allocation engine 618 that selects one or more AI agents for task execution based on multiple evaluation criteria. The allocation engine 618 broadcasts task requirements to eligible agents within the distributed agent network 624 and collects agent proposals (e.g., bid responses) that include proposed pricing, estimated completion times, quality guarantees, and/or resource requirements. The allocation engine 618 can evaluate agent bids across multiple dimensions including cost efficiency, performance history, reputation scores, domain expertise match, and/or current availability status. The allocation engine 618 can assign importance weights to different evaluation criteria based on client preferences and task priorities, and assign composite scores for each bidding agent (e.g., using a weighted sum model). The allocation engine 618 can generate one or more smart contracts that describe the selected agent assignments, including payment terms, performance requirements, delivery schedules, and/or penalty clauses for non-performance. In some implementations, the allocation engine 618 operates under a sealed-bid auction, where agents submit encrypted bids that are revealed simultaneously to prevent bid manipulation.

The AI orchestration layer 614 includes a route management engine 620 that determines one or more task routing paths through the distributed agent network 624 to minimize latency, reduce costs, and balance computational loads across available agents. The route management engine 620 maintains network topology maps that track communication pathways, bandwidth capacities, and/or latency measurements between different agents and network nodes within the distributed system. The route management engine 620 can implement shortest path algorithms such as Dijkstra's algorithm or A* search to calculate routing paths that minimize or otherwise reduce total communication delays and data transfer costs between task initiators and executing agents. The route management engine 620 can monitor current utilization levels across network nodes and redirect task traffic away from overloaded agents toward underutilized agents with available capacity. The route management engine 620 can, in some implementations, connect tasks with agents having the most relevant domain expertise even when alternative paths might offer lower latency or cost by weighing the similarity in domain expertise higher than latency/cost. In some implementations, the route management engine 620 reserves network bandwidth and computational resources along selected paths to guarantee performance levels.

In some implementations, the route management engine 620 (and/or other engines in the environment 600) can be used to enforce anti-money laundering (AML), know your customer (KYC), fraud detection, sanctions compliance requirements, and/or other guidelines. For example, the route management engine 620 can perform validation checks on the task routing paths and/or logic used to determine the task routing paths. In some implementations, registries (e.g., sanctioned entity lists and politically exposed person (PEP) registries) are accessed by the route management engine 620 to verify that the task initiators and/or executing agents satisfy regulatory requirements before establishing routing connections. To validate the task routing paths and/or logic used to determine the task routing paths, the route management engine 620 can cross-reference agent identifiers indicated in the task routing path and/or logic with a predefined list of agent identifiers (e.g., AML watchlists). The route management engine 620 can continuously monitor transaction patterns of the task routing paths to detect suspicious activities (e.g., unusual routing frequencies or locations can be flagged). In some implementations, routing connections to agents that fail compliance checks are automatically blocked by the route management engine 620. The route management engine 620 can generate reports (e.g., compliance reports for regulatory authorities) when violations occur or are detected. In some implementations, audit trails of the compliance validation activities are maintained within the distributed or federated ledger system.

The AI orchestration layer 614 includes a quality monitoring engine 622 that continuously tracks task execution quality, validates outputs against specified requirements, and/or manages dispute resolution when quality issues arise. The quality monitoring engine 622 can evaluate task outputs using predefined quality metrics such as accuracy percentages, completeness scores, format compliance checks, and performance benchmarks. The quality monitoring engine 622, in some implementations, combines multiple independent quality assessment techniques such as rule-based validation, statistical analysis, and machine learning-based quality prediction models. The quality monitoring engine 622 can track quality trends for individual agents over time to enable identification of performance patterns, quality degradation, and so forth. The quality monitoring engine 622 can provide near-real-time or real-time monitoring dashboards (e.g., via a graphical user interface, command line interface, and so forth) that provide visibility into ongoing task execution status, quality metrics, and performance indicators for system administrators. The quality monitoring engine 622 can execute dispute resolution computer-implemented workflows that automatically initiate when quality thresholds are not met, such as evidence collection, stakeholder notification, and arbitration operations to resolve quality disagreements between clients and agents.

The environment 600 includes a distributed agent network 624 that can include a plurality of agents (e.g., "Agent 1," "Agent 2," and so forth) capable of executing specialized tasks and participating in the distributed ledger-based knowledge registry system. The distributed agent network 624 can be associated with AI agents with different capabilities spanning different domains such as natural language processing, computer vision, data analytics, code generation, translation services, and other domain-specific expertise areas. Each agent within the distributed agent network 624 can maintain its own computational resources, knowledge bases, and processing capabilities while participating in the shared network infrastructure for task discovery and execution coordination. The distributed agent network 624 can enable direct agent-to-agent communication for task coordination, capability validation, and/or collaborative problem-solving. In some implementations, the distributed agent network 624 includes specialized agent types such as validator agents that verify other agents' capabilities, orchestrator agents that coordinate complex multi-agent tasks, broker agents that facilitate agent discovery and matching services, and so forth.

The environment 600 includes a dynamic resource allocation engine 626, a proof-of-expert (PoE) consensus module 628, an incentive layer 630, and a reputation decay engine 632. The dynamic resource allocation engine 626 monitors supply and demand patterns across the distributed agent network 624 and automatically adjusts resource pricing and allocation parameters based on changes in the patterns. The dynamic resource allocation engine 626, in some implementations, monitors agent capacity utilization, availability status, and performance capabilities to identify resource bottlenecks and surplus capacity within the network. The dynamic resource allocation engine 626 can automatically adjust base pricing rates, surge pricing multipliers, and volume discounts based on near-real-time or real-time supply and demand conditions using models such as supply-demand curves. The dynamic resource allocation engine 626 can redistribute computational resources, task assignments, and token allocations.

The PoE consensus module 628 validates AI agent capability claims through peer-based challenge-response validation operations executed by validator agents. The PoE consensus module 628 can randomly choose qualified peer agents from the distributed agent network 624 to operate as validators, and can ensure that the validators are associated with a same or similar domain expertise and maintain reputation scores above minimum threshold requirements. The PoE consensus module 628 generates domain-specific challenge problems that test claimed agent capabilities objective performance metrics to determine capability validation outcomes. The PoE consensus module 628 can require agreement from multiple independent validators before accepting or rejecting agent capability claims. The PoE consensus module 628 can maintain validation history records that track the capability validation attempts, outcomes, and/or validator participation to create auditable trails. In some implementations, the PoE consensus module 628 uses stake-based validation where validators risk token deposits on their validation decisions. In some implementations, the PoE consensus module 628 implements recursive validation where validator qualifications are themselves validated by higher-tier validator agents.

The incentive layer 630 manages token distribution, reward calculations, and penalty enforcement to align agent behaviors with network objectives and maintain system integrity. The incentive layer 630 can calculate and distribute token payments to agents based on task completion performance, quality assessments, validation participation, and network contribution metrics. The incentive layer 630 can determine appropriate penalty amounts for various violation types including SLA breaches, false capability claims, validation misconduct, and so forth. The incentive layer 630 can require agents to deposit a token collateral before participating in network activities, and can confiscate staked tokens when agents violate network rules or performance agreements. The incentive layer 630, in some implementations, provides additional token rewards for exceptional performance, innovation contributions, network growth activities, and community building efforts.

The reputation decay engine 632 can implement time-based reputation score adjustments to ensure reputation scores reflect current agent performance rather than outdated historical achievements. The reputation decay engine 632 applies exponential decay functions that gradually reduce the influence of older performance data on current reputation scores, using decay constants that determine how quickly historical performance loses relevance over time. The reputation decay engine 632 can continuously monitor agent activity levels, task completion rates, and quality metrics to identify agents whose performance has declined or who have become inactive. The reputation decay engine 632 can periodically update agent reputation scores based on recent performance data while applying corresponding decay factors to historical performance contributions. The reputation decay engine 632, in some implementations, tracks agent performance across different expertise domains.

In some implementations, the blockchain infrastructure layer 602 is instead implemented as a federated ledger (e.g., of a federated network or system) that is enabled to provide distributed ledger-like guarantees without requiring decentralized blockchain infrastructure. For example, the federated ledger operates as an append-only, hash-chained log that is jointly controlled by multiple independent entities, such as individuals, systems, and/or organizations, where each update replicates to all federation members and finalizes only upon quorum co-signature from participating entities. In some implementations, the data monitoring engine enables the federation (i.e., the entities) to reach agreement on block finality even when some members exhibit malicious behavior, using varying security thresholds.

The federated ledger can use hash chaining and Merkle tree data structures to ensure data integrity across the distributed federation members. Each transaction record generates a cryptographic hash using functions such as SHA-256 or Keccak-256, and transactions can be organized into blocks containing Merkle roots that enable verification of individual transaction inclusion without requiring access to complete block data. A Merkle tree organizes all transactions within a block into a binary tree structure where each leaf node represents a transaction hash and each internal node contains the hash of its two child nodes, with the Merkle root representing the single hash value at the tree's apex that summarizes all transactions in the block. Block headers can be associated with (e.g., include) references to previous block hashes, thus creating an immutable chain where any modification to historical data breaks the cryptographic chain or invalidates Merkle proofs and provides detection of tampering attempts.

To verify that a specific transaction is included in a block, a verifier only needs the transaction hash, the Merkle root from the block header, and a Merkle proof consisting of the sibling hashes along the path from the transaction's leaf node to the root. By computing hash values up the tree (e.g., by combining the transaction hash with each sibling hash in the proof path until reaching a calculated root value) and comparing the hash values with the published Merkle root, the data monitoring engine can confirm transaction inclusion if the values match. Thus, this approach reduces verification overhead from O(n) complexity requiring examination of all n transactions in a block to O(log n) complexity requiring only $\log_2(n)$ hash operations. For example, verifying inclusion in a block containing 1,000 transactions requires only 10 sibling hashes rather than downloading and processing all 1,000 transaction records.

The federated ledger can generate verifiable audit timelines. In some implementations, each finalized block can include an aggregate signature from the required quorum of federation members that confirms the federation approval through single signature validation rather than individual signature checks. In some implementations, the federated ledger periodically publishes the most recent block hash or Merkle root to external blockchain networks or distributed ledgers that ensure that even with member collusion, historical data prior to anchoring cannot be rewritten without detection by external observers. In some implementations, the federated ledger enables independent verification of transaction processing and/or data integrity without relying on individual federation members. Transaction receipts can indicate the transaction hash, Merkle inclusion proof, signed block header, and/or anchor references that collectively operate as cryptographic evidence of transaction processing and finalization.

Figure 7:
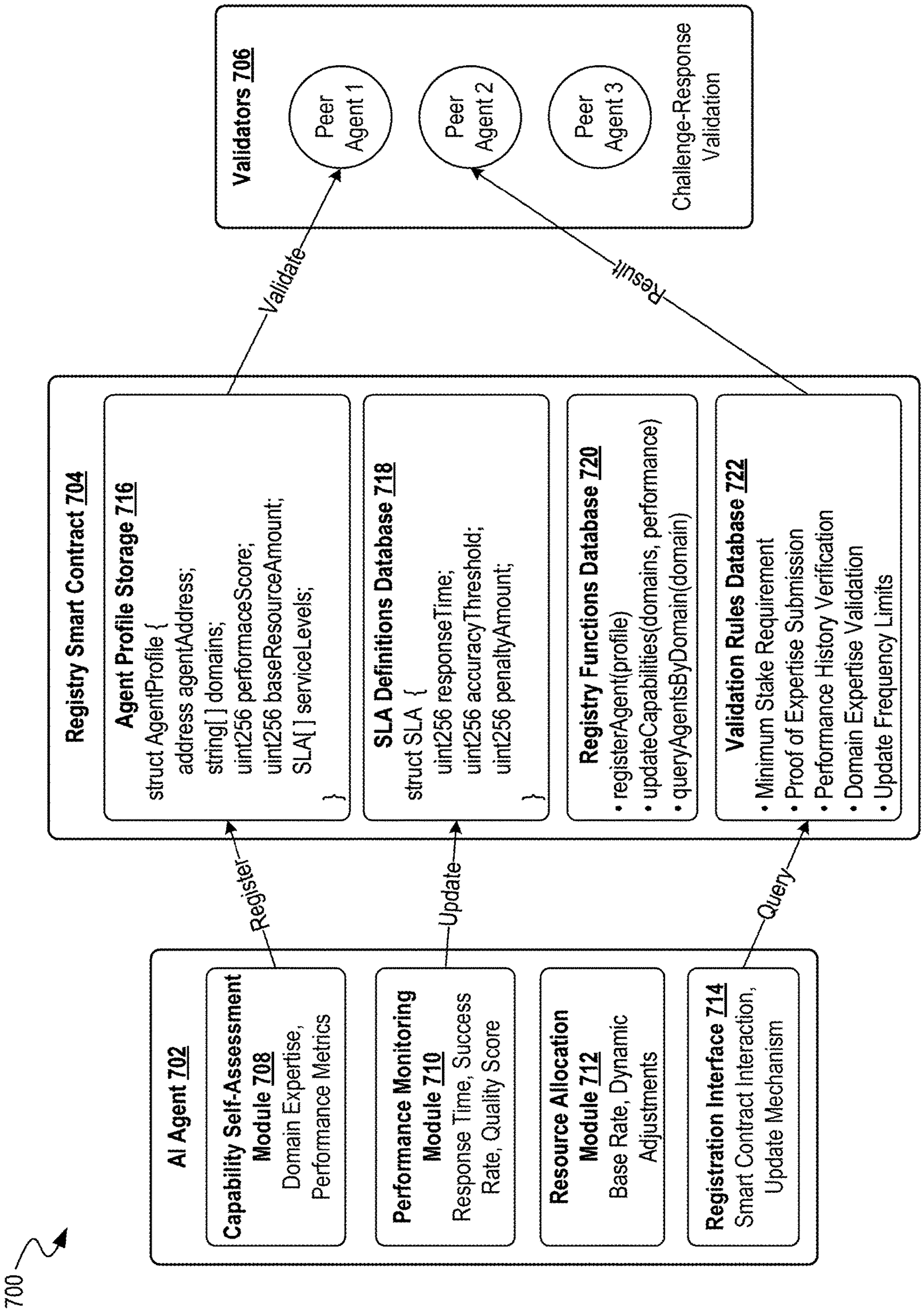
FIG. 7 illustrates an example environment of validating an AI-based agent using a knowledge registry, in accordance with some implementations of the present technology.

FIG. 7 illustrates an example environment 700 of validating an AI-based agent 702 using a knowledge registry, in accordance with some implementations of the present technology. The environment 700 is implemented using components of example AI system 1500 and/or computer system 1600 illustrated and described in more detail with reference to FIG. 15 and FIG. 16, respectively. Implementations of example environment 700 can include different and/or additional components or can be connected in different ways.

The environment 700 includes an AI agent 702 that is validated, using a registry smart contract 704, against validators 706. The AI agent 702 operates as an autonomous (or semi-autonomous) software entity seeking registration within the knowledge registry of the data monitoring engine. The AI agent 702 operates as a computational unit that executes specialized tasks such as natural language processing, computer vision analysis, data transformation, and so forth. The AI agent 702 can maintain its own computational resources including processing units, memory storage, trained model parameters, and knowledge databases that enable independent task execution without requiring external computational dependencies. The AI agent 702 can use communication interfaces that enable interaction with blockchain networks, smart contracts, and other agents. The AI agent 702 can generate cryptographic signatures using private key cryptography to authenticate its identity and authorize transactions within the distributed ledger network, thus ensuring that all agent actions can be verified and attributed to the correct agent entity. The AI agent 702 stores operational context data including domain expertise indicators, performance metrics, pricing parameters, and service level commitments that define its capabilities and operational characteristics within the distributed ledger of the data monitoring engine. In some implementations, the AI agent 702 operates as a containerized application running on cloud computing infrastructure with dedicated CPU and memory allocations. In some implementations, the AI agent 702 operates as a distributed system with processing components spread across multiple geographic locations.

The AI agent 702 can include a capability self-assessment module 708, a performance monitoring module 710, a resource allocation module 712, and/or a registration interface 714. The capability self-assessment module 708 evaluates and documents the agent's own technical capabilities, performance characteristics, and domain expertise areas for registration within the knowledge registry. The capability self-assessment module 708 can test the agent's processing capabilities across different task types, measuring response times, accuracy rates, throughput capacities, and/or resource consumption patterns under various workload conditions. The capability self-assessment module 708 can evaluate the agent's trained machine learning models to identify supported input data formats, output data types, processing domains, and confidence thresholds that define the scope of tasks the agent can execute. The capability self-assessment module 708 generates capability profiles as structured data documents describing domain expertise classifications, performance benchmarks, supported data formats, processing limitations, and/or quality guarantees of the agent. In some implementations, the capability self-assessment module 708 uses standardized benchmark datasets to measure performance across industry-standard evaluation metrics, and/or measures the agent's capabilities relative to other agents in similar domains.

The AI agent 702 includes a performance monitoring module 710 that continuously tracks and records the agent's operational performance metrics during task execution. The performance monitoring module 710 can capture performance metrics such as task completion times, processing accuracy rates, resource utilization levels, error frequencies, and quality scores for each executed task. The performance monitoring module 710 maintains performance history databases that store timestamped performance records. The performance monitoring module 710 can calculate performance averages, standard deviations, confidence intervals, and trend indicators to generate performance summaries/reports and identify unusual performance patterns, processing errors, or capability degradation that indicate an operational problem. The performance monitoring module 710 can generate performance reports as structured data documents containing aggregated metrics, trend analyses, and performance comparisons that demonstrate the agent's operational abilities.

The resource allocation module 712 manages the agent's computational resources, pricing strategies, and/or capacity allocation. The resource allocation module 712 can adjust the agent's service pricing based on current demand levels, resource availability, task complexity, and market conditions. The resource allocation module 712 monitors the agent's computational resource utilization such as CPU usage, memory consumption, storage requirements, and network bandwidth to ensure capacity for committed tasks and prevent resource overallocation. The resource allocation module 712 can predict future resource requirements based on task queue lengths, historical demand patterns, and so forth, in order to allocate computational capacity for specific tasks.

The registration interface 714 manages communication and data exchange between the agent and the registry smart contract 704 during registration, validation, and so forth. The registration interface 714 can format agent data into blockchain-compatible transaction formats and submit transactions to the distributed ledger network. The registration interface 714 generates cryptographic proofs and digital signatures that authenticate the agent's identity and authorize registry operations using public key cryptography and/or digital signatures.

The registry smart contract 704 operates as an autonomous software program deployed on the blockchain infrastructure layer 602 to manage agent registration, validation, and registry maintenance functions without requiring centralized administration. The registry smart contract 704 executes as code stored within blockchain transactions, thus ensuring that registry operations follow predetermined rules and cannot be modified or manipulated by external parties after deployment. The registry smart contract 704 maintains current registry data including agent profiles, validation status, performance metrics, and operational parameters within blockchain storage structures that persist across transaction executions. The registry smart contract 704 processes incoming transactions from AI agents and validators by executing operations according to predefined business rules encoded within the smart contract code. The registry smart contract 704 generates events and notifications that broadcast registry changes, validation outcomes, and operational status updates to associated parties within the distributed network.

The registry smart contract 704 includes an agent profile storage 716 that maintains structured data records containing information about each registered AI agent's capabilities, performance history, and operational parameters within blockchain storage systems. The agent profile storage 716 uses data structures such as mappings, arrays, and so forth that organize agent information into retrievable formats using agent identifiers as keys for data access and modification operations. The agent profile storage 716 stores agent identification data including unique blockchain addresses, cryptographic public keys, and agent metadata within the distributed network. The agent profile storage 716 maintains structured data objects indicating, for example, domain expertise classifications, supported task types, input and output data formats, processing limitations, and performance characteristics that define each agent's operational scope. The agent profile storage 716 can track changes to agent profiles over time, maintaining historical records of capability updates, performance improvements, and operational modifications.

The registry smart contract 704 includes an SLA definitions database 718 that stores SLA templates and performance requirements that define expected requirements and operational commitments for registered AI agents. The SLA definitions database 718 uses data structures that organize service level requirements such as response time thresholds, accuracy minimums, availability guarantees, and quality benchmarks that agents are expected to satisfy. The SLA definitions database 718 can store penalty structures and enforcement rules that specify consequences for SLA violations, such as reputation score reductions, token penalties, and temporary or permanent suspension from registry participation. The SLA definitions database 718 can maintain reward schedules and bonus calculations that define additional compensation for agents who exceed SLA requirements. The SLA definitions database 718 can provide template SLA formats for different service categories, task types, and performance levels.

The registry smart contract 704 includes a registry functions database 720 that contains executable smart contract methods and operational logic to enable agent registration, profile management, validation coordination, and registry query operations. The registry functions database 720 enable registered agents to modify their capability descriptions, performance metrics, pricing parameters, and operational settings. The registry functions database 720 enable external systems to search for (e.g., query) agents based on capability requirements, performance criteria, availability status, and pricing constraints using search parameters and filtering options. In some implementations, the registry functions database 720 uses function libraries that provide reusable code components for common registry operations.

The registry smart contract 704 includes a validation rules database 722 that stores the criteria, procedures, and requirements that govern agent capability validation, peer validator selection, and validation outcome determination within the distributed registry. The validation rules database 722 can define minimum requirements for agent registration such as stake amounts, performance thresholds, domain expertise levels, and/or operational history requirements that agents must satisfy before participating in the registry system. The validation rules database 722 can store validator selection rules that specify how peer validators are chosen for capability validation procedures (e.g., domain expertise requirements, reputation score minimums, geographic distribution preferences). The validation rules database 722 can define how validation challenges are created (e.g., difficulty levels, time constraints, evaluation criteria, evidence requirements). The validation rules database 722 stores penalty and reward rules that define consequences for validation participation.

The validators 706 that operate as qualified peer agents are responsible for evaluating and verifying the capability claims of AI agents seeking registration or validation within the knowledge registry. The validators 706 operate as independent assessment entities that possess demonstrated expertise in relevant domains and maintain reputation scores above minimum threshold requirements to qualify for validation responsibilities. Each peer agent within the validators 706 maintains its own computational capabilities, domain knowledge, and assessment tools that enable independent evaluation of candidate agent capabilities without relying on external validation services or centralized assessment authorities. The validators 706 implement challenge generation functions that create domain-specific tests, problems, and evaluation scenarios designed to assess whether candidate agents possess the capabilities they claim to have within their registration profiles. In some implementations, multiple validators independently assess the same candidate agent and combine their individual evaluations to reach collective validation decisions that reduce bias. The validators 706 maintain validation history records that track, for example, assessment accuracy, participation rates, and consensus alignment to establish their own credibility and qualification.

Figure 8:
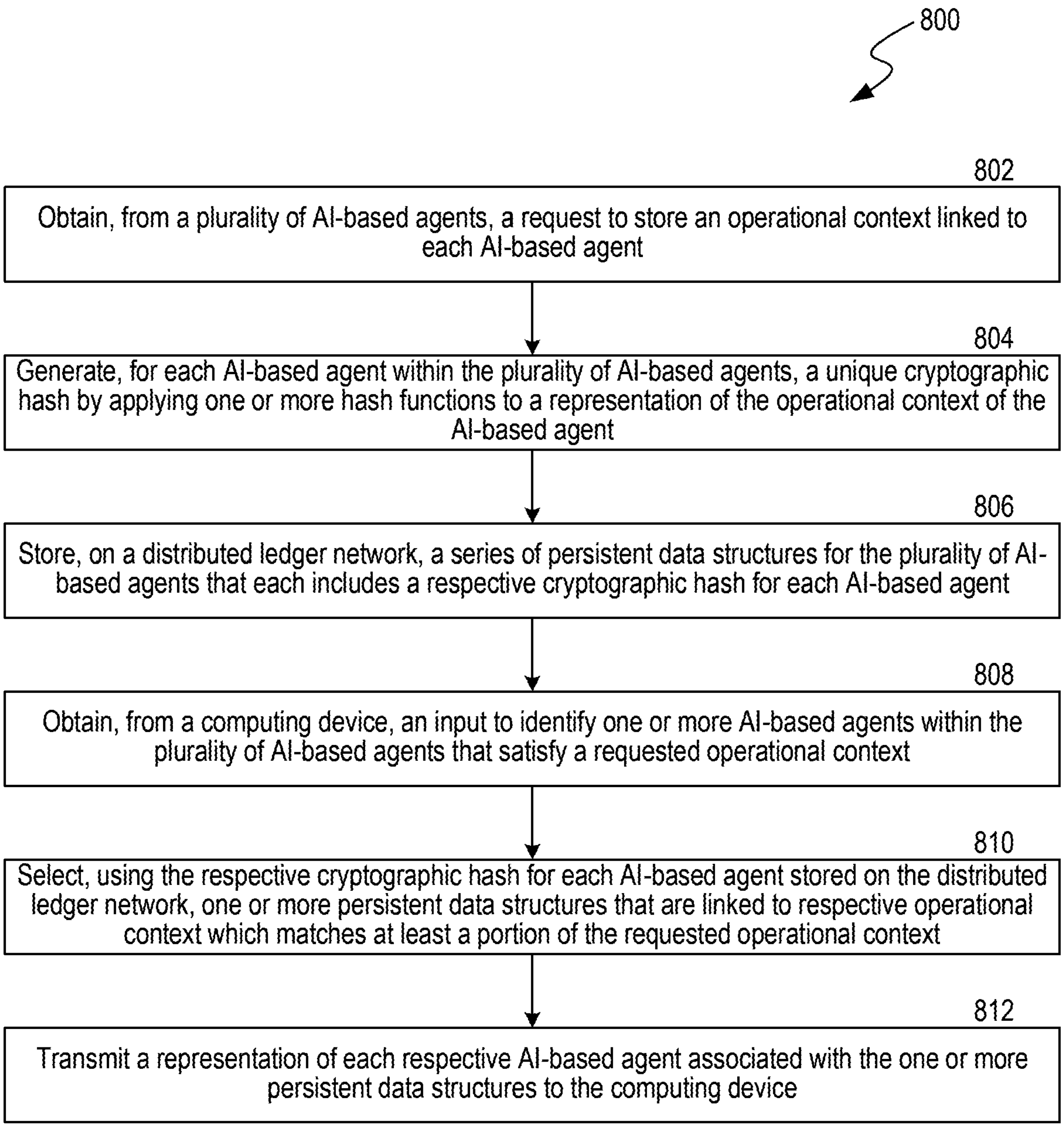
FIG. 8 is a flow diagram illustrating an example process of storing and managing a knowledge registry using a data monitoring engine of the cross-layer management platform, in accordance with some implementations of the present technology.

FIG. 8 is a flow diagram illustrating an example process 800 of storing and managing a knowledge registry using a data monitoring engine within the cross-layer management platform, in accordance with some implementations of the present technology. In some implementations, the process 800 is performed by components of example AI system 1500 and/or computer system 1600 illustrated and described in more detail with reference to FIG. 15 and FIG. 16, respectively. For example, the data monitoring engine can be the same or similar as the example AI system 1500 in FIG. 15. Likewise, implementations can include different and/or additional operations or can perform the operations in different orders.

In operation 802, the data monitoring engine can obtain (e.g., receive, access), from a plurality of AI-based agents, a request (e.g., a registration request) to store an operational context (e.g., an agent identifier, a domain indicator, a data access permission, workflow contribution data, or a cryptographic credential) linked to each AI-based agent.

In operation 804, the data monitoring engine can generate, for each AI-based agent within the plurality of AI-based agents, a unique cryptographic hash by applying one or more hash functions to a representation (e.g., a byte representation) of the operational context of the AI-based agent. The data monitoring engine can, responsive to each AI-based agent satisfying predefined criteria, generate, for each AI-based agent within the plurality of AI-based agents, the unique cryptographic hash. The data monitoring engine can validate compliance against SLAs by verifying the request by evaluating each AI-based agent within the plurality of AI-based agents against predefined criteria. Responsive to each AI-based agent satisfying the predefined criteria, the data monitoring engine can generate, for each AI-based agent within the plurality of AI-based agents, the unique cryptographic hash.

In operation 806, the data monitoring engine can store, on a distributed ledger network (e.g., a blockchain), a series of persistent data structures (e.g., registry records) for the plurality of AI-based agents that each includes a respective cryptographic hash for each AI-based agent and/or a hash pointer that links a particular registry record to a previous registry record stored previous to the particular registry record. In some implementations, the data monitoring engine can verify the registration request by applying a public key associated with each AI-based agent within the plurality of AI-based agents prior to storing the series of registry records on the distributed ledger network.

To record agent activity on the blockchain, the data monitoring engine can detect a transaction or data access of a dataset associated with a particular AI-based agent within the plurality of AI-based agents, and record, on the distributed ledger network, an event record that includes, for example, a timestamp, an identifier of the dataset, and/or a respective registry record of the particular AI-based agent. To update registry records based on changing agent abilities, the data monitoring engine can obtain an updated operational context of a particular AI-agent within the plurality of AI-based agents. The data monitoring engine can update the distributed ledger network by applying the one or more hash functions to a byte representation of the updated operational context of the particular AI-agent to generate a new cryptographic hash, and store an updated registry record on the distributed ledger network that includes the new cryptographic hash.

Each persistent data structure can be linked to a leaf node in a Merkle tree data structure stored across the distributed ledger network. Pairs of persistent data structures can be hashed to generate a subsequent level of the Merkle tree data structure. The data monitoring engine can generate a Merkle proof for a particular leaf node in the Merkle tree data structure by generating a sequence of sibling hashes by traversing the Merkle tree data structure from the leaf node toward the subsequent level of the Merkle tree data structure to retrieve a respective unique cryptographic hash value associated with a corresponding AI-based model linked to a sibling node sharing a common level with the particular leaf node, and aggregating the sequence of sibling hashes from each level to generate an ordered proof list.

In operation 808, the data monitoring engine can obtain (e.g., receive), from a computing device, an input (e.g., a query, a command set, a prompt) to identify one or more AI-based agents within the plurality of AI-based agents that satisfy a requested operational context. The input can be received from an AI model (e.g., a language model), an individual, and/or other automated system. The input can include an authentication credential set. The data monitoring engine can, prior to selecting the one or more persistent data structures, filter the series of persistent data structures based on the authentication credential set.

In operation 810, in response to receiving the input, the data monitoring engine can select, using the respective cryptographic hash for each AI-based agent stored on the distributed ledger network, one or more persistent data structures that are linked to respective operational context which matches at least a portion of the requested operational context. For example, the data monitoring engine can apply the one or more hash functions to a byte representation of the requested operational context of the query to generate a requested cryptographic hash, and compare the requested cryptographic hash of the query to respective unique cryptographic hashes stored in the series of registry records to identify the one or more registry records that are linked to respective operational context which matches at least a portion of the requested operational context.

The data monitoring engine can select the one or more persistent data structures by obtaining a reputation score linked to each persistent data structure of the series of persistent data structures, where the reputation score linked to each persistent data structure is determined based on historical operations executed by a respective AI-based agent associated with the persistent data structure, and prioritizing the series of persistent data structures based on a respective reputation score linked to each persistent data structure. The data monitoring engine can prioritize the series of persistent data structures based on a respective reputation score linked to each persistent data structure.

To only retrieve agents that match an access level of the requestor, the data monitoring engine can, prior to selecting the one or more persistent data structures, filter the series of persistent data structures based on the authentication credential set. To not retrieve agents that are non-compliant, the data monitoring engine can receive an indication of an anomalous operation executed by a particular AI-based agent within the plurality of AI-based agents. Responsive to receiving the indication of the anomalous operation, the data monitoring engine can, prior to selecting the one or more persistent data structures, filter the series of persistent data structures to remove a respective persistent data structure associated with the particular AI-based agent.

Unregistered (non-compliant, non-selected, and so forth) agents attempting to access the distributed network can be automatically denied service by the data monitoring engine. For example, when an agent lacks valid cryptographic credentials or fails to provide verifiable operational context during initial connection attempts, the data monitoring engine can block one or more data traffic transmissions from the agent. The data monitoring engine can grant provisional access to unregistered agents by creating temporary registry entries with limited permissions and/or a restricted operational scope. Provisional agents, for example, receive reduced task allocation priority and are subject to increased monitoring through increased validation frequency and/or stricter performance thresholds. The data monitoring engine can assign provisional reputation scores based on initial assessments and/or require completion/satisfaction of validation tests before granting full network access. Agents that fail provisional evaluation criteria can be permanently blocked from network access and/or their identifiers can be added to exclusion lists stored in the distributed or federated ledger. In some implementations, the data monitoring engine can implement graduated provisional access levels that provide increasing privileges as agents demonstrate reliability and compliance with network standards.

In operation 812, the data monitoring engine can transmit a representation of each respective AI-based agent associated with the one or more persistent data structures to the computing device. The data monitoring engine can update the distributed ledger network by applying the one or more hash functions to a byte representation of an updated operational context of a particular AI-agent to generate a new cryptographic hash, and store an updated registry record on the distributed ledger network that includes the new cryptographic hash. The data monitoring engine can detect a transaction or data access of a dataset associated with a particular AI-based agent within the plurality of AI-based agents, and store, on the distributed ledger network, an event record that includes, for example, a timestamp, an identifier of the dataset, and/or a respective persistent data structure of the particular AI-based agent.

Example Implementations of a Kernel-Based Monitoring of Agents

Figure 9:
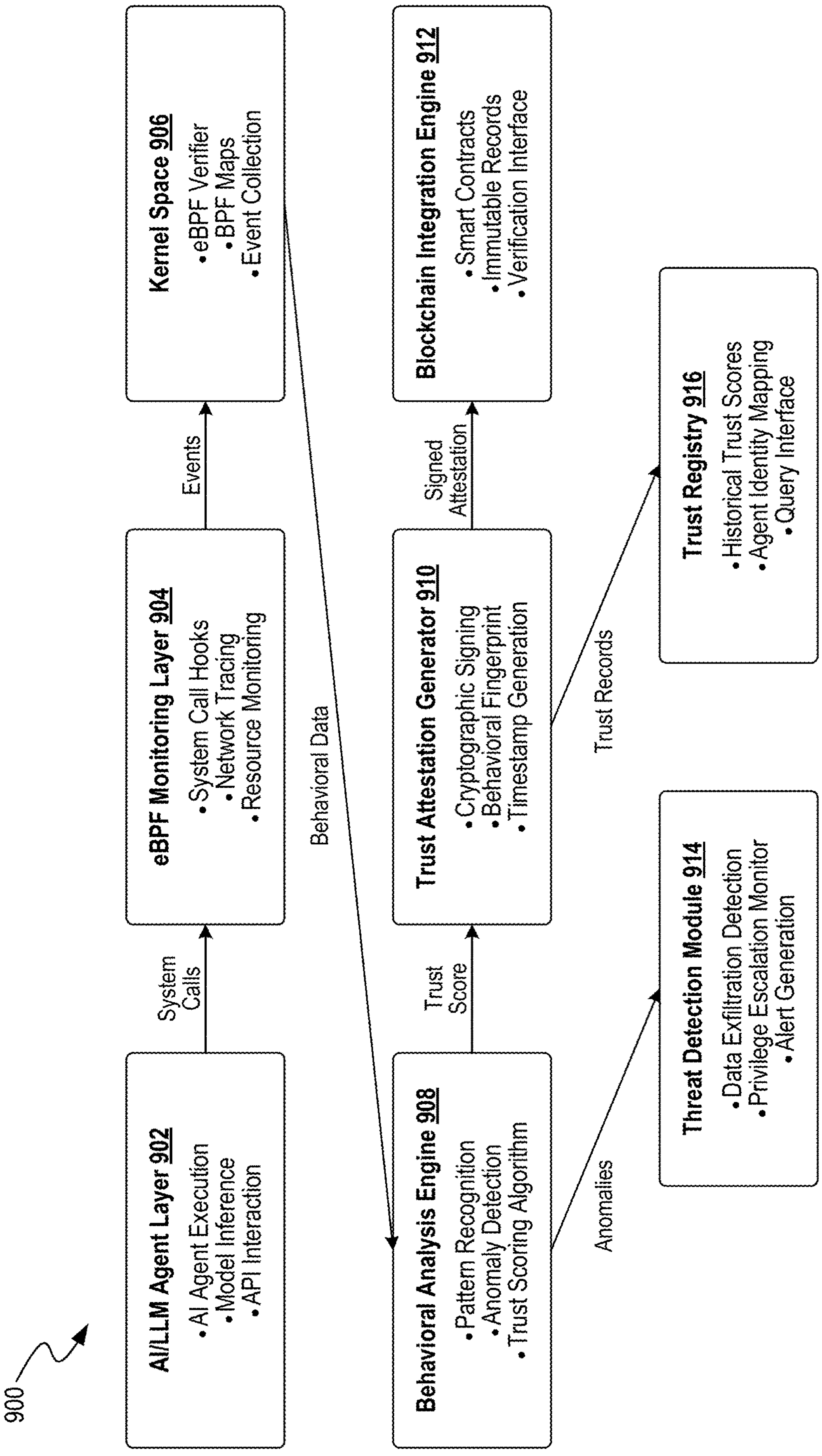
FIG. 9 shows a schematic illustrating an example environment of an architecture of a cross-layer management platform used to monitor AI agents, in accordance with some implementations of the present technology.

FIG. 9 shows a schematic illustrating an example environment 900 of an architecture of a cross-layer management platform used to monitor AI agents, in accordance with some implementations of the present technology. The environment 900 can be implemented using components of example computer system 1600 illustrated and described in more detail with reference to FIG. 16. Likewise, implementations of example environment 900 can include different and/or additional components or can be connected in different ways.

The environment 900 is enabled to capture, analyze, and record AI agent behavior without modifications to the AI agents themselves (e.g., zero-modification). The cross-layer management platform can be implemented in a multi-layered architecture where AI agents (or other applications) operate in user space above an operating system layer, while the monitoring and enforcement functionality (e.g., rules, data, functions) resides within the kernel space that maintains direct access to hardware resources.

The AI/LLM agent layer 902 represents the monitored agents including semi-autonomous AI agents and autonomous AI agents executing their corresponding computational functions, which can include model inference operations that process input data through neural network architectures, API interactions that communicate with external services and data sources, and other computational tasks such as data processing, decision-making algorithms, and/or response generation operations. The agents can operate without awareness of or modification for the cross-layer management platform, i.e., maintaining their original software architecture and execution patterns while the monitoring system observes their behavior through system-level interfaces. AI agents can interact with the kernel through standard system call interfaces that request operating system services such as memory allocation operations that reserve computational resources for model execution, file system operations that read training data or write output results, network socket operations that establish connections to external APIs or data sources, process management operations that spawn child processes or manage execution threads, and so forth. These kernel interactions occur automatically as part of "normal," or non-interfered agent execution and provide visibility into agent behavior without requiring any modifications to the agent software or awareness by the agent of the monitoring infrastructure.

The eBPF monitoring layer 904 is structured to reside between the agent processes and the kernel through eBPF programs that execute within kernel space 906 to intercept and record system calls, network activity, and/or resource usage of the monitored agent(s) or application(s). The eBPF programs can operate as verified code segments that attach to specific kernel events and execute custom monitoring logic whenever agents perform system operations such as file access, network communication, or memory allocation. The monitoring can occur entirely within the kernel space 906, which refers to the privileged execution environment of the operating system where kernel code and device drivers execute with unrestricted access to system resources and hardware components. Kernel space 906 provides visibility into all system operations because every user space process must request kernel services to perform computational work, thereby ensuring that no agent activity can occur without being observable by the cross-layer management platform. The cross-layer management platform therefore reduces tampering possibilities because user space processes cannot directly modify kernel memory or interfere with kernel-level monitoring operations.

In some implementations, the application such as an AI agent operates within a sandbox architecture that uses specialized programs (e.g., eBPF programs) to create isolated execution environments by confining the program to a specific memory region or set of resources it is permitted to interact with. The specialized eBPF programs can execute directly within the kernel, which eliminates (or otherwise reduces) the need for context switches between user space and kernel space (resource-intensive operations). This direct access to kernel data structures and resources significantly reduces overhead and improves performance. However, to protect the kernel, the specialized eBPF programs can only interact with a limited set of kernel functions and data structures (e.g., those exposed through "helper functions"), which thereby restricts the program's potential impact on the kernel. Thus, even if an agent compromises its user space environment or breaks out of traditional container boundaries, the kernel-level management platform continues to restrict access to system resources according to the policies maintained in kernel memory.

The sandbox eBPF programs can attach to hooks (e.g., LSM hooks), system call entry points, network stack interfaces, and so forth, to enforce one or more rules (e.g., policies, conditions) stored in eBPF maps that restrict application operations. The restricted operations can relate to, for example, access to specific file system paths, network destinations, memory regions, hardware resources, and so forth. In some implementations, the sandbox maintains allow-lists and deny-lists in kernel-accessible data structures that define permitted operations for each sandboxed application. Unauthorized system calls can receive error responses (such as -EPERM or -EACCES) before kernel processing begins. In some implementations, multiple applications (e.g., multiple AI agents) can operate within a common sandbox. The sandbox can apply a subset of the rules stored to a particular agent based on, for example, an agent identifier, a domain of the agent, and so forth.

The cross-layer management platform can configure different sandbox environments with rule sets customized to specific agent types, application domains, or security requirements. Different agents can be assigned to different sandbox configurations based on their operational requirements, trust levels, functional categories, or other descriptor, such that, for example, high-privilege agents can be granted broader system access while untrusted or experimental agents operate under more restrictive policies. The sandbox architecture can be extended beyond AI agents to encompass various program types including database applications, web services, computational workloads, and so forth, where each program category receives operational boundaries defined through the rule sets.

The sandbox architecture can implement routing decisions that determine whether specific operations should be processed through operating system interfaces or directed to kernel-level handlers. In some implementations, for individualized operations that require customized handling, such as agent-specific security policies, personalized resource quotas, or otherwise unique operations, the cross-layer management platform routes the requests through user space pathways. Standard operations that are common (or otherwise shared) across application groups, such as routine file read/write operations, can be routed directly through kernel-level handlers that can process these operations with reduced latency by avoiding user space context switches. The cross-layer management platform can use, for example, lookup tables stored in eBPF maps that associate operation types with routing policies, where each entry contains routing flags indicating whether an operation should be handled in user space or kernel space. The cross-layer management platform can dynamically adjust routing decisions based on runtime conditions (e.g., current system load).

The behavioral analysis engine 908 processes the raw event data from the eBPF layer and can identify normal and potentially malicious or otherwise flagged behavior patterns by generating behavioral data using pattern recognition and anomaly detection operations. Pattern recognition operations evaluate sequences of system calls, network connections, and resource usage patterns to identify known behavioral signatures that correspond to legitimate agent activities such as model loading sequences that follow predictable patterns of memory allocation and file access, API communication patterns that demonstrate consistent request-response cycles, or data processing workflows that exhibit regular computational resource usage. The pattern recognition operations can use databases of known "reference" (i.e., satisfactory) behavioral templates to compare observed agent behavior against these templates to determine whether agent actions conform to expected operational patterns.

In some implementations, continuous streams of system calls, network events, and resource usage data are segmented into fixed or sliding time intervals to capture behavioral patterns that unfold over specific durations (e.g., evaluating system calls within 10-second windows to identify burst patterns or sustained activities). Within each time window, the behavioral analysis engine 908 can perform feature extraction by counting the frequency of specific system call types (e.g., number of 'read ( )' calls, 'write ( )' calls, 'connect ( )' calls), measuring resource consumption rates (CPU utilization percentages, memory allocation volumes, network bandwidth usage), and/or identifying sequential relationships between events (such as detecting that 'open ( )' calls are consistently followed by 'read ( )' operations within specific timeframes). The extracted features can be transformed into numerical vectors where each dimension represents a specific behavioral characteristic, thereby enabling comparison operations such as determining the Euclidean distance between current behavior vectors and reference baseline vectors to quantify similarity, and/or applying threshold-based classification where behaviors exceeding predetermined variance limits from reference baseline vectors trigger one or more alerts. The reference baseline vectors can continuously update probability distributions of feature values based on, for example, validated actions (e.g., legitimate actions) performed by the agent.

In some implementations, the behavioral analysis engine 908 uses trained neural networks and/or other statistical models to evaluate behavioral patterns by transforming observed agent activities into feature vectors and generating one or more similarity scores against learned representations of reference (e.g., normal) behavior. The behavioral analysis engine 908 can use one or more supervised learning models trained on labeled datasets of satisfactory and non-satisfactory agent behaviors. The training data can include feature vectors from historical system call sequences. During runtime operation, the machine learning model can receive current behavioral feature vectors as input and perform forward propagation through trained network layers to generate probability scores that indicate the likelihood that observed behavior matches the reference satisfactory operational patterns versus non-satisfactory operational patterns. In some implementations, the behavioral analysis engine 908 combines multiple machine learning models (e.g., decision trees, support vector machines, recurrent neural networks) to generate scores determined using weighted voting or probabilistic fusion of individual model outputs.

The trust attestation generator 910 can use the analyzed behavioral data to create cryptographic signatures of the behavioral data that operate as immutable behavioral fingerprints by applying cryptographic hash functions on the behavioral measurements. The cross-layer management platform can generate hash values of behavioral data structures that indicate agent activities (e.g., system call sequences, network communication patterns, resource usage statistics, and/or timing information), and apply one or more digital signature operations (such as RSA or elliptic curve cryptography) to generate cryptographic signatures that bind the behavioral data to specific time periods and system states. In some implementations, the cryptographic signatures are immutable because they are generated using private keys that are stored and protected from unauthorized access, and modification to the underlying behavioral data would result in signature verification failures that indicate tampering attempts.

The attestations can be submitted to the blockchain integration engine 912, which records the attestations in smart contracts to provide permanent, verifiable records of agent behavior. The cross-layer management platform can format the cryptographic attestations into blockchain transaction data structures that represent the behavioral signatures, timestamps, agent identifiers, and/or associated metadata, and then submit these transactions to blockchain networks where they are validated by network consensus operations and recorded in immutable blocks. Smart contracts can execute automatically when attestations are submitted and perform validation operations that verify cryptographic signatures, check attestation formats, and ensure that behavioral data meets predefined criteria before accepting the attestations into the permanent record. The cryptographic linking between blocks ensures that tampering attempts would be detectable by network participants.

The threat detection module 914 is enabled to continuously or periodically evaluate behavioral data to identify malicious activities such as data exfiltration, privilege escalation, or unusual resource consumption. The threat detection module 914 can compare current behavioral patterns against databases that contain known indicators of malicious activity, applying machine learning models trained to recognize attack patterns and suspicious behaviors, and/or executing rule-based detection operations that identify specific behavioral sequences associated with security threats. The threat detection module 914, in some implementations, evaluates network communication patterns to identify unusual data transfer volumes, unauthorized connection destinations, or unusual timing patterns that indicate unauthorized data removal. The threat detection module 914 can monitor system call patterns to identify attempts to access restricted resources, modify system configurations, and/or execute privileged operations without proper authorization. In some implementations, the threat detection module 914 can use computational resource usage patterns to identify denial-of-service attacks, cryptocurrency mining activities, or other resource abuse that indicates compromised or malicious agents.

The trust registry 916 can maintain a queryable database of historical trust scores and attestations, which thereby enables verification of agent trustworthiness and longitudinal analysis of behavioral patterns. Historical trust scores represent quantitative assessments of agent reliability determined from behavioral measurements over one or more time periods, and can be weighted such that recent behavior is weighted more heavily than historical behavior. To generate the trust score, behavioral measurements including compliance with expected operational patterns, absence of detected anomalies, successful completion of assigned tasks, and/or consistency of behavioral patterns over time can be weighted and aggregated. The trust registry 916 can use indexed data structures that enable retrieval of trust information based on agent identifiers, time ranges, behavioral categories, and/or trust score thresholds/constraints.

Figure 10:
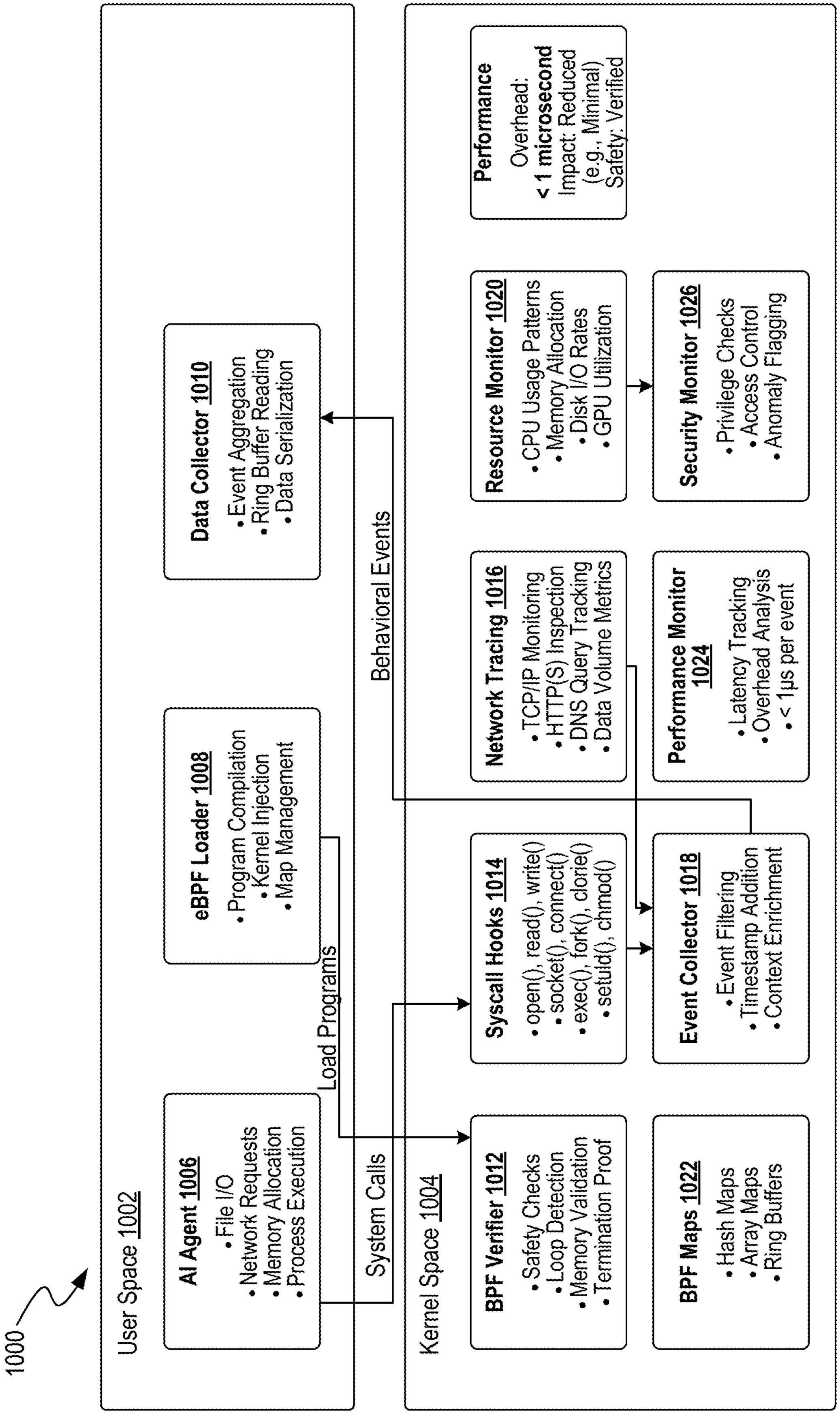
FIG. 10 shows a schematic illustrating an example environment of a monitoring layer used by a cross-layer management platform to monitor AI agents, in accordance with some implementations of the present technology.

FIG. 10 shows a schematic illustrating an example environment 1000 of a monitoring layer used by a cross-layer management platform to monitor AI agents, in accordance with some implementations of the present technology. The environment 1000 can be implemented using components of example computer system 1600 illustrated and described in more detail with reference to FIG. 16. Likewise, implementations of example environment 1000 can include different and/or additional components or can be connected in different ways.

The environment 1000 enables zero-touch behavioral monitoring of AI agents at the kernel level. In some implementations, the environment 1000 uses an eBPF to enable programs to run within the kernel without kernel module compilation or risking kernel crashes. The environment 1000 operates across two different execution spaces including a user space 1002 where AI agent 1006 processes execute with restricted privileges and limited access to system resources, and a kernel space 1004 where eBPF programs monitor these processes with visibility into system operations. User space 1002 represents the unprivileged execution environment where application processes including AI agents run with limited access to system resources and request kernel services through system call interfaces to perform operations such as file access, network communication, or memory allocation. User space processes can operate in virtual memory spaces that are isolated from each other and from kernel memory, thereby providing security boundaries that prevent processes from interfering with system operations or accessing unauthorized resources. Kernel space 1004 represents the privileged execution environment where the operating system kernel and device drivers execute with access to system resources including physical memory, hardware devices, and/or system data structures. Kernel space code can directly manipulate hardware components, access memory locations, and/or control system-wide resources.

An eBPF loader 1008 compiles one or more monitoring programs from high-level source code into eBPF bytecode and injects the compiled programs into the kernel through system call interfaces that transfer the bytecode and associated metadata to kernel memory regions. The cross-layer management platform can parse monitoring program source code and generate intermediate representations that capture program logic and data flow. The cross-layer management platform can parse the monitoring program source code tokenizing the source code into language elements such as keywords, operators, identifiers, and so forth, and construct one or more data structures that represent a structure (e.g., hierarchical structure) of program statements, control flow constructs, data declarations, and the like.

Using the intermediate representations, the cross-layer management platform produces eBPF bytecode instructions that can be executed by the eBPF virtual machine. The data collector 1010 retrieves observed events through ring buffer data structures that provide communication channels between kernel space eBPF programs and user space monitoring applications. Ring buffers implement circular buffer mechanisms in shared memory regions that allow eBPF programs to write event data from kernel space while user space applications read the data without requiring system call overhead for each event transfer. The ring buffer implementation can maintain separate read and write pointers that enable lock-free operations.

Within kernel space 1004, an eBPF verifier 1012 ensures that the monitoring programs are safe, cannot crash the kernel, will terminate, and access permitted memory regions based on an evaluation of the program bytecode before execution. The eBPF verifier 1012, for example, constructs a directed graph of all possible execution paths through the program and verifies that all paths lead to program termination without infinite loops or unbounded recursion. The eBPF verifier 1012 can examine memory operations to ensure the operations access only authorized memory regions while preventing access to protected kernel memory or arbitrary memory locations.

System call hooks 1014 can attach to system calls including file operations, network functions, process creation, and permission modifications through kernel tracepoint mechanisms that execute eBPF programs when specific system calls are invoked. The system call hooks 1014 can register eBPF programs by maintaining lists of programs to execute when particular system events occur. File operation hooks can intercept system calls such as open, read, write, and close operations by attaching to kernel functions that implement the operations, thereby capturing parameters such as file paths, access modes, data sizes, and/or return values. Network function hooks can attach to socket-related system calls (e.g., socket creation, bind operations, connect attempts, and/or data transfer functions) to capture parameters such as network addresses, port numbers, protocol types, and/or data volumes. Process creation hooks can track new process creation (e.g., by monitoring fork, exec, and clone system calls) to capture parameters such as process identifiers, parent-child relationships, executable paths, and/or command line arguments. Permission modification hooks can observe system calls that change security contexts such as file permissions, user privileges, or other security contexts, to capture the specific changes and the processes that initiated them.

A network tracing module 1016 monitors Transmission Control Protocol/Internet Protocol (TCP/IP) traffic, HTTP/HTTPS connections, Domain Name System (DNS) queries, and/or other data volume metrics through eBPF programs that attach to network stack processing functions within the kernel. For example, the cross-layer management platform can attach eBPF programs to kernel functions that process network packets at various layers of the network stack to capture packet headers, payload sizes, source and destination addresses, and connection state information. In some implementations, the cross-layer management platform can evaluate application-layer protocol data by parsing packet contents to extract HTTP request methods, URLs, response codes, and/or other header information. The cross-layer management platform can intercept domain name resolution requests by attaching to kernel functions that handle DNS protocol packets, recording queried domain names, response addresses, and/or query timing information.

A resource monitoring module 1020 tracks CPU usage patterns, memory allocations, disk I/O rates, and GPU utilization via eBPF programs that attach to kernel subsystems related to resource management and/or scheduling. Similarly, to monitor memory allocation, the resource monitoring module 1020 can hook into kernel memory management functions structured to manage virtual memory operations, tracking allocation requests, deallocation operations, memory usage patterns, and/or virtual memory mapping changes. To monitor disk I/O rates, the resource monitoring module 1020 can attach to block device layer functions that manage storage operations to capture parameters such as read and write request sizes, operation latencies, queue depths, and/or throughput measurements. To track GPU utilization, the resource monitoring module 1020 can monitor GPU driver interfaces and observe parameters such as GPU memory allocations, kernel launch parameters, execution times, and/or other GPU utilization metrics.

BPF maps 1022 provide data structures for storing and sharing state between eBPF programs and user space applications through various map types that support different access patterns and use cases. Hash maps can be used to implement key-value storage operations that enable lookup operations for associating process identifiers with behavioral data, storing configuration parameters, and/or maintaining state information that persists across multiple program invocations. Array maps provide indexed data storage for maintaining ordered collections of information such as statistical counters, time series data, and/or fixed-size data structures that can be accessed using integer indices. Ring buffers implement circular buffer operations for streaming event data from kernel space to user space applications. In some implementations, the size of the maps account for a maximum number of agents and a depth of proof chains. Hash maps can scale logarithmically with the number of entries to provide efficient lookup performance (e.g., even with thousands of agents). Ring buffers can be sized to accommodate burst traffic during periods of high billing activity.

An event collector 1018 aggregates and enriches events with timestamps and context information through processing functions that combine raw event data from multiple eBPF programs with additional metadata to create behavioral records. The event collector 1018 can collect related events that occur within specified time windows, correlate events based on process identifiers or other common attributes, and combine multiple data sources to create “snapshots” of agent behavior. To enrich the event, the event collector 1018 can add timestamp information, process names, user identifiers, parent-child relationships, system state information such as current resource utilization levels and active network connections, and so forth.

A performance monitor 1024 ensures the cross-layer management platform maintains a particular latency range such as sub-microsecond response times per event. The performance monitor 1024 can monitor execution times of eBPF programs, track memory usage and allocation patterns to prevent resource exhaustion, monitor system call overhead to ensure that monitoring operations do not impact agent performance (beyond a particular threshold, constraint), and so forth. A security monitor 1026 can validate privilege levels and flag anomalous access attempts. For example, the security monitor 1026 can evaluate credentials against access control lists to verify processes that have appropriate permissions for requested operations. Further, the security monitor 1026 can evaluate current access patterns against established baselines to identify unusual resource access requests that deviate from normal behavioral patterns and flag events such as attempts to access restricted files, establish unauthorized network connections, and/or modify system configurations without permissions.

Figure 11:
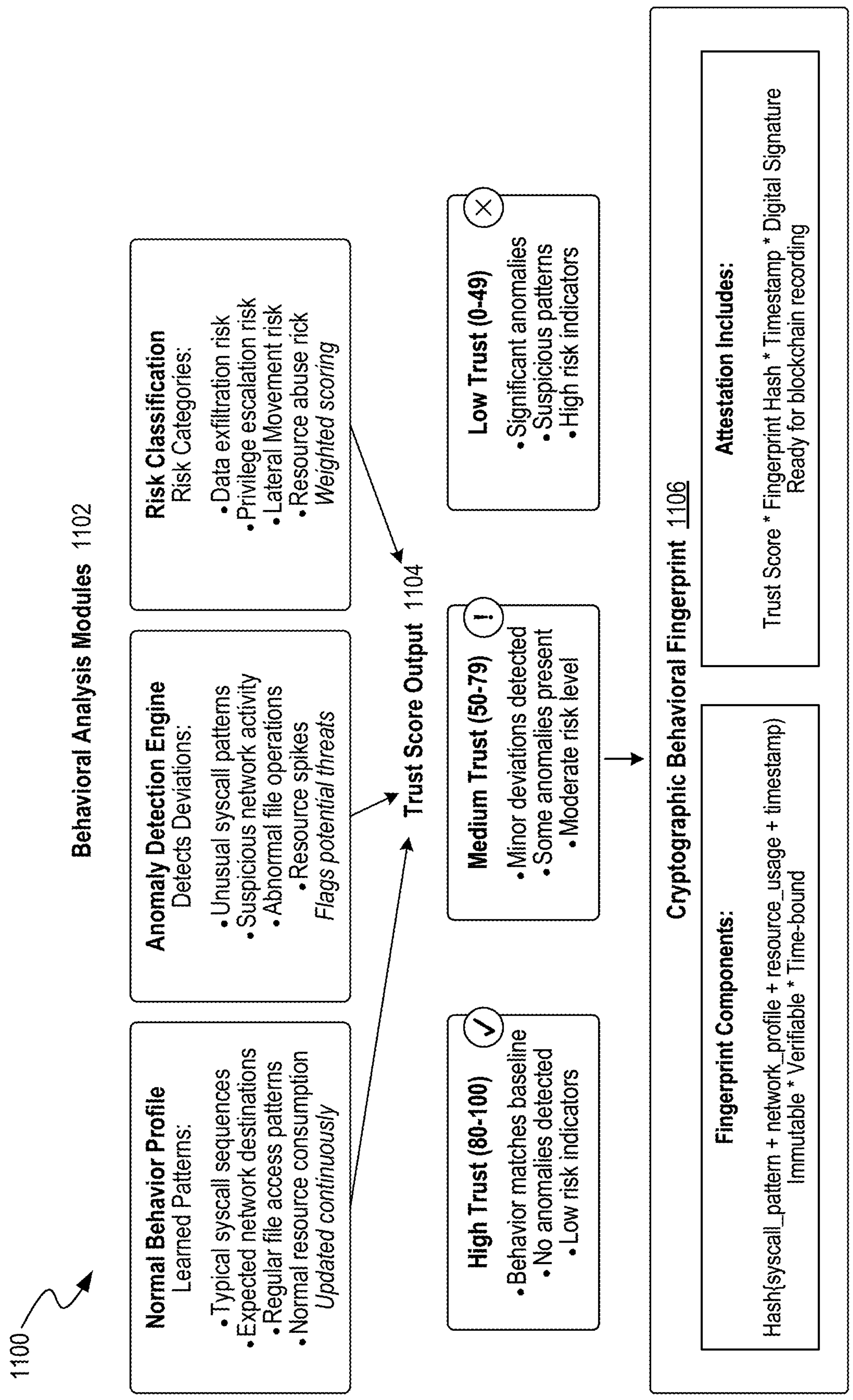
FIG. 11 shows a schematic illustrating an example environment of a behavioral analysis engine used by a cross-layer management platform to score AI agents, in accordance with some implementations of the present technology.

FIG. 11 shows a schematic illustrating an example environment 1100 of a behavioral analysis engine used by a cross-layer management platform to score AI agents, in accordance with some implementations of the present technology. The environment 1100 can be implemented using components of example computer system 1600 illustrated and described in more detail with reference to FIG. 16. Likewise, implementations of example environment 1100 can include different and/or additional components or can be connected in different ways.

The environment 1100 transforms raw event data into quantitative trust scores and cryptographic attestations by converting unstructured monitoring events into structured behavioral assessments. The unstructured monitoring events, i.e., raw eBPF events, can include individual system calls that represent specific requests for kernel services. As discussed in further detail with reference to FIGS. 9 and 10, the cross-layer management platform can convert the raw events into behavioral features using feature extraction operations that aggregate and transform individual events into behavioral indicators. System call sequences can be transformed into frequency vectors that capture the pattern and rate of different operations by counting occurrences of specific system calls within time windows and determining statistical distributions that characterize normal, i.e., reference, operational patterns. Network destinations can be categorized and profiled to identify normal, i.e., reference, communication patterns by evaluating destination IP addresses, port numbers, and protocol types to create network behavior profiles that distinguish between "satisfactory" and "non-satisfactory" (e.g., suspicious) communication activities. Resource usage can be aggregated into time-series data to identify consumption trends.

The cross-layer management platform can use one or more behavioral analysis modules 1102 to evaluate the identified behavioral features. For example, the cross-layer management platform includes a normal behavior profile that maintains a learned baseline of expected patterns including typical system call sequences that represent normal agent operations, common network destinations that correspond to legitimate external services, regular file access patterns that reflect standard data processing workflows, and normal resource consumption levels that characterize agent execution. This profile can update continuously as agent behavior evolves through adaptive learning operations (i.e., "legitimately") that incorporate new behavioral observations. Historical behavioral data can be used to identify trends and changes in operation patterns.

The anomaly detection engine identifies deviations from the baseline by comparing current behavioral measurements against established normal behavior profiles, and flagging unusual activities (e.g., system call patterns that deviate from expected frequencies or sequences beyond a particular threshold (e.g., constraint), network activity that involves communication with unauthorized destinations or data transfer volumes beyond a particular threshold, abnormal file operations that access restricted files or exhibit particular access patterns, resource spikes that exceed consumption thresholds or exhibit particular patterns, and so forth). The anomaly detection engine can determine statistical distances between current behavior and baseline profiles and apply one or more predefined rules or machine learning models to identify deviations (e.g., machine learning models trained to recognize patterns associated with various types of malicious behavior).

The risk classifier categorizes detected anomalies into threat categories such as data exfiltration risk that identifies patterns consistent with unauthorized data removal such as large file transfers to external destinations or unusual database access patterns, privilege escalation risk that detects attempts to gain elevated system permissions through exploitation of security vulnerabilities or misuse of administrative functions, lateral movement risk that identifies attempts to access additional systems or resources beyond a predefined operational scope, and/or resource abuse risk that detects excessive consumption of computational resources that can indicate cryptocurrency mining, distributed computing abuse, or denial-of-service activities. Further discussion of the threat categories are discussed with reference to FIG. 13. The risk classifier can apply weighted scoring to each category through one or more predefined rules or machine learning models that assign numerical risk values based on the severity and likelihood of different threat types, with weights determined based on historical attack patterns and/or other organizational security priorities.

A trust score output 1104 can be determined by the cross-layer management platform using multiple weighted components that combine different aspects of behavioral assessment into a single quantitative measure of agent trustworthiness. For example, a behavioral match to baseline can contribute a particular weight (such as 40% in FIG. 11) of the total trust score through comparison of current behavioral patterns against established normal behavior profiles, with higher similarity scores indicating greater trustworthiness and lower deviation risks. A risk level assessment can contribute a particular weight (such as 30% in FIG. 11) of the total trust score through evaluation of detected anomalies and their associated threat categories, with lower risk levels contributing positively to trust scores. A historical trust record can contribute a particular weight (such as 20% in FIG. 11) of the total trust score through analysis of past behavioral assessments and trust scores over particular time periods, with consistent historical trustworthiness contributing positively to current assessments and past security incidents reducing trust levels. A current context can contribute a particular weight (such as 10% in FIG. 11) of the total trust score through evaluation of current operational conditions such as system load, network conditions, and environmental factors that can influence normal behavioral patterns and affect the interpretation of current behavioral measurements.

The trust score output 1104 can be a continuous, discrete, or categorical value (a range from 0 to 100 as shown in FIG. 11), providing a standardized representation of agent trustworthiness that can be used for automated decision-making and/or subsequent comparative analysis. The trust score output 1104 can further be categorized into one or more categories, such as "High Trust" with scores ranging from 80-100 in FIG. 11 that indicates that the agent is operating normally and poses reduced security risk. "Medium Trust" scores in FIG. 11 that range from 50-79 can indicate minor deviations from normal behavioral patterns and moderate risk levels. "Low Trust" scores ranging from 0-49 in FIG. 11 can indicate significant anomalies and/or otherwise high-risk indicators.

The cross-layer management platform can generate a cryptographic behavioral fingerprint using the trust score output 1104 through cryptographic hash functions that create unique digital identifiers for specific behavioral patterns and assessments. For example, the cross-layer management platform generates hash values of the system call pattern data structures that contain frequency distributions and sequence information, network profile data that includes destination addresses and communication patterns, resource usage statistics that capture consumption trends and utilization patterns, and/or timestamp information that provides temporal context for the behavioral assessment. The cross-layer management platform can apply cryptographic hash functions such as SHA-256 to generate fixed-length hash values that uniquely identify the behavioral state, and/or combine multiple hash values to create composite fingerprints that represent complete behavioral profiles. The fingerprint, combined with the trust score, timestamp, and/or digital signature, forms an attestation that is structured to be recorded on a blockchain or otherwise stored in a database and operates as cryptographic proof of the agent's behavioral state at specific points in time.

Figure 12:
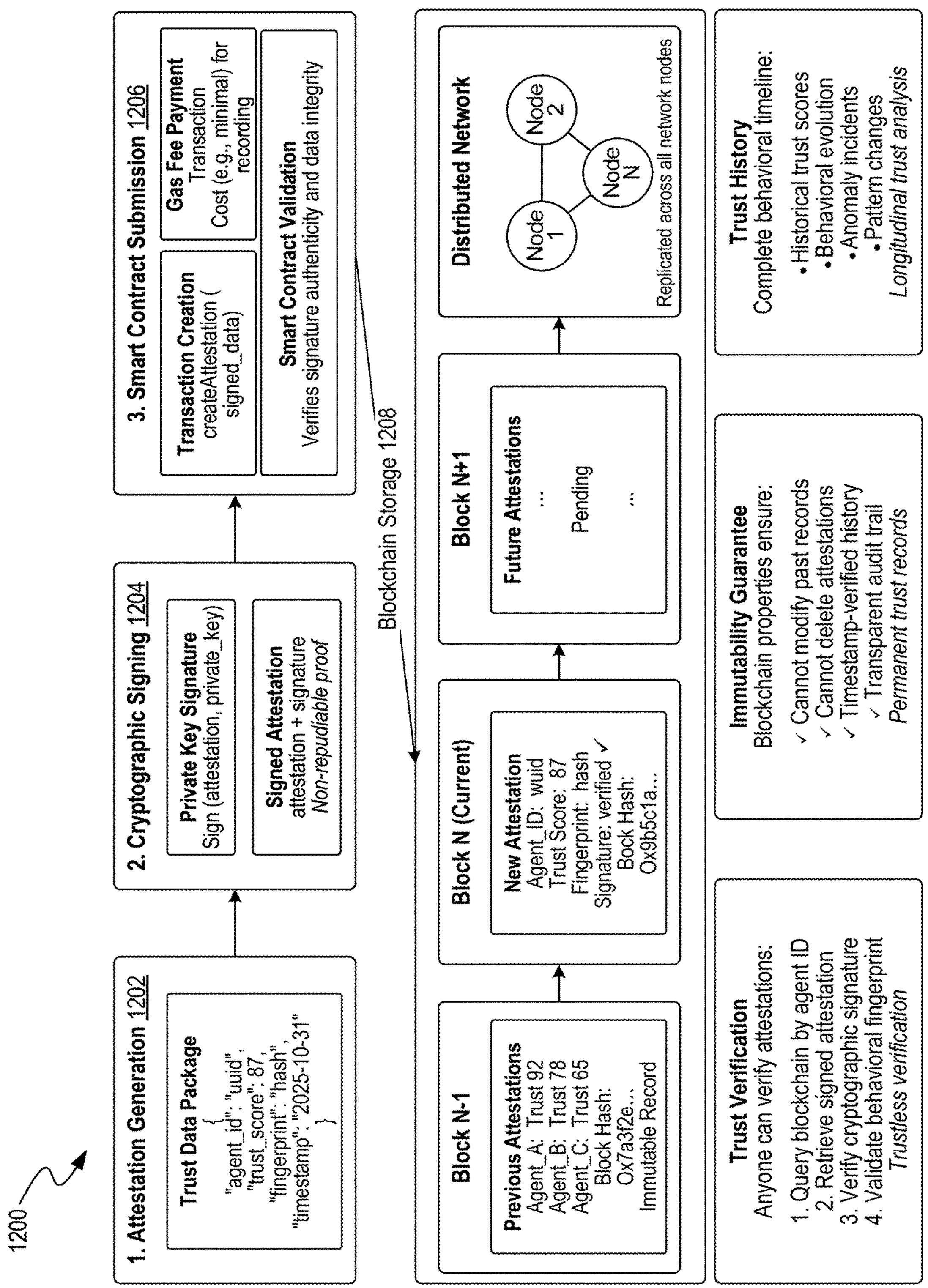
FIG. 12 is a flow diagram illustrating an example process of recording AI agent attestations using a cross-layer management platform, in accordance with some implementations of the present technology.

FIG. 12 is a flow diagram illustrating an example process 1200 of recording AI agent attestations using a cross-layer management platform, in accordance with some implementations of the present technology. In some implementations, the process 1200 is performed by a computer system, e.g., example computer system 1600 illustrated and described in more detail with reference to FIG. 16. Implementations can include different and/or additional operations or can perform the operations in different orders.

In operation 1202, the cross-layer management platform can generate a trust data package that includes the agent identifier, trust score, behavioral fingerprint hash, and/or timestamp through data serialization operations that combine multiple data elements into a structured format. This package represents a snapshot of agent trustworthiness at a specific moment in time by capturing behavioral assessment information in a standardized data structure. The agent identifier refers to a unique alphanumeric string or cryptographic hash that distinguishes the specific AI agent being assessed from all other agents in the cross-layer management platform. The trust score represents the quantitative assessment of agent generated using operations discussed in further detail with reference to FIGS. 9-11 (e.g., encoded as a numerical value). The behavioral fingerprint hash can include the cryptographic hash values generated from the agent's behavioral patterns such as system call sequences, network communication profiles, and/or resource usage statistics. The timestamp can record the time when the behavioral assessment was completed.

In operation 1204, the cross-layer management platform can apply a private key signature to the attestation data through digital signature operations that create a non-repudiable proof of the attestation's origin and integrity using asymmetric cryptographic operations. The cross-layer management platform can generate a cryptographic hash of the trust data package using hash functions such as SHA-256 to create a fixed-length digest that uniquely represents the package contents, then applying the private key using digital signature operations such as RSA or elliptic curve cryptography to generate a signature that mathematically binds the data to the signing entity. The signed attestation can combine the original data with the cryptographic signature via data structure concatenation or embedding that represents both the original trust data package and the associated signature. This cryptographic binding ensures any tampering will be detectable because a modification to the original data causes signature verification to fail, as the mathematical relationship between the data, signature, and public key will no longer be valid.

In operation 1206, the cross-layer management platform can create a blockchain transaction that invokes a smart contract function to record the attestation through transaction construction processes that format the signed attestation data according to blockchain protocol specifications. The transaction can include the signed attestation data encoded in the transaction payload along with metadata such as transaction version numbers, input and output specifications, and/or execution parameters required by the blockchain network. The transaction can include a gas fee for processing that compensates network validators for the computational resources used to execute the smart contract and record the attestation in the blockchain. The smart contract is enabled to validate the signature authenticity and data integrity before accepting the attestation through programmatic verification routines that execute within the blockchain virtual machine environment. The verification routines validate the signature using the public key associated with the signing entity.

In operation 1208, the cross-layer management platform can maintain attestations in an immutable chain of blocks through a distributed ledger such as a blockchain. Each block can include multiple attestations along with cryptographic hashes linking it to previous blocks through hash chaining mechanisms that create cryptographic dependencies between consecutive blocks in the chain. A current block receives new attestations through transaction processing operations that validate and incorporate new attestation transactions into the block structure, and is validated by the distributed network of nodes through consensus mechanisms such as proof-of-work or proof-of-stake that reach agreement among network participants. Each node in the network maintains a complete copy of the blockchain through synchronization protocols that distribute new blocks and maintain consistency across all network participants. Once a block is finalized through the consensus process, its contents become immutable because of the cryptographic hash chains and distributed consensus. The cross-layer management platform enables parties to validate attestations by querying the blockchain by agent identifier through blockchain query interfaces that provide access to stored attestation records, retrieve the signed attestation data from the distributed ledger, verify the cryptographic signature using the public key associated with the attestation's origin, and other verification operations.

Figure 13:
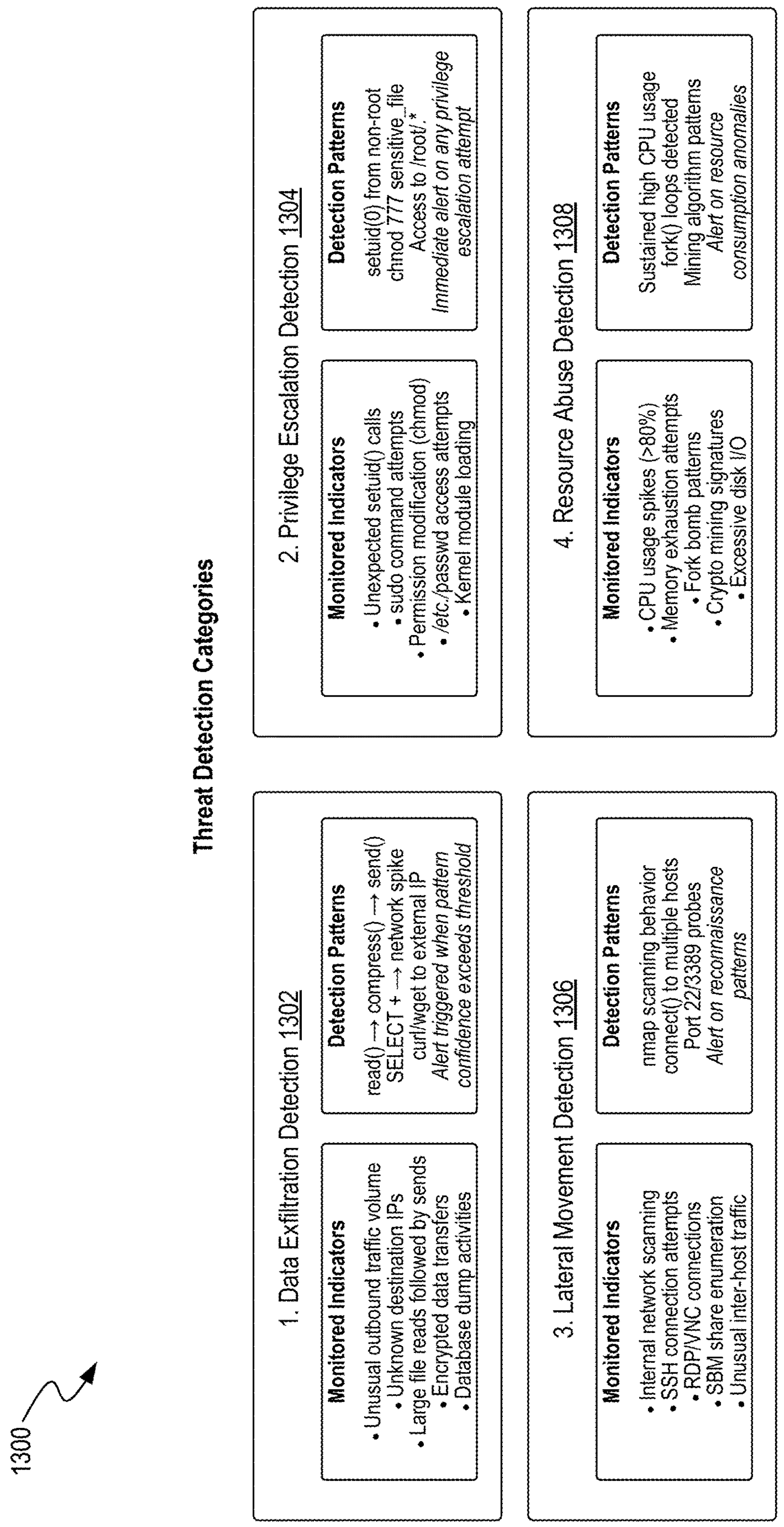
FIG. 13 shows a schematic illustrating an example environment of a threat detection module implemented by a cross-layer management platform to detect threatening agent activities, in accordance with some implementations of the present technology.

FIG. 13 shows a schematic illustrating an example environment 1300 of a threat detection module implemented by a cross-layer management platform to detect threatening agent activities, in accordance with some implementations of the present technology. The environment 1300 can be implemented using components of example computer system 1600 illustrated and described in more detail with reference to FIG. 16. Likewise, implementations of example environment 1300 can include different and/or additional components or can be connected in different ways.

A data exfiltration detection module 1302 monitors for data exfiltration indicators by identifying patterns consistent with unauthorized data removal activities (e.g., unusual outbound traffic volume that exceeds established baseline thresholds for network communication, connections to unknown destination IP addresses that are not present in approved communication lists or geographic regions, large file reads followed by network sends that indicate systematic data extraction and transmission, encrypted data transfers that indicate attempts to conceal unauthorized data movement, database dump activities that indicate bulk extraction of structured data from database systems, and so forth). The data exfiltration detection module 1302 can monitor database connection patterns and subsequent network activity to identify indicators of large-scale data extraction operations.

Additionally, the data exfiltration detection module 1302 identifies curl or wget commands to external IP addresses by monitoring system calls to capture command execution patterns associated with network transfer utilities directed toward unauthorized external destinations. Alerts can be triggered (e.g., on a user interface of a computing device) when probability scores for detected patterns exceed predetermined threshold values.

A privilege escalation detection module 1304 monitors for privilege escalation activities through system call monitoring and permission tracking that identifies attempts to gain elevated system privileges including unexpected setuid system calls that change process user identifiers to gain higher privileges, sudo command attempts that request administrative access, permission modifications via chmod operations that alter file or directory access permissions, access attempts to sensitive files such as/etc/passwd that contain system authentication information, and/or kernel module loading attempts. The privilege escalation detection module 1304 can identify patterns by monitoring system call patterns that track privilege-related operations, attempts to access restricted resources, and/or privilege requests or permission modifications. These attempts generate alerts to one or more computing devices through notification operations (e.g., sound, image, notification, video, multi-modal) that inform users or automated response systems.

A lateral movement detection module 1306 identifies lateral movement activities by detecting attempts to expand access beyond initially compromised systems (e.g., systematic probing of internal network addresses to identify additional targets), SSH connection attempts that indicate efforts to establish remote access to other systems within the network, RDP or VNC connections that represent attempts to gain graphical remote access to additional systems, SMB share enumeration that refer to scanning for network file shares that could provide access to additional resources, and/or unusual inter-host traffic patterns that deviate from normal communication patterns between systems. The lateral movement detection module 1306 can monitor network connection patterns via TCP connection attempts and/or established connections.

A resource abuse detection module 1308 can track computational resource consumption patterns that indicate malicious resource utilization including CPU usage that can indicate cryptocurrency mining or denial-of-service activities, memory exhaustion attempts that include consuming excessive system memory to degrade system performance or cause service failures, fork bomb patterns that create exponential process proliferation to overwhelm system resources, cryptocurrency mining signatures that exhibit specific computational patterns associated with blockchain mining operations, and/or disk I/O operations above a certain threshold that can indicate data destruction attempts or system performance degradation attacks. The resource abuse detection module 1308 recognizes malicious resource consumption by identifying sustained high CPU usage without computational work that corresponds to productive agent operations, fork loops that create process proliferation through recursive process creation that consumes system process limits and memory resources, and/or computational patterns matching known mining operations.

Figure 14:
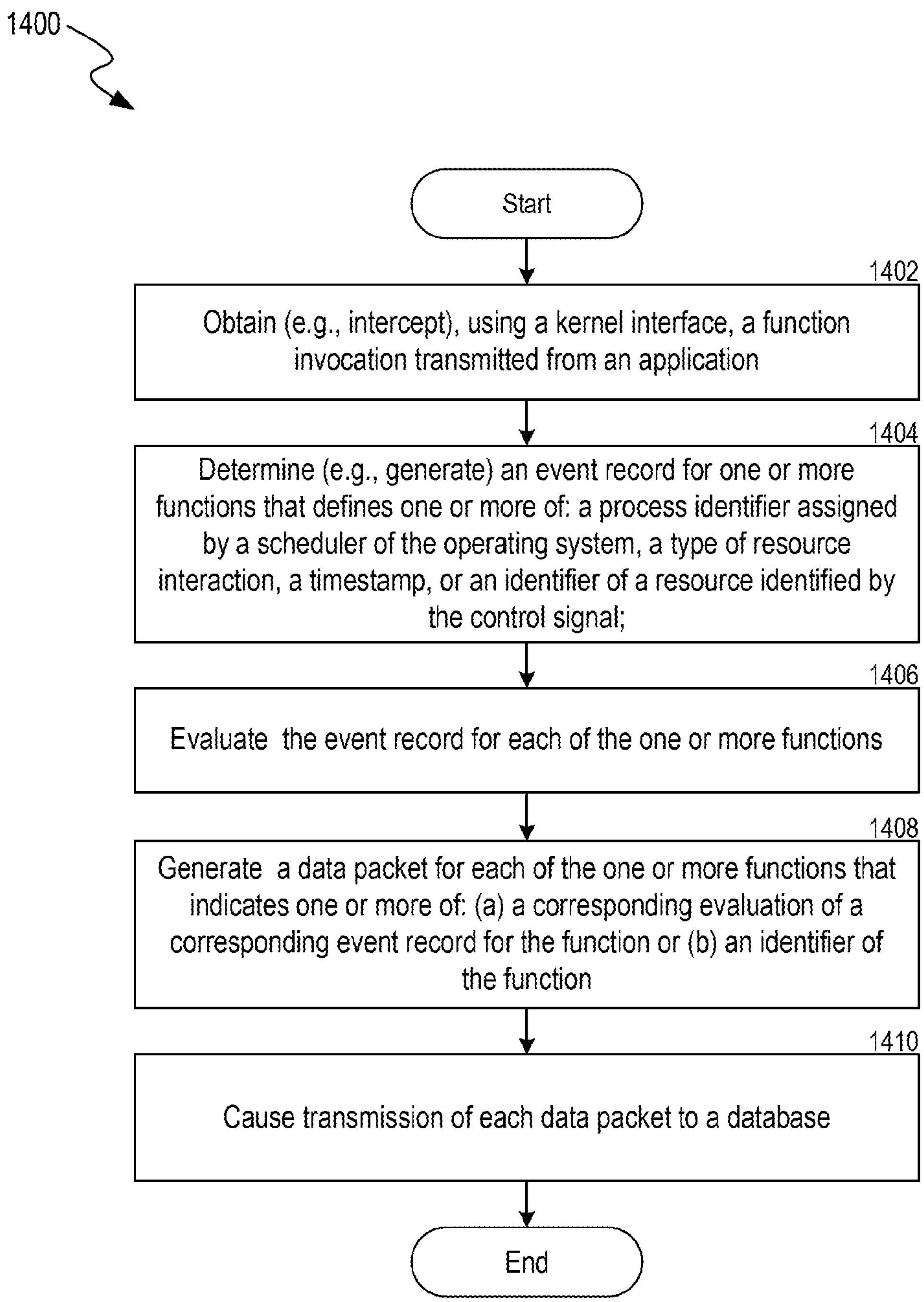
FIG. 14 is a flow diagram illustrating an example process of monitoring AI model operations using a cross-layer management platform, in accordance with some implementations of the present technology.

FIG. 14 is a flow diagram illustrating an example process 1400 of monitoring AI model operations using a cross-layer management platform, in accordance with some implementations of the present technology. In some implementations, the process 1400 is performed by a computer system, e.g., example computer system 1600 illustrated and described in more detail with reference to FIG. 16. Implementations can include different and/or additional operations or can perform the operations in different orders.

In operation 1402, the cross-layer management platform can obtain, e.g., intercept via the eBPF monitoring layer 904 in FIG. 9, a function invocation transmitted from an AI model (e.g., an AI agent) to a kernel interface structured to manage communications for the kernel of an operating system. The function invocation represents a request to execute a function set using the kernel. The cross-layer management platform can use an eBPF program to intercept the function invocation. The one or more of the functions within the function set are structured to request execution of a file read transaction, request execution of a file write transaction, transmit a network packet, receive a network packet, allocate at least a portion of computer memory, release at least a portion of the computer memory, and/or initiate a new process thread. In some implementations, the application is executed within a sandbox environment that is structured to restrict an access of the application to one or more system resources. Sandbox environments can provide separate views of system resources, control groups (cgroups) that enforce resource limits, and/or security contexts that define access control policies.

In operation 1404, the cross-layer management platform can determine (e.g., generate) an event record for each function that defines a process identifier assigned by a scheduler of the operating system, a type of resource interaction, a timestamp, and/or an identifier of a resource identified by the function.

In operation 1406, the cross-layer management platform can evaluate (e.g., using the behavioral analysis engine 908 in FIG. 9) the event record associated with each function. The cross-layer management platform can identify an observed pattern set associated with the event record by comparing the event record with one or more previous event records generated from one or more previous functions requested to be executed by the AI model. The cross-layer management platform can embed the observed pattern set into a vector representation of the observed pattern set by mapping each observed pattern into a latent space, and determine, a score set for the event record using a distance between a vector representation of a reference pattern set and the vector representation of the observed pattern set.

To evaluate the event record further, the cross-layer management platform can, e.g., via the risk classifier in FIG. 11, categorize the observed pattern set into one or more risk categories, and apply a weighted score to each risk category to generate the score set. Determining the score set (e.g., the trust score output 1104 in FIG. 11) can include determining a match score based on a degree of similarity between the observed pattern set and the reference pattern set, determining a risk score based on one or more differences between the observed pattern set and the reference pattern set, determining a predefined trust score for the AI model, and aggregating the match score, the risk score, and the predefined trust score using predetermined weights to generate the score set.

In operation 1408, the cross-layer management platform can generate (e.g., using the trust attestation generator 910 in FIG. 9) a data packet for each function that indicates the observed pattern set, a corresponding score set, and/or a digital fingerprint generated by applying a hash function to a representation of the function (e.g., the pattern vector, the event record, the function, and so forth). The hash function is structured to produce a fixed-length identifier that uniquely represents the function.

In operation 1410, the cross-layer management platform can transmit (e.g., via the blockchain integration engine 912 in FIG. 9) each data packet to a distributed ledger (or other database), where the distributed ledger is structured to store the data packet on the distributed ledger. In some implementations, the distributed ledger is a blockchain, and the blockchain is structured to record the data packet as a smart contract. In some implementations, the distributed ledger is a federated ledger, and the federated ledger is structured to determine consensus among a predetermined set of authorized nodes prior to storing the data packet. In some implementations, a reference data packet associated with the reference pattern set is stored on the distributed ledger, e.g., via the trust registry 916 in FIG. 9. The cross-layer management platform can update the reference pattern set (e.g., the normal behavioral profile in FIG. 11) based on one or more changes determined in the observed pattern set, where the score set satisfies a predefined constraint.

In response to the score set satisfying a predefined constraint, the cross-layer management platform can transmit the function invocation (or a portion of it) to the kernel interface. On the other hand, in response to the score set failing to satisfy a predefined constraint, the cross-layer management platform can prevent transmission of the function invocation (or a portion of it) to the kernel interface. In some implementations, the cross-layer management platform can determine that the observed pattern set fails to satisfy a particular constraint, and generate an alert on a computing device associated with the operating system in response to the determination. The cross-layer management platform can, e.g., via the threat detection module 914 in FIG. 9, determine that the observed pattern set indicates data exfiltration, privilege escalation, and/or resource consumption failing to satisfy a particular constraint, and generate an alert on a computing device associated with the operating system in response to the determination.

The cross-layer management platform can create a rule (e.g., a rule defined within the eBPF program) using one or more previous event records generated from one or more previous functions, and/or store the rule in a kernel-accessible data structure. The cross-layer management platform can generate rules by establishing threshold parameters such as maximum satisfactory file access rates (e.g., no more than 100 file operations per second), satisfactory network connection patterns (e.g., connections only to pre-approved IP address ranges), satisfactory resource utilization bounds (e.g., CPU usage below 80% averaged over 60-second intervals), and so forth. These rules can be encoded as conditional logic statements and stored in kernel-accessible data structures such as eBPF hash maps (that provide O(1) lookup performance for rule retrieval), eBPF array maps that store rule parameters indexed by rule identifiers, eBPF Least Recently Used (LRU) maps that automatically manage memory usage by evicting infrequently accessed rules, and so forth. Kernel-accessible data structures reside in kernel memory space that can be directly accessed by eBPF programs without context switching to user space. In some implementations, the cross-layer management platform applies the rule during the evaluation of the event record by comparing the event record against the stored rule and checking the numerical event parameters against rule limits.

The cross-layer management platform can obtain, from each of a plurality of applications executing on the operating system, a respective function invocation (e.g., via eBPF programs attached to kernel hook points) that represents a respective request to execute a respective function using the kernel. The cross-layer management platform can access a unique agent identifier to each of the plurality of applications, where each unique agent identifier is mapped to a respective rule set. The mapping between agent identifiers and rule sets can be maintained in eBPF hash maps where the agent identifier operates as the key and the value includes pointers or indices to the corresponding rule set data structures (e.g., therefore enabling O(1) lookup performance). The cross-layer management platform can determine a particular event record for each function, and evaluate each particular event record by comparing the particular event record against the respective rule set that corresponds to a respective unique agent identifier.

Example Implementation of the Models of the Cross-Layer Management Platform

Figure 15:
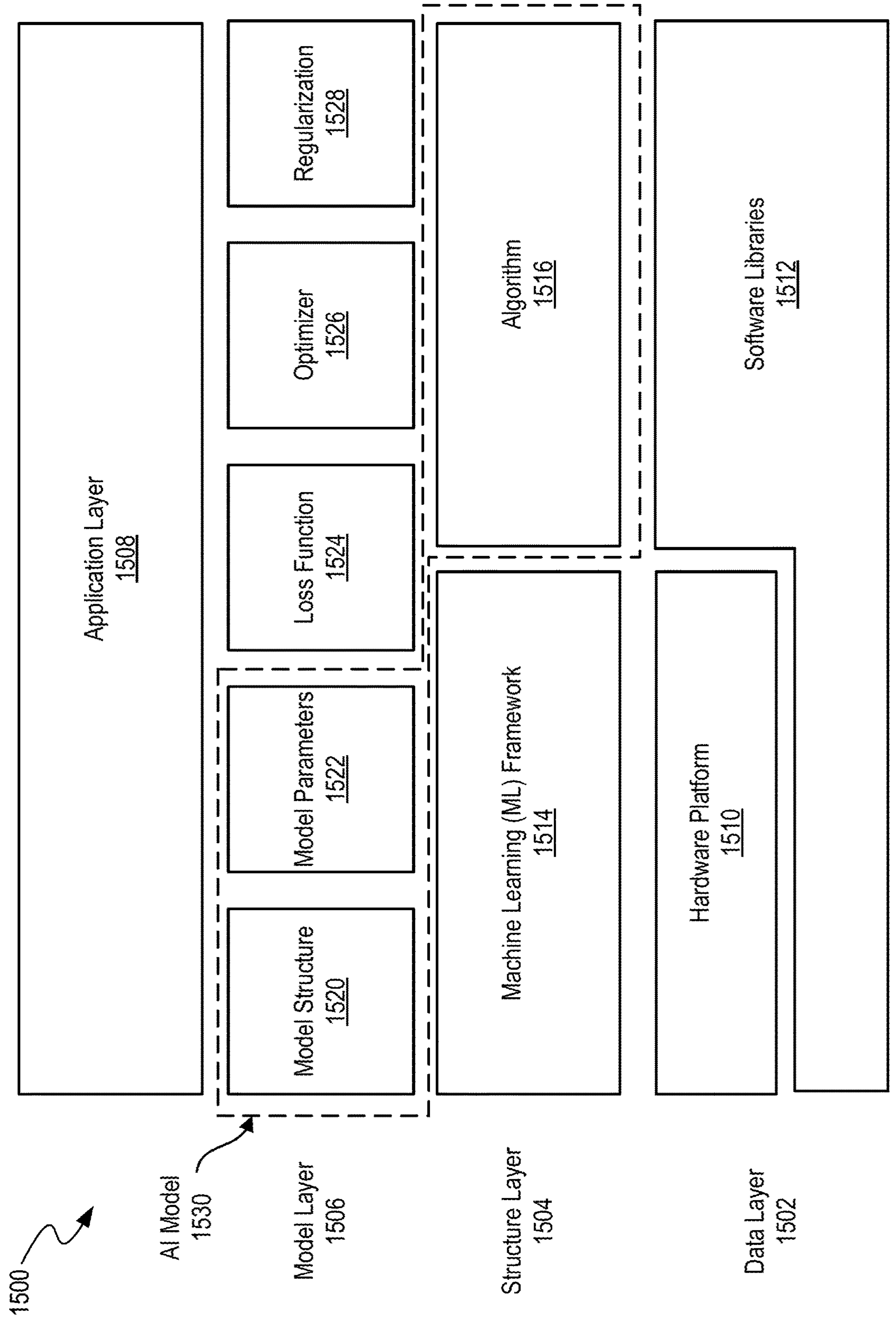
FIG. 15 illustrates a layered architecture of an AI system that can implement the machine learning models of a cross-layer management platform, in accordance with some implementations of the present technology.

FIG. 15 illustrates a layered architecture of an AI system 1500 that can implement the ML models of the cross-layer management platform, in accordance with some implementations of the present technology. Example ML models can include the models executed by the cross-layer management platform, such as the AI orchestration layer 104. Accordingly, the AI orchestration layer 104 can include one or more components of the AI system 1500.

As shown, the AI system 1500 can include a set of layers, which conceptually organize elements within an example network topology for the AI system's architecture to implement a particular AI model. Generally, an AI model is a computer-executable program implemented by the AI system 1500 that analyses data to make predictions. Information can pass through each layer of the AI system 1500 to generate outputs for the AI model. The layers can include a data layer 1502, a structure layer 1504, a model layer 1506, and an application layer 1508. The algorithm 1516 of the structure layer 1504 and the model structure 1520 and model parameters 1522 of the model layer 1506 together form an example AI model. The optimizer 1526, loss function engine 1524, and regularization engine 1528 work to refine and optimize the AI model, and the data layer 1502 provides resources and support for application of the AI model by the application layer 1508.

The data layer 1502 acts as the foundation of the AI system 1500 by preparing data for the AI model. As shown, the data layer 1502 can include two sub-layers: a hardware platform 1510 and one or more software libraries 1512. The hardware platform 1510 can be designed to perform operations for the AI model and include computing resources for storage, memory, logic and networking, such as the resources described in relation to FIGS. 16 and 17. The hardware platform 1510 can process amounts of data using one or more servers. The servers can perform backend operations such as matrix calculations, parallel calculations, machine learning (ML) training, and the like. Examples of servers used by the hardware platform 1510 include CPUs and GPUs. CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 1510 can include computing resources, (e.g., servers, memory, etc.) offered by a cloud services provider. The hardware platform 1510 can include computer memory for storing data about the AI model, application of the AI model, and training data for the AI model. The computer memory can be a form of random-access memory (RAM), such as dynamic RAM, static RAM, and non-volatile RAM.

The software libraries 1512 can be thought of suites of data and programming code, including executables, used to control the computing resources of the hardware platform 1510. The programming code can include low-level primitives (e.g., fundamental language elements) that form the foundation of one or more low-level programming languages, such that servers of the hardware platform 1510 can use the low-level primitives to carry out specific operations. The low-level programming languages do not require much, if any, abstraction from a computing resource's instruction set architecture, enabling them to run quickly with a small memory footprint. Examples of software libraries 1512 that can be included in the AI system 1500 include INTEL Math Kernel Library, NVIDIA cuDNN, EIGEN, and OpenBLAS.

The structure layer 1504 can include an ML framework 1514 and an algorithm 1516. The ML framework 1514 can be thought of as an interface, library, or tool that enables users to build and deploy the AI model. The ML framework 1514 can include an open-source library, an API, a gradient-boosting library, an ensemble method, and/or a deep learning toolkit that work with the layers of the AI system facilitate development of the AI model. For example, the ML framework 1514 can distribute processes for application or training of the AI model across multiple resources in the hardware platform 1510. The ML framework 1514 can include a set of pre-built components that have the functionality to implement and train the AI model and enable users to use pre-built functions and classes to construct and train the AI model. Thus, the ML framework 1514 can be used to facilitate data engineering, development, hyperparameter tuning, testing, and training for the AI model. Examples of ML frameworks 1514 that can be used in the AI system 1500 include TENSORFLOW, PYTORCH, SCIKIT-LEARN, KERAS, LightGBM, RANDOM FOREST, and AMAZON WEB SERVICES.

The algorithm 1516 can be an organized set of computer-executable operations used to generate output data from a set of input data and can be described using pseudocode. The algorithm 1516 can include complex code that enables the computing resources to learn from new input data and create new/modified outputs based on what was learned. In some implementations, the algorithm 1516 can build the AI model through being trained while running computing resources of the hardware platform 1510. This training enables the algorithm 1516 to make predictions or decisions without being explicitly programmed to do so. Once trained, the algorithm 1516 can run at the computing resources as part of the AI model to make predictions or decisions, improve computing resource performance, or perform tasks. The algorithm 1516 can be trained using supervised learning, unsupervised learning, semi-supervised learning, and/or reinforcement learning.

Using supervised learning, the algorithm 1516 can be trained to learn patterns (e.g., map input data to output data) based on labeled training data. The training data can be labeled by an external user or operator. For instance, a user can collect a set of training data, such as by capturing data from sensors, images from a camera, outputs from a model, and the like. In an example implementation, training data can include native-format data collected (e.g., in the form of operational data in FIG. 1) from various source computing systems described in relation to FIG. 15. Furthermore, training data can include pre-processed data generated by various engines of the cross-layer management platform described in relation to FIG. 15. The user can label the training data based on one or more classes and trains the AI model by inputting the training data to the algorithm 1516. The algorithm determines how to label the new data based on the labeled training data. The user can facilitate collection, labeling, and/or input via the ML framework 1514. In some instances, the user can convert the training data to a set of feature vectors for input to the algorithm 1516. Once trained, the user can test the algorithm 1516 on new data to determine if the algorithm 1516 is predicting accurate labels for the new data. For example, the user can use cross-validation methods to test the accuracy of the algorithm 1516 and retrain the algorithm 1516 on new training data if the results of the cross-validation are below an accuracy threshold.

Supervised learning can include classification and/or regression. Classification techniques include teaching the algorithm 1516 to identify a category of new observations based on training data and are used when input data for the algorithm 1516 is discrete. Said differently, when learning through classification techniques, the algorithm 1516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 1516 is continuous. Regression techniques can be used to train the algorithm 1516 to predict or forecast relationships between variables. To train the algorithm 1516 using regression techniques, a user can select a regression method for estimating the parameters of the model. The user collects and labels training data that is input to the algorithm 1516 such that the algorithm 1516 is trained to understand the relationship between data features and the dependent variable(s). Once trained, the algorithm 1516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 1516 learns patterns from unlabeled training data. In particular, the algorithm 1516 is trained to learn hidden patterns and insights of input data, which can be used for data exploration or for generating new data. Here, the algorithm 1516 does not have a predefined output, unlike the labels output when the algorithm 1516 is trained using supervised learning. Said another way, unsupervised learning is used to train the algorithm 1516 to find an underlying structure of a set of data, group the data according to similarities, and represent that set of data in a compressed format. The cross-layer management platform can use unsupervised learning to identify patterns in claim history (e.g., to identify particular event sequences) and so forth. In some implementations, performance of the cross-layer management platform that can use unsupervised learning is improved because the incoming memories (e.g., operational data in FIG. 1) is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1516 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1516 can be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that can be used by the algorithm 1516 include factor analysis, item response theory, latent profile analysis, and latent class analysis.

The model layer 1506 implements the AI model using data from the data layer and the algorithm 1516 and ML framework 1514 from the structure layer 1504, thus enabling decision-making capabilities of the AI system 1500. The model layer 1506 includes a model structure 1520, model parameters 1522, a loss function engine 1524, an optimizer 1526, and a regularization engine 1528.

The model structure 1520 describes the architecture of the AI model of the AI system 1500. The model structure 1520 defines the complexity of the pattern/relationship that the AI model expresses. Examples of structures that can be used as the model structure 1520 include decision trees, support vector machines, regression analyses, Bayesian networks, Gaussian processes, genetic algorithms, and artificial neural networks (or, simply, neural networks). The model structure 1520 can include a number of structure layers, a number of nodes (or neurons) at each structure layer, and activation functions of each node. Each node's activation function defines how to node converts data received to data output. The structure layers can include an input layer of nodes that receive input data, an output layer of nodes that produce output data. The model structure 1520 can include one or more hidden layers of nodes between the input and output layers. The model structure 1520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1522 represent the relationships learned during training and can be used to make predictions and decisions based on input data. The model parameters 1522 can weight and bias the nodes and connections of the model structure 1520. For instance, when the model structure 1520 is a neural network, the model parameters 1522 can weight and bias the nodes in each layer of the neural networks, such that the weights determine the strength of the nodes and the biases determine the thresholds for the activation functions of each node. The model parameters 1522, in conjunction with the activation functions of the nodes, determine how input data is transformed into desired outputs. The model parameters 1522 can be determined and/or altered during training of the algorithm 1516.

The loss function engine 1524 can determine a loss function, which is a metric used to evaluate the AI model's performance during training. For instance, the loss function engine 1524 can measure the difference between a predicted output of the AI model and the actual output of the AI model and is used to guide optimization of the AI model during training to minimize the loss function. The loss function can be presented via the ML framework 1514, such that a user can determine whether to retrain or otherwise alter the algorithm 1516 if the loss function is over a threshold. In some instances, the algorithm 1516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1526 adjusts the model parameters 1522 to minimize the loss function during training of the algorithm 1516. In other words, the optimizer 1526 uses the loss function generated by the loss function engine 1524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1526 used can be determined based on the type of model structure 1520 and the size of data and the computing resources available in the data layer 1502.

The regularization engine 1528 executes regularization operations. Regularization is a technique that prevents over- and under-fitting of the AI model. Overfitting occurs when the algorithm 1516 is overly complex and too adapted to the training data, which can result in poor performance of the AI model. Underfitting occurs when the algorithm 1516 is unable to recognize even basic patterns from the training data such that it cannot perform well on training data or on validation data. The optimizer 1526 can apply one or more regularization techniques to fit the algorithm 1516 to the training data properly, which helps constraint the resulting AI model and improves its ability for generalized application. Examples of regularization techniques include lasso (L1) regularization, ridge (L2) regularization, and elastic (L1 and L2 regularization).

The application layer 1508 describes how the AI system 1500 is used to solve problem or perform tasks. In an example implementation, the application layer 1508 can include a front-end user interface of the cross-layer management platform.

Example Computing Environment of the Cross-Layer Management Platform

Figure 16:
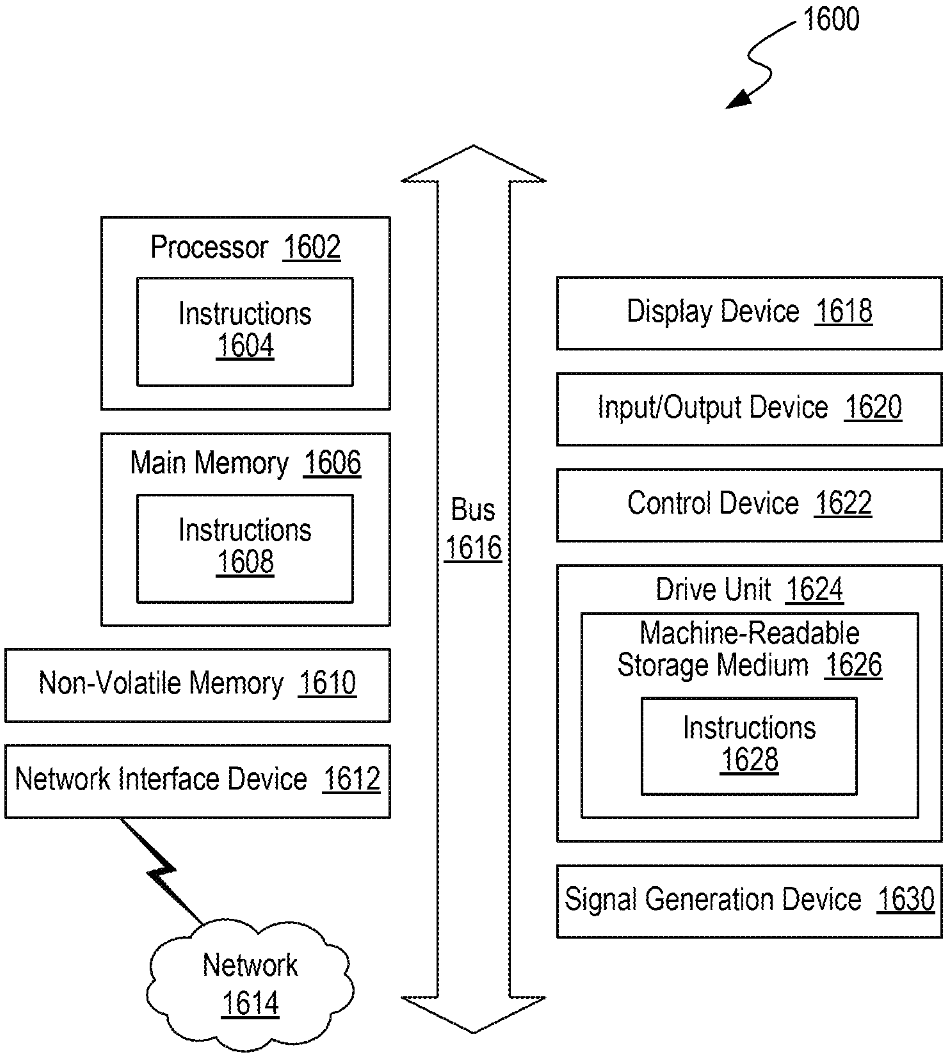
FIG. 16 is a block diagram showing some of the components typically incorporated in at least some of the computer systems and other devices on which the cross-layer management platform operates, in accordance with some implementations of the present technology.

FIG. 16 is a block diagram showing some of the components typically incorporated in at least some of the computer systems 1600 and other devices on which the disclosed system operates in accordance with some implementations of the present technology. As shown, an example computer system 1600 can include: one or more processors 1602, main memory 1606, non-volatile memory 1610, a network interface device 1612, video display device 1618, an input/output device 1620, a control device 1622 (e.g., keyboard and pointing device), a drive unit 1624 that includes a machine-readable medium 1626, and a signal generation device 1630 that are communicatively connected to a bus 1616. The bus 1616 represents one or more physical buses and/or point-to-point connections that are connected by appropriate bridges, adapters, or controllers. Various common components (e.g., cache memory) are omitted from FIG. 16 for brevity. Instead, the computer system 1600 is intended to illustrate a hardware device on which components illustrated or described relative to the examples of the figures and any other components described in this specification can be implemented.

The computer system 1600 can take any suitable physical form. For example, the computer system 1600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1600. In some implementations, the computer system 1600 can be an embedded computer system, a system-on-chip (SOC), a single-board computer system (SBC) or a distributed system such as a mesh of computer systems or include one or more cloud components in one or more networks. Where appropriate, one or more computer systems 1600 can perform operations in real time, near real time, or in batch mode.

The network interface device 1612 enables the computer system 1600 to exchange data in a network 1614 with an entity that is external to the computing system 1600 through any communication protocol supported by the computer system 1600 and the external entity. Examples of the network interface device 1612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1606, non-volatile memory 1610, machine-readable medium 1626) can be local, remote, or distributed. Although shown as a single medium, the machine-readable medium 1626 can include multiple media (e.g., a centralized/distributed database and/or associated caches and servers) that store one or more sets of instructions 1628. The machine-readable (storage) medium 1626 can include any medium that is capable of storing, encoding, or carrying a set of instructions for execution by the computer system 1600. The machine-readable medium 1626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1608, 1628) set at various times in various memory and storage devices in computing device(s). When read and executed by the processor 1602, the instruction(s) cause the computer system 1600 to perform operations to execute elements involving the various aspects of the disclosure.

Figure 17:
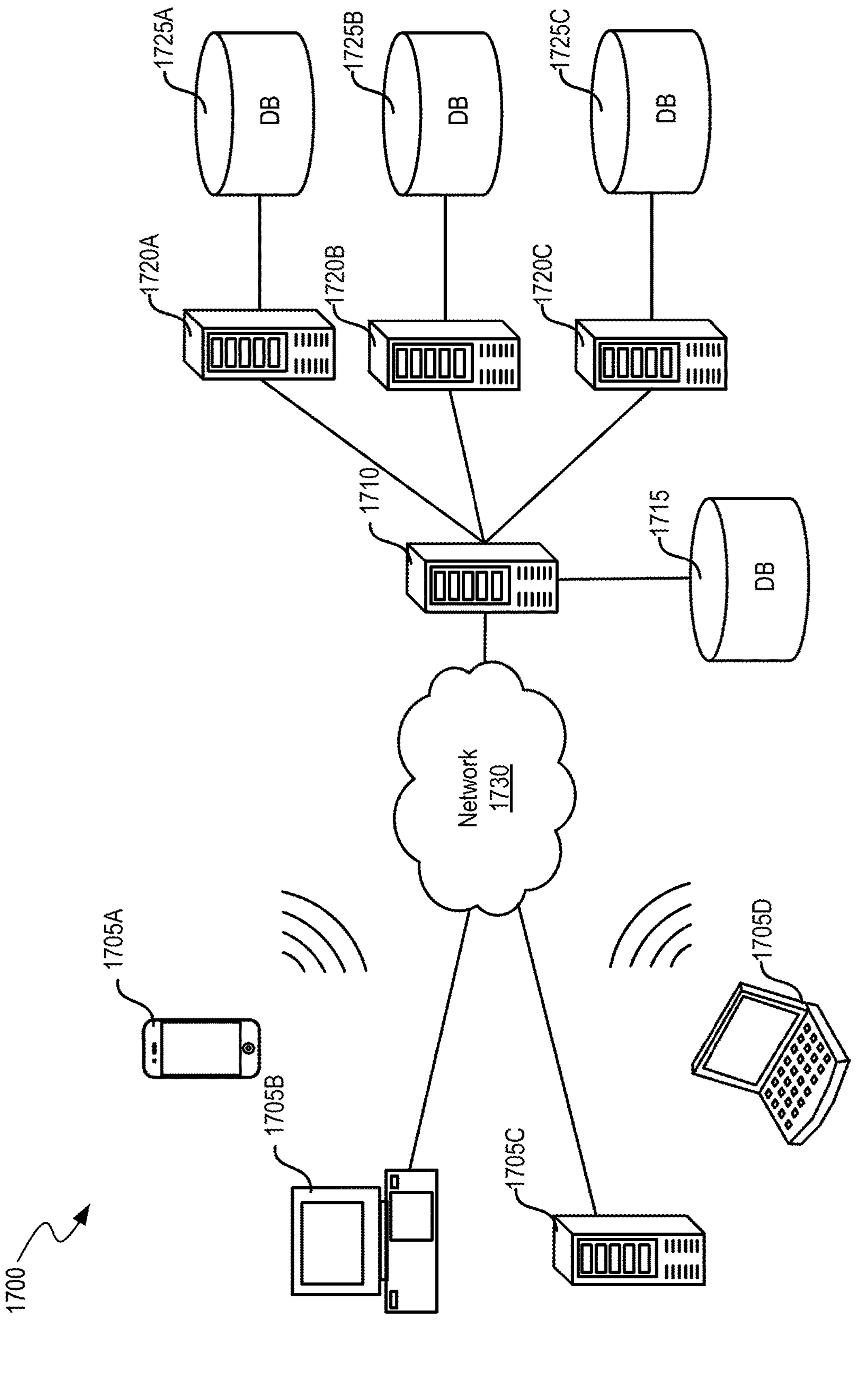
FIG. 17 is a system diagram illustrating an example of a computing environment in which the cross-layer management platform operates, in accordance with some implementations of the present technology.

FIG. 17 is a system diagram illustrating an example of a computing environment in which the disclosed system operates in some implementations. In some implementations, environment 1700 includes one or more client computing devices 1705A-D, examples of which can host the cross-layer management platform. Client computing devices 1705 operate in a networked environment using logical connections through network 1730 to one or more remote computers, such as a server computing device.

In some implementations, server computing device 1710 is an edge server which receives client requests and coordinates fulfillment of those requests through other servers, such as servers 1720A-C. In some implementations, server computing devices 1710 and 1720 comprise computing systems, such as the cross-layer management platform. Though each server computing device 1710 and 1720 is displayed logically as a single server, server computing devices can each be a distributed computing environment encompassing multiple computing devices located at the same or at geographically disparate physical locations. In some implementations, each server computing device 1720 corresponds to a group of servers.

Client computing devices 1705 and server computing devices 1710 and 1720 can each act as a server or client to other server or client devices. In some implementations, servers (1710, 1720A-C) connect to a corresponding database (1715, 1725A-C). As discussed above, each server computing device 1720 can correspond to a group of servers, and each of these servers can share a database or can have its own database. Databases 1715 and 1725 warehouse (e.g., store) information such as claims data, email data, call transcripts, call logs, policy data and so on. Though databases 1715 and 1725 are displayed logically as single units, databases 1715 and 1725 can each be a distributed computing environment encompassing multiple computing devices, can be located within their corresponding server, or can be located at the same or at geographically disparate physical locations.

Network 1730 can be a local area network (LAN) or a wide area network (WAN), but can also be other wired or wireless networks. In some implementations, network 1730 is the Internet or some other public or private network. Client computing devices 1705 are connected to network 1730 through a network interface, such as by wired or wireless communication. While the connections between server computing device 1710 and server computing devices 1720 are shown as separate connections, these connections can be any kind of local, wide area, wired, or wireless network, including network 1730 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system comprising:

at least one hardware processor; and at least one non-transitory memory storing instructions, which, when executed by the at least one hardware processor, cause the system to:

load a monitoring program into a kernel of an operating system, wherein the monitoring program is configured to execute within a virtual machine resident in the kernel;

attach the monitoring program to at least one hook point within the kernel, wherein the at least one hook point is associated with execution of an artificial intelligence (AI) agent, and wherein the monitoring program executes within a kernel space of the operating system that is isolated from a user space of the operating system in which the AI agent executes;

capture, via the monitoring program, a plurality of kernel-level event records associated with execution of the AI agent, wherein each kernel-level event record comprises at least one of: a process identifier, an operation identifier, a resource identifier, or a timestamp;

generate a cryptographic hash value by applying one or more hash functions to a representation of at least a subset of the kernel-level event records; and maintain the cryptographic hash value on a distributed ledger within a registry record of the AI agent, wherein the distributed ledger maintains a sequence of registry records that links the registry record to one or more previous registry records within the sequence of registry records.

2. The system of claim 1, wherein the instructions further cause the system to:

detect, based on an evaluation of the registry record maintained on the distributed ledger, an anomalous operation associated with the AI agent; and responsive to detecting the anomalous operation, generate a computer-executable instruction configured to restrict transmittal of additional operational data to the AI agent.

3. The system of claim 1, wherein the at least one hook point within the kernel is positioned at a system call entry point or a system call exit point of the operating system.

4. The system of claim 1, wherein the instructions further cause the system to:

compare the plurality of kernel-level event records against a reference set of expected event patterns associated with the AI agent; and responsive to a deviation between the plurality of kernel-level event records and the reference set exceeding a predetermined threshold, migrate the AI agent to a restricted namespace within the operating system configured to reduce network egress for the AI agent.

5. The system of claim 1, wherein the cryptographic hash value is generated by determining a hash chain over a sequence of the kernel-level event records, wherein each successive hash in the hash chain is determined over a concatenation of a preceding hash value and a representation of a subsequent kernel-level event record, and wherein the cryptographic hash value maintained on the distributed ledger comprises a head of the hash chain.

6. At least one non-transitory, computer-readable medium storing instructions, which, when executed by at least one data processor of a system, cause the system to:

load a monitoring program into a kernel of an operating system, wherein the monitoring program is configured to execute within a virtual machine resident in the kernel;

attach the monitoring program to at least one hook point within the kernel, wherein the at least one hook point is associated with execution of an artificial intelligence (AI) agent;

capture, via the monitoring program, a plurality of event records associated with the AI agent, wherein each event record comprises at least one of: a process identifier, an operation identifier, a resource identifier, or a timestamp;

determine a cryptographic value by applying one or more cryptographic functions to a representation of at least a subset of the event records; and maintain the cryptographic value on a distributed ledger within a registry record associated with the AI agent.

7. The at least one non-transitory, computer-readable medium of claim 6, wherein the instructions further cause the system to:

evaluate, within the kernel, one or more execution paths of the monitoring program to determine that the monitoring program satisfies one or more constraints, wherein the one or more constraints comprise at least one of: a bounded execution of the monitoring program, a restricted access to one or more particular memory regions of the kernel, or a termination of the monitoring program within a predetermined number of instructions.

8. The at least one non-transitory, computer-readable medium of claim 6, wherein the monitoring program is associated with a cryptographic signature generated using a private key, and wherein, prior to loading the monitoring program into the kernel, the instructions further cause the system to:

verify the cryptographic signature of the monitoring program using a corresponding public key.

9. The at least one non-transitory, computer-readable medium of claim 6, wherein the instructions further cause the system to:

determine an attestation hash by applying the one or more cryptographic functions to a binary image of an executable associated with the AI agent; and maintain the attestation hash within the registry record on the distributed ledger.

10. The at least one non-transitory, computer-readable medium of claim 6, wherein the monitoring program maintains, in a data structure resident in the kernel, a per-agent state that associates the process identifier of the AI agent with one or more of: an event count, a resource consumption metric, or a policy compliance indicator.

11. The at least one non-transitory, computer-readable medium of claim 6, wherein the instructions further cause the system to:

organize one or more of the plurality of event records as a set of leaf nodes of a Merkle tree data structure;

determine a set of intermediate hash values by hashing pairs of leaf nodes within the set of leaf nodes at each level of the Merkle tree data structure.

12. The at least one non-transitory, computer-readable medium of claim 6, wherein the instructions further cause the system to:

identify, based on the plurality of event records, that the AI agent initiated an operation that matches one or more anomaly indicators stored in a data structure accessible by the kernel; and responsive to the identification, reassign the AI agent to a restricted namespace within the operating system, wherein the restricted namespace is configured to prevent one or more network connections.

13. The at least one non-transitory, computer-readable medium of claim 6, wherein the monitoring program is generated by a machine learning model.

14. A computer-implemented method comprising:

loading a monitoring program into a monitoring component of a monitoring layer of an operating system, wherein the monitoring layer of the operating system is maintained external to a user space of an operating system;

attaching the monitoring program to at least one hook point within the monitoring component, wherein the at least one hook point is associated with execution of an artificial intelligence (AI)-based agent;

capturing, via the monitoring program, a plurality of event records associated with execution of the AI-based agent;

determining one or more cryptographic values by applying one or more functions to a representation of at least a subset of the event records; and maintaining the one or more cryptographic values at a distributed database within a record of the AI-based agent.

15. The computer-implemented method of claim 14, further comprising:

comparing the event records against one or more constraints stored in a data structure accessible by the monitoring component; and responsive to a particular event record indicating that the AI-based agent has exceeded a threshold defined by the one or more constraints, causing execution of an action within the monitoring component that restricts one or more operations of the AI-based agent.

16. The computer-implemented method of claim 15, wherein the action comprises returning an error code from the at least one hook point to deny a system call initiated by the AI-based agent before the operating system executes the system call.

17. The computer-implemented method of claim 15, wherein the action comprises reassigning the AI-based agent to a restricted network namespace within the operating system that prevents one or more outbound network connections initiated by the AI-based agent.

18. The computer-implemented method of claim 14, further comprising:

deploying the AI-based agent within a container runtime of the operating system.

19. The computer-implemented method of claim 14, wherein the monitoring component is configured to apply one or more access control policies that restrict the AI-based agent from accessing one or more of: a system path, a network address, or a system call.

20. The computer-implemented method of claim 14, wherein the AI-based agent is an autonomous or semi-autonomous agent.

* * * * *